United States Patent
Makino et al.

(10) Patent No.: US 10,985,406 B2
(45) Date of Patent: *Apr. 20, 2021

(54) ALL SOLID-STATE SECONDARY BATTERY, ELECTRODE SHEET FOR BATTERY, METHOD FOR MANUFACTURING ELECTRODE SHEET FOR BATTERY, SOLID ELECTROLYTE COMPOSITION, METHOD FOR PRODUCING SOLID ELECTROLYTE COMPOSITION, AND METHOD FOR MANUFACTURING ALL SOLID-STATE SECONDARY BATTERY

(71) Applicant: FUJIFILM Corporation, Tokyo (JP)

(72) Inventors: Masaomi Makino, Ashigarakami-gun (JP); Hiroaki Mochizuki, Ashigarakami-gun (JP); Katsuhiko Meguro, Ashigarakami-gun (JP); Tomonori Mimura, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 822 days.

This patent is subject to a terminal disclaimer.

(21) Appl. No.: 15/412,463

(22) Filed: Jan. 23, 2017

(65) Prior Publication Data

US 2017/0133717 A1 May 11, 2017

Related U.S. Application Data

(63) Continuation of application No. PCT/JP2015/070988, filed on Jul. 23, 2015.

(30) Foreign Application Priority Data

Jul. 29, 2014 (JP) .............................. JP2014-154347

(51) Int. Cl.
*H01M 10/0585* (2010.01)
*H01M 4/62* (2006.01)
(Continued)

(52) U.S. Cl.
CPC .......... *H01M 10/0585* (2013.01); *H01B 1/06* (2013.01); *H01M 4/62* (2013.01);
(Continued)

(58) Field of Classification Search
None
See application file for complete search history.

(56) References Cited

U.S. PATENT DOCUMENTS

2012/0157624 A1 6/2012 Saito
2017/0133713 A1 5/2017 Makino et al.

FOREIGN PATENT DOCUMENTS

JP 5-098169 A 4/1993
JP 11-073992 A 3/1999
(Continued)

OTHER PUBLICATIONS

English translation of International Preliminary Report on Patentability and Written Opinion of the International Searching Authority, issued in PCT/JP2015/070988, dated Jan. 31, 2017 (Forms PCT/IB/373 and PCT/ISA/237).

(Continued)

*Primary Examiner* — Zhongqing Wei
(74) *Attorney, Agent, or Firm* — Birch, Stewart, Kolasch & Birch, LLP

(57) ABSTRACT

An all solid-state secondary battery having a positive electrode active material layer; an inorganic solid electrolyte layer; and a negative electrode active material layer in this order, in which at least one layer of the positive electrode active material layer, the inorganic solid electrolyte layer, or the negative electrode active material layer includes a cross- (Continued)

linked polymer of a cyclic compound having a siloxane bond; and an inorganic solid electrolyte which includes a metal belonging to Group I or II of the periodic table and has an ion-conducting property respectively, an electrode sheet for a battery, a method for manufacturing an electrode sheet for a battery, a solid electrolyte composition, a method for producing a solid electrolyte composition, and a method for manufacturing an all solid-state secondary battery.

24 Claims, 1 Drawing Sheet

(51) Int. Cl.
  *H01M 10/0562* (2010.01)
  *H01B 1/06* (2006.01)
  *H01M 10/0525* (2010.01)
(52) U.S. Cl.
  CPC ....... *H01M 4/622* (2013.01); *H01M 10/0525* (2013.01); *H01M 10/0562* (2013.01); *H01M 2300/0068* (2013.01); *Y02T 10/70* (2013.01)

(56) References Cited

FOREIGN PATENT DOCUMENTS

| JP | 2009-117168 A | | 5/2009 |
|---|---|---|---|
| JP | 2009117168 A | * | 5/2009 |
| JP | 2011-088982 A | | 5/2011 |
| JP | 2011137143 A | * | 7/2011 |
| JP | 2013-045683 A | | 3/2013 |
| WO | WO 2016/017527 A1 | | 2/2016 |

OTHER PUBLICATIONS

International Search Report (PCT/ISA/210) issued in PCT/JP2015/070988, dated Oct. 27, 2015.
Written Opinion (PCT/ISA/237) issued in PCT/JP2015/070988, dated Oct. 27, 2015.
Japanese Notification of Reasons for Refusal, dated Nov. 7, 2017, for corresponding Japanese Application No. 2016-538308, with an English machine translation thereof.

* cited by examiner

ALL SOLID-STATE SECONDARY BATTERY, ELECTRODE SHEET FOR BATTERY, METHOD FOR MANUFACTURING ELECTRODE SHEET FOR BATTERY, SOLID ELECTROLYTE COMPOSITION, METHOD FOR PRODUCING SOLID ELECTROLYTE COMPOSITION, AND METHOD FOR MANUFACTURING ALL SOLID-STATE SECONDARY BATTERY

CROSS-REFERENCE TO RELATED APPLICATIONS

This application is a Continuation of PCT International Application No. PCT/JP2015/070988 filed on Jul. 23, 2015, which claims priority under 35 U.S.C. § 119 (a) to Japanese Patent Application No. JP2014-154347 filed in Japan on Jul. 29, 2014. Each of the above applications is hereby expressly incorporated by reference, in its entirety, into the present application.

BACKGROUND OF THE INVENTION

1. Field of the Invention

The present invention relates to an all solid-state secondary battery, an electrode sheet for a battery, a method for manufacturing an electrode sheet for a battery, a solid electrolyte composition, a method for producing a solid electrolyte composition, and a method for manufacturing an all solid-state secondary battery.

2. Description of the Related Art

At present, lithium ion batteries which weigh little and have a high energy density are being used as middle and large-sized storage batteries that are used in electric vehicles, domestic storage batteries, and the like. In lithium ion batteries, an organic electrolytic solution is used as an electrolytic solution, and thus there has been a risk of liquid leakage or ignition, and there have been a variety of improvements made regarding this point. In recent years, studies have been underway regarding all solid-state secondary batteries in which a combustible organic electrolytic solution is substituted into an incombustible inorganic solid electrolyte from the viewpoint of ensuring stability or reliability. Examples of the inorganic solid electrolyte include sulfide-based solid electrolytes and oxide-based solid electrolytes. In sulfide-based solid electrolytes, an ion conductivity in the order of $10^{-3}$ S/cm, which is the same as that of organic electrolytic solutions, is realized at room temperature.

All solid-state secondary batteries have a structure in which an inorganic electrolyte is sandwiched by electrodes. Electrodes are obtained by adding a binder and a solvent to an electrode active material made of a mixture such as a powder-form active material, a solid electrolyte (SE), or a conduction aid so as to produce a slurry and applying this slurry onto the surface of a collector into a film shape. An inorganic electrolyte layer can be prepared using a method in which a coated film-shaped SE layer is produced by adding a binder to SE powder. The binder needs to have favorable binding properties to electrode active material particles or favorable adhesiveness to collectors while not impairing ion conduction. Furthermore, when a binder having excellent flexibility is used, it is possible to wind electrodes or SE layers which have been produced into a sheet shape in a roll shape, which leads to excellent mass producibility.

Electrodes in all solid-state secondary batteries can be produced by mixing and molding a powder-form solid electrolyte and a powder-form electrode active material. However, since a powder-form mixture is used as a raw material, there has been a problem in that a number of defects are generated in ion conduction pathways and electron conduction pathways and battery performance degrades. Additionally, there has been another problem in that electrodes expand and contract as a whole due to the repetition of the charge/discharge cycle, the worsening contact between particles generates grain boundary resistance, and the charge/discharge characteristics degrade.

As binders having favorable binding properties to electrode active material particles or favorable adhesiveness to collectors while maintaining flexibility, JP2013-45683A proposes a silicone resin in which a part of a silicone structure is substituted with a polar group.

Meanwhile, inorganic solid electrolytes have a problem with the ion conductivity being degraded due to a reaction with moisture in the air, and thus there is a demand for binders capable of hydrophobilizing the surfaces of inorganic electrolyte particles and favorably preventing the infiltration of moisture in the air while not impairing ion conduction. For example, JP2009-117168A proposes an all solid-state battery including a positive electrode, a negative electrode, a sulfide solid electrolyte sandwiched by the positive electrode and the negative electrode, and a liquid-phase substance (insulating oil) that coats the sulfide solid electrolyte. According to this all solid-state battery, it is possible to prevent hydrogen sulfide from being generated due to a reaction with moisture in the air while ensuring conductivity using the sulfide solid electrolyte.

SUMMARY OF THE INVENTION

When the recent intensifying demand for performance improvement in all solid-state secondary batteries is taken into account, it is necessary to develop techniques for satisfying the performance improvement in response to the demand.

Therefore, an object of the present invention is to provide an all solid-state secondary battery in which performance is further improved by hydrophobilizing the surfaces of inorganic solid electrolyte particles without impairing the ion conduction of an inorganic solid electrolyte, an electrode sheet for a battery, a method for manufacturing an electrode sheet for a battery, a solid electrolyte composition, a method for producing a solid electrolyte composition, and a method for manufacturing an all solid-state secondary battery.

More specifically, the object of the present invention is to provide an all solid-state secondary battery in which moisture resistance and temporal stability are improved while preventing a decrease in the ion conductivity by hydrophobilizing the surfaces of inorganic solid electrolyte particles, an electrode sheet for a battery, a method for manufacturing an electrode sheet for a battery, a solid electrolyte composition, a method for producing a solid electrolyte composition, and a method for manufacturing an all solid-state secondary battery.

The object of the present invention is achieved by the following means.

<1> An all solid-state secondary battery comprising: a positive electrode active material layer; an inorganic solid electrolyte layer; and a negative electrode active material layer in this order, in which at least one layer of the positive electrode active material layer, the inorganic solid electrolyte layer, or the negative electrode active material layer includes a crosslinked polymer of a cyclic compound having a siloxane bond; and an inorganic solid electrolyte which includes a metal belonging to Group 1 or 11 of the periodic table and has an ion-conducting property.

<2> The all solid-state secondary battery according to <1>, in which the crosslinked polymer of the cyclic compound having a siloxane bond is a crosslinked polymer obtained by crosslinking at least one of a cyclic siloxane compound represented by Formula (1) below and a basket-shaped silsesquioxane compound represented by Formula (2) below:

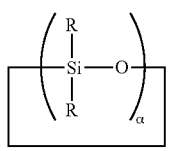

Formula (1)

(RSiO$_{1.5}$)$_\beta$

Formula (2)

in Formula (1) and Formula (2), R's each independently represent a hydrogen atom or a monovalent organic group, the multiple R's may be identical to or different from each other; here at least two R's are monovalent organic groups having a polymerizable group, α represents an integer of 3 to 6, and β represents an integer of 8 to 16.

<3> The all solid-state secondary battery according to <1> or <2>, in which the crosslinked polymer of the cyclic compound having a siloxane bond is a crosslinked polymer obtained by crosslinking one or more selected from the group consisting of cyclic siloxane compounds represented by any one of Formulae (H-1) to (H-3) below and basket-shaped silsesquioxane compounds represented by any one of Formulae (Q-1) to (Q-8) below:

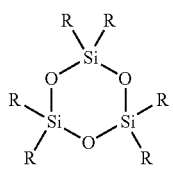

Formula (H-1)

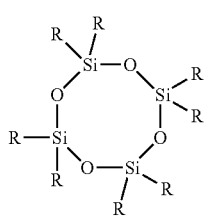

Formula (H-2)

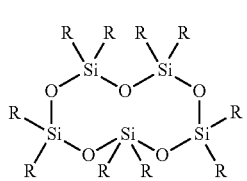

Formula (H-3)

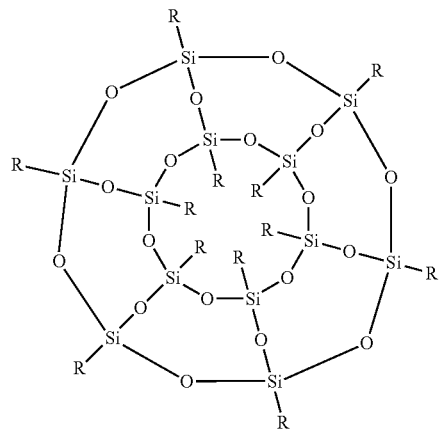

Formula (Q-1)

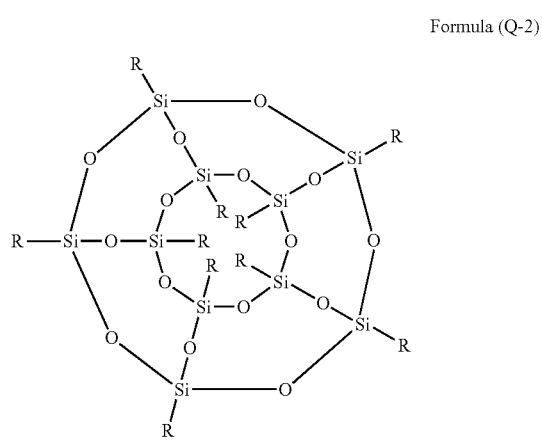

Formula (Q-2)

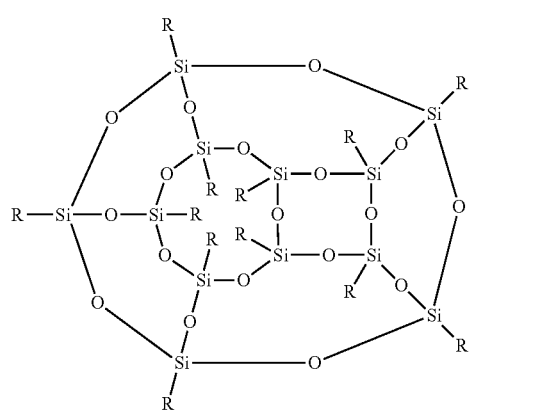

Formula (Q-3)

-continued

Formula (Q-4)

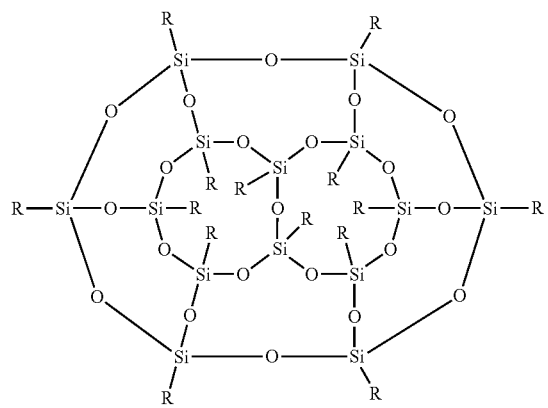

Formula (Q-5)

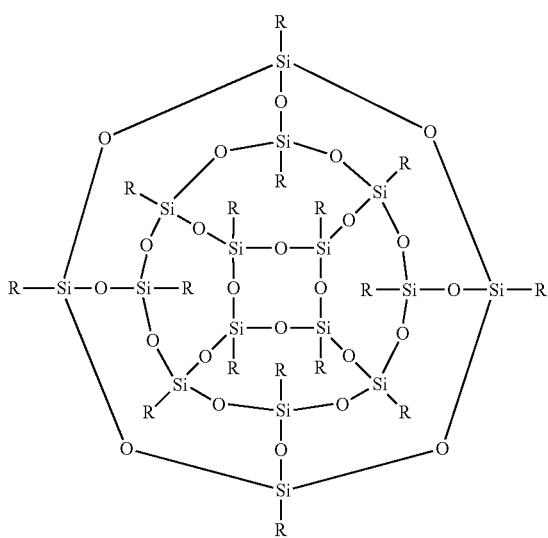

Formula (Q-6)

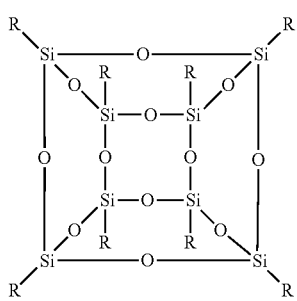

-continued

Formula (Q-7)

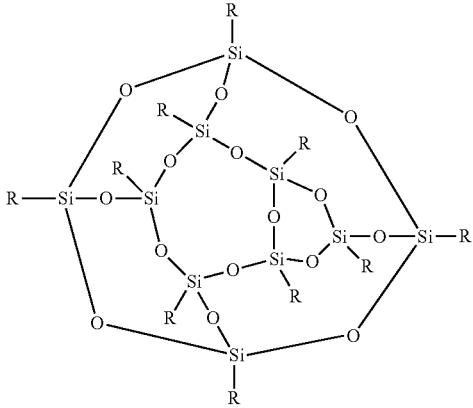

Formula (Q-8)

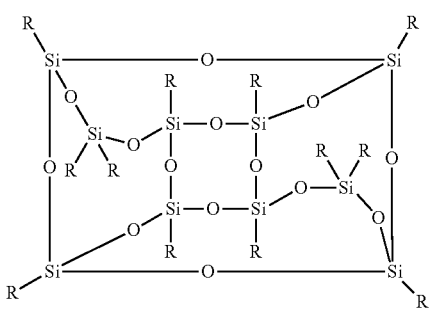

in Formulae (H-1) to (H-3) and Formulae (Q-1) to (Q-8), R represents a hydrogen atom or a monovalent organic group, and at least two monovalent organic groups represented by R represent groups having a polymerizable group.

<4> The all solid-state secondary battery according to <2> or <3>, in which the polymerizable group is an epoxy group, an oxetanyl group, a (meth)acryloyl group, a (meth)acryloyloxy group, a (meth)acrylamide group, a vinyl group, or an allyl group.

<5> The all solid-state secondary battery according to any one of <2> to <4>, in which the monovalent organic group that is not a group having a polymerizable group is an alkyl group, a cycloalkyl group, an alkenyl group, an aryl group, or a heteroaryl group which may be substituted with a fluorine atom, an alkoxy group, an alkylthio group, an alkylamino group, an acylamino group, an acyloxy group, an alkoxycarbonyl group, a carbamoyloxy group, an alkoxycarbonylamino group, a silyl group, an alkyl group, an aryl group, a polar group, or a polymerizable group.

<6> The all solid-state secondary battery according to any one of <2> to <5>, in which at least one monovalent organic group that is not a group having a polymerizable group is a group having any one of polar groups below;

(Polar Groups)

a carboxy group, a sulfo group, a phosphate group, a hydroxy group, $CON(R^N)_2$, a cyano group, $N(R^N)_2$, and a mercapto group here, $R^N$ represents a hydrogen atom, an alkyl group, or an aryl group.

<7> The all solid-state secondary battery according to any one of <1> to <3>, in which the crosslinked polymer of the cyclic compound having a siloxane bond is represented by Formula (3) or (4) below:

Formula (3)

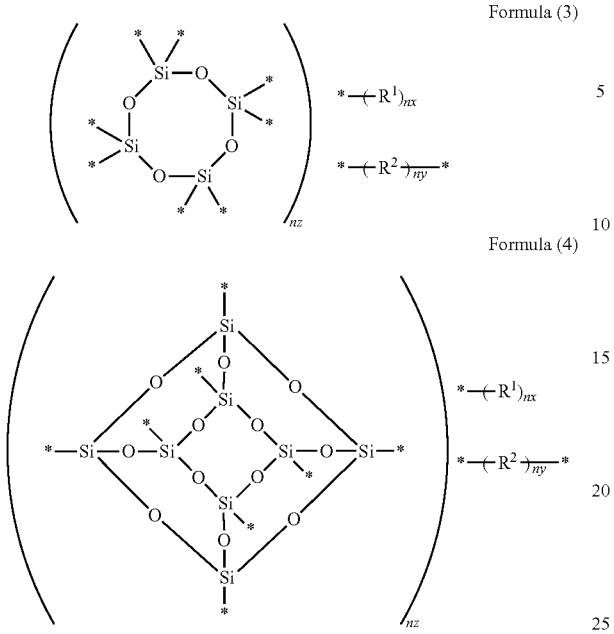

Formula (4)

Formula (Q-9)

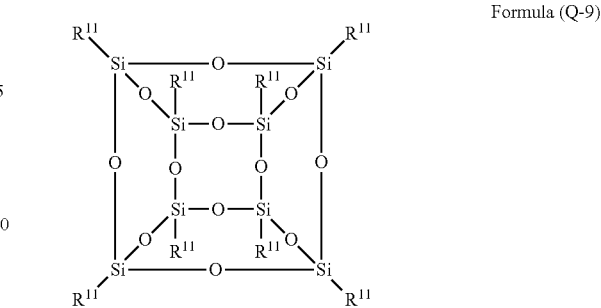

in Formulae (3) and (4), $R^1$'s each independently represent a hydrogen atom or a monovalent organic group, $R^2$ represents a linking group at which the polymerizable groups in R are bonded to each other and which links a unit cyclic structure and a unit cyclic structure, * represents a linking position to a silicon atom, nz represents a number of 2 to 10,000, nx and ny represent the average number in the unit cyclic structure, nx is a number of 0 to lower than 6, ny represents a number of 2 to 8, and nx+ny=8 is satisfied.

<8> The all solid-state secondary battery according to <7>, in which the monovalent organic group is an alkyl group, a cycloalkyl group, an alkenyl group, an aryl group, or a heteroaryl group which may be substituted with a fluorine atom, an alkoxy group, an alkylthio group, an alkylamino group, an arylamino group, an acyloxy group, an alkoxycarbonyl group, a carbamoyloxy group, an alkoxycarbonylamino group, a silyl group, an alkyl group, an aryl group, a polar group, or a polymerizable group.

<9> The all solid-state secondary battery according to <8>, in which the polar group and the polymerizable group are selected from Group A below:

[Group A]

(Polar Group)

a carboxy group, a sulfo group, a phosphate group, a hydroxy group, $CON(R^N)_2$, a cyano group, $N(R^N)_2$, and a mercapto group here, $R^N$ represents a hydrogen atom, an alkyl group, or an aryl group;

(Polymerizable Group)

an epoxy group, an oxetanyl group, a (meth)acryloyl group, a (meth)acryloyloxy group, a (meth)acrylamide group, a vinyl group, and an allyl group.

<10> The all solid-state secondary battery according to any one of <1> to <6>, in which the crosslinked polymer of the cyclic compound having a siloxane bond is a crosslinked polymer obtained by crosslinking one or more basket-shaped silsesquioxane compounds represented by Formula (Q-9) below;

in Formula (Q-9), $R^{11}$ represents a group selected from Group A1, Group A2, and Group A3 below; here, at least two $R^{11}$'s are selected from Group A2:

[Group A1]

a hydrogen atom, an alkyl group, a cycloalkyl group, an aryl group, a heteroaryl group, an alkyl group having a fluorine atom, and an aryl group having a fluorine atom

[Group A2]

a polymerizable group or a group having a polymerizable group at a terminal

[Group A3]

a group having a polar group at a terminal.

<11> The all solid-state secondary battery according to <10>, in which eight $R^{11}$'s include at least one group selected from Group A1 and at least one group selected from Group A3.

<12> The all solid-state secondary battery according to <10> or <11>, in which the groups in Group A1 are represented by Formula (5) below:

$$-L^1-X-L^2-R^{12}$$  Formula (5)

in Formula (5), $L^1$ represents an alkylene group having 1 to 6 carbon atoms or an arylene group having 6 to 10 carbon atoms, $L^2$ represents an alkylene group having 1 to 10 carbon atoms which may be divided by a hetero atom in the middle or an arylene group having 6 to 10 carbon atoms, X represents $-Si(R^N)_2-$, $-N(R^N)-$, $-O-$, $-S-$, $-OC(=O)-$, $-C(=O)O-$, $-NHC(=O)O-$, or $-OC(=O)NH-$; here, $R^N$ represents a hydrogen atom, an alkyl group, or an aryl group, and $R^{12}$ represents an alkyl group having a fluorine atom and 1 to 10 carbon atoms or an aryl group having a fluorine atom and 6 to 12 carbon atoms.

<13> The all solid-state secondary battery according to any one of <10> to <12>, in which the polymerizable group in Group A2 is any one of a vinyl group, an allyl group, an epoxy group, an oxetanyl group, a methacryloyl group, an acryloyl group, a methacryloyloxy group, an acryloyloxy group, a methacrylamide group, an acrylamide group, and a styryl group.

<14> The all solid-state secondary battery according to any one of <10> to <13>, in which the polar group in Group A3 is any one of a carboxy group, a sulfo group, a phosphate group, a hydroxy group, $N(R^N)_2$, and a mercapto group, and $R^N$ represents a hydrogen atom, an alkyl group, or an aryl group.

<15> The all solid-state secondary battery according to any one of <10> to <14>, in which the group having a polar group at the terminal in Group A3 is represented by Formula (6) below:

$$-L^1-X-L^2-R^{13}$$  Formula (6)

in Formula (6), $L^1$ represents an alkylene group having 1 to 6 carbon atoms or an arylene group having 6 to 10 carbon atoms, $L^2$ represents an alkylene group having 1 to 10 carbon atoms which may be divided by a hetero atom in the middle or an arylene group having 6 to 10 carbon atoms, X represents —Si($R^N$)$_2$—, —N($R^N$)—, —O—, —S—, —OC(=O)—, —C(=O)O—, —NHC(=O)O—, or —OC(=O)NH—, and $R^{13}$ represents a carboxy group, a sulfo group, a phosphate group, a hydroxy group, or N($R^N$)$_2$; here, $R^N$ represents a hydrogen atom, an alkyl group, or an aryl group.

<16> The all solid-state secondary battery according to any one of <3> to <15>, in which the crosslinked polymer of the cyclic compound having a siloxane bond is a crosslinked polymer obtained by radical-polymerizing the cyclic compound having a siloxane bond represented by any one of Formulae (H-1) to (H-3) and Formulae (Q-1) to (Q-9) using an azo-based radical polymerization initiator.

<17> The all solid-state secondary battery according to any one of <3> to <16>, in which the crosslinked polymer of the cyclic compound having a siloxane bond is a crosslinked polymer obtained by mixing at least one cyclic compound having a siloxane bond represented by any one of Formulae (H-1) to (H-3) and Formulae (Q-1) to (Q-9) and a monomer capable of copolymerization and increase a molecular weight of the mixture.

<18> The all solid-state secondary battery according to any one of <2> to <17>, in which, in a case in which the number of all organic groups bonded to silicon atoms is set to 100, the average number of residual polymerizable groups in the crosslinked polymer is 1 to 60.

<19> The all solid-state secondary battery according to any one of <1> to <18>, in which a weight-average molecular weight of the crosslinked polymer is 1,000 to 500,000.

<20> The all solid-state secondary battery according to any one of <1> to <19>, in which a content of the crosslinked polymer of the cyclic compound having a siloxane bond is 0.01 parts by mass to 20 parts by mass with respect to 100 parts by mass of the inorganic solid electrolyte.

<21> The all solid-state secondary battery according to any one of <1> to <20>, in which at least one layer of the positive electrode active material layer, the negative electrode active material layer, or the inorganic solid electrolyte layer further contains a lithium salt.

<22> The all solid-state secondary battery according to any one of <1> to <21>, in which the inorganic solid electrolyte is an oxide-based inorganic solid electrolyte.

<23> The all solid-state secondary battery according to any one of <1> to <21>, in which the inorganic solid electrolyte is a sulfide-based inorganic solid electrolyte.

<24> A solid electrolyte composition comprising: a crosslinked polymer of a cyclic compound having a siloxane bond; and an inorganic solid electrolyte which includes a metal belonging to Group I or II of the periodic table and has an ion-conducting property respectively.

<25> The solid electrolyte composition according to <24>, further comprising: a crosslinking agent.

<26> The solid electrolyte composition according to <24> or <25>, further comprising: a thermal radical polymerization initiator or a thermal cationic polymerization initiator as a crosslinking accelerator.

<27> The solid electrolyte composition according to any one of <24> to <26>, in which surfaces of particles of the inorganic solid electrolyte are coated with the crosslinked polymer of the cyclic compound having a siloxane bond.

<28> A method for producing a solid electrolyte composition, comprising: a step of producing a mixture by mixing a crosslinked polymer of a cyclic compound having a siloxane bond and particles of an inorganic solid electrolyte which includes a metal belonging to Group I or II of the periodic table and has an ion-conducting property in a hydrocarbon solvent or a halogenated hydrocarbon solvent; and a step of coating surfaces of the particles of the inorganic solid electrolyte with the crosslinked polymer of the cyclic compound having a siloxane bond by drying the mixture.

<29> An electrode sheet for a battery obtained by forming a film of the solid electrolyte composition according to any one of <24> to <27> on a collector.

<30> A method for manufacturing an electrode sheet for a battery, comprising: forming a film of the solid electrolyte composition according to any one of <24> to <27> on a collector.

<31> A method for manufacturing an all solid-state secondary battery, comprising: manufacturing an all solid-state secondary battery by way of the method for manufacturing an electrode sheet for a battery according to <30>.

In the all solid-state secondary battery of the present invention, a crosslinked polymer of a cyclic compound having a siloxane bond is used in at least one of a positive electrode active material layer, an inorganic solid electrolyte layer, or a negative electrode active material layer, whereby it is possible to obtain excellent moisture resistance and excellent temporal stability and realize excellent ion conductivity.

The reasons for the above-described effects being realized are assumed as described below. The crosslinked polymer of the cyclic compound having a siloxane bond does not easily transmit water molecules due to the hydrophobilizing effect of siloxane and thus has an appropriate number of pores. Therefore, the crosslinked polymer of the cyclic compound having a siloxane bond transmits Li ions but does not easily transmit water molecules having a larger molecular size than metal ions (particularly, Li ions) belonging to Group I or II of the periodic table, whereby the above-described effects can be realized.

According to the method for producing a solid electrolyte composition, the method for manufacturing an electrode sheet for a battery, and a method for manufacturing an all solid-state secondary battery of the present invention, it is possible to preferably manufacture the solid electrolyte composition, the electrode sheet for a battery, and the all solid-state secondary battery which have been described above.

The above-described and other characteristics and advantages of the present invention will become more evident from the following description with appropriate reference to the accompanying drawings.

DESCRIPTION OF THE PREFERRED EMBODIMENTS

An all solid-state secondary battery of the present invention is an all solid-state secondary battery having a positive electrode active material layer, an inorganic solid electrolyte layer, and a negative electrode active material layer in this order, in which at least one layer thereof includes (A) crosslinked polymer of a cyclic compound having a siloxane bond and (B) inorganic solid electrolyte which includes a metal belonging to Group I or II of the periodic table and has an ion-conducting property.

Hereinafter, a preferred embodiment thereof will be described with reference to the accompanying drawings. Meanwhile, in the present specification, a "solid electrolyte composition" refers to a composition including a solid electrolyte of an inorganic compound.

Figure 1:
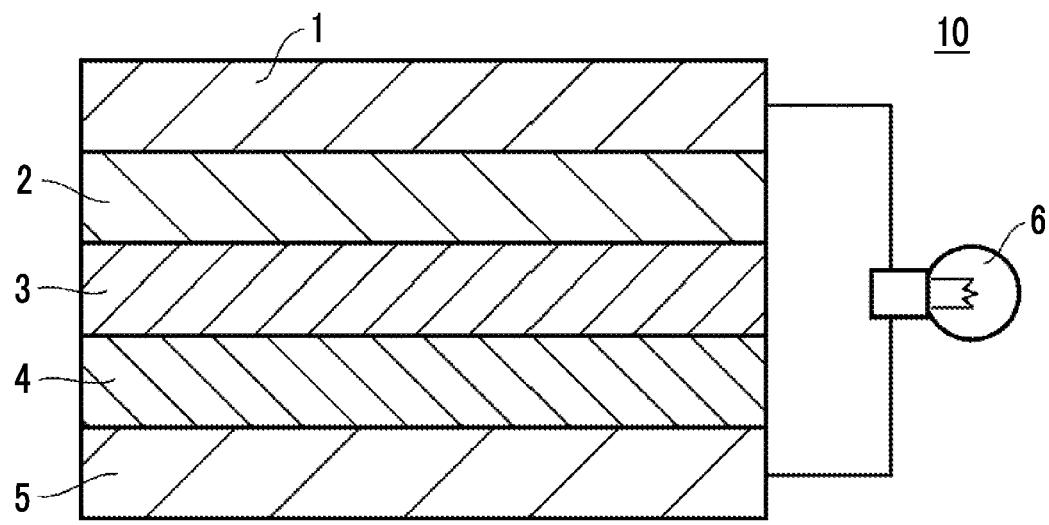
FIG. 1 is a cross-sectional view illustrating a schematic all solid-state lithium ion secondary battery according to a preferred embodiment of the present invention.

FIG. 1 is a cross-sectional view schematically illustrating an all solid-state secondary battery (lithium ion secondary battery) according to a preferred embodiment of the present invention. An all solid-state secondary battery 10 of the present embodiment has a negative electrode collector 1, a negative electrode active material layer 2, an inorganic solid electrolyte layer 3, a positive electrode active material layer 4, and a positive electrode collector 5 in this order from the negative electrode side. The respective layers are in contact with each other and have a laminated structure. Since the above-described structure is employed, during charging, electrons (e) are supplied to the negative electrode side, and lithium ions (Li$^+$) are accumulated on the negative electrode side. On the other hand, during discharging, the lithium ions (Li$^+$) accumulated in the negative electrode return to the positive electrode side, and electrons are supplied to an operation section 6. In the example illustrated in the drawing, an electric bulb is employed as the operation section 6 and is turned on by means of discharging.

The thicknesses of the positive electrode active material layer 4 and the negative electrode active material layer 2 can be determined depending on the intended battery capacity. When the dimensions of ordinary elements are taken into account, the thicknesses are preferably 1 μm or more and more preferably 3 μm or more. The upper limit thereof is preferably 1,000 μm or less and more preferably 400 μm or less.

On the other hand, the inorganic solid electrolyte layer 3 is desirably as thin as possible while preventing short-circuiting between the positive electrode and the negative electrode. In order to significantly develop the effects of the present invention, the thickness of the inorganic solid electrolyte layer 3 is preferably 1 μm or more and more preferably 3 μm or more. The upper limit thereof is preferably 1,000 μm or less and more preferably 400 μm or less. When the thickness of the inorganic solid electrolyte layer is set in the above-described range, the actions and effects of the crosslinked polymer of the cyclic compound having a siloxane bond can be effectively developed without short-circuiting the positive electrode and the negative electrode.

In FIG. 1, as described above, a laminate made up of the collectors, the active material layers, and the solid electrolyte layer is referred to as the "all solid-state secondary battery"; however, in the production of batteries, all solid-state secondary batteries (for example, coin batteries, laminate batteries, and the like) may be produced by storing this laminate as an electrode sheet for a secondary battery in a chassis (case).

<Solid Electrolyte Composition>

A solid electrolyte composition of the present invention includes (A) crosslinked polymer of a cyclic compound having a siloxane bond and (B) inorganic solid electrolyte which includes a metal belonging to Group I or II of the periodic table and has an ion-conducting property respectively. (A) and (B) will be described below in detail.

The solid electrolyte composition of the present invention is preferably used as a constituent material of the negative electrode active material layer, the positive electrode active material layer, and the inorganic solid electrolyte layer and more preferably used as a constituent material of all of the negative electrode active material layer, the positive electrode active material layer, and the inorganic solid electrolyte layer.

Particularly, since the inorganic solid electrolyte is used as an electrolyte, (A) crosslinked polymer of the cyclic compound having a siloxane bond in the present invention can be directly adsorbed to or (ionically or electronically) interact with the surfaces of particles of the inorganic solid electrolyte, unlike an electrolytic solution or an organic solid electrolyte, whereby effective coating becomes possible.

(Inorganic Solid Electrolyte)

The inorganic solid electrolyte refers to a solid electrolyte made of an inorganic substance, and the solid electrolyte refers to a solid-form electrolyte capable of migrating ions in the electrolyte. Since the inorganic solid electrolyte does not include an organic substance as a main ion-conducting material, the inorganic solid electrolyte is clearly differentiated from organic solid electrolytes (high-molecular-weight electrolytes represented by PEO or the like, organic electrolyte salts which are represented by LiTFSI and the like and are organic salts of ions of a metal belonging to Group I or II of the periodic table). In addition, the inorganic solid electrolyte has a solid form in a steady state and thus, generally, is not dissociated or liberated into cations or anions. For this reason, the inorganic solid electrolyte is also clearly differentiated from inorganic electrolyte salts (LiPF$_6$, LiBF$_4$, LiFSl, LiCl, and the like) which are inorganic salts of ions of a metal belonging to Group I or II of the periodic table which are dissociated or liberated into cations or anions in electrolytic solutions or polymers. The inorganic solid electrolyte is not particularly limited as long as the inorganic solid electrolyte has a property of conducting ions of a metal belonging to Group I or II of the periodic table and, generally, does not have an electron-conducting property.

In the present invention, the inorganic solid electrolyte has a property of conducting ions of a metal belonging to Group I or II of the periodic table. For the inorganic solid electrolyte, it is possible to appropriately select and use a solid electrolyte material that is applied to this kind of products. Representative examples of the inorganic solid electrolyte include (i) sulfide-based inorganic solid electrolytes and (ii) oxide-based inorganic solid electrolytes, and, in the present invention, both kinds of inorganic solid electrolytes are preferred.

(i) Sulfide-Based Inorganic Solid Electrolyte

The sulfide-based inorganic solid electrolyte contains sulfur (S), has a property of conducting ions of a metal belonging to Group I or II of the periodic table, and preferably has an electron-insulating property. The sulfide-based inorganic solid electrolyte preferably contains at least Li, S, or P as elements and has a property of conducting lithium ions, and may include elements other than Li, S, and P depending on purposes or cases.

Examples thereof include lithium ion-conductive inorganic solid electrolytes having a composition represented by Formula (S-E) below.

Formula (S-E)

In Formula (S-E), L$^{aa}$ represents an element selected from Li, Na, and K and is preferably Li. M$^{aa}$ represents an element selected from B, Zn, Sn, Si, Cu, Ga, Sb, Al, and Ge, and, among these, is preferably B, Sn, Si, Al, or Ge and more preferably Sn, Al, or Ge. A$^{aa}$ represents I, Br, Cl, or F and is preferably I or Br and particularly preferably 1. a1 to e1 represent the compositional ratios of the respective elements, and a1:b1:c1:d1:e1 satisfies 1 to 12:0 to 1:1:2 to 12:0 to 5. Furthermore, a1 is preferably 1 to 9 and more preferably 1.5 to 4. b1 is preferably 0 to 0.5. Furthermore, d1 is preferably 3 to 7 and more preferably 3.25 to 4.5. Furthermore, e1 is preferably 0 to 3 and more preferably 0 to 1.

In Formula (S-E), regarding the compositional ratio of $L^{aa}$, $M^{aa}$, P, S, and $A^{aa}$, it is preferable that b1 and e1 are zero, it is more preferable that b1 and e1 are zero and the proportions (a1:c1:d1) of a1, c1, and d1 are 1 to 9:1:3 to 7, and it is still more preferable that b1 and e1 are zero and a1:e1:d1 are 1.5 to 4:1:3.25 to 4.5. The compositional ratio of the respective elements can be controlled by adjusting the amount of a raw material compound blended to manufacture the sulfide-based inorganic solid electrolyte as described below.

The sulfide-based inorganic solid electrolyte may be amorphous (glassy) or crystalline (glassy ceramic) or may be only partially crystalline. For example, it is possible to use Li—P—S-based glass containing Li, P, and S or Li—P—S-based glass ceramics containing Li, P, and S.

The sulfide-based inorganic solid electrolyte can be manufactured by means of [1] a reaction between lithium sulfide ($Li_2S$) and phosphorus sulfide (for example, diphosphorus pentasulfide ($P_2S_5$)), [2] a reaction between lithium sulfide and at least one of a single phosphorus body or a single sulfur body, or [3] a reaction among lithium sulfide, phosphorus sulfide (for example, diphosphorus pentasulfide ($P_2S_5$)), and at least one of a single phosphorus body or a single sulfur body.

In the Li—P—S-based glass and the Li—P—S-based glass ceramics, the proportions of $Li_2S$ and $P_2S_5$ are preferably 65:35 to 85:15 and more preferably 68:32 to 77:23 in terms of the molar ratio between $Li_2S$ and $P_2S_5$. When the proportions of $Li_2S$ and $P_2S_5$ are set in the above-described range, it is possible to provide a high lithium ion conductivity. Specifically, it is possible to provide a lithium ion conductivity of preferably $1 \times 10^{-4}$ S/cm or higher and more preferably $1 \times 10^{-3}$ S/cm or higher. There is no particular upper limit thereof; however, realistically, the upper limit is $1 \times 10^{-1}$ S/cm or lower.

Specific examples of the compound include compounds obtained using a raw material composition containing, for example, $Li_2S$ and a sulfide of an element of Groups 13 to 15. Specific examples thereof include $Li_2S$—$P_2S_5$, $Li_2S$—$LiBr$—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SnS$, $Li_2S$—$P_2S_5$—$Al_2S_3$, $Li_2S$—$GeS_2$, $Li_2S$—$GeS_2$—$ZnS$, $Li_2S$—$Ga_2S_3$, $Li_2S$—$GeS2$-$Ga_2S_3$, $Li_2S$—$GeS_2$—$P_2S_5$, $Li_2S$—$GeS_2$—$Al_2S_3$, $Li_2S$—$Al_2S_3$, $Li_2S$—$SiS_2$—$Al_2S_3$, $Li_2S$—$SiS_2$—$P_2S_5$, $Li_2S$—$SiS_2$—$LiI$, $Li_2S$—$SiS_2$—$Li_4SiO_4$, $Li_2S$—$SiS_2$—$Li_3PO_4$, $Li_{10}GeP_2S_{12}$, and the like. Among these, a crystalline, amorphous, or crystalline/amorphous-mixed raw material composition made of $Li_2S$—$P_2S_5$, $Li_2S$—$GeS_2$—$Ga_2S_3$, $Li_2S$—$SiS_2$—$P_2S_5$, $Li_2S$—$SiS_2$—$Li_4SiO_4$, $Li_2S$—$SiS_2$—$Li_3PO_4$, $Li_2S$—$Li_2O$—$P_2S_5$, $Li_2S$—$Li_3PO_4$—$P_2S_5$, $Li_2S$—$GeS_2$—$P_2S_5$, or $Li_{10}GeP_2S_{12}$ preferably has a favorable property of conducting lithium ions.

Examples of a method for synthesizing a sulfide solid electrolyte material using the above-described raw material composition include an amorphization method. Examples of the amorphization method include a mechanical milling method and a melting and quenching method, and, among these, the mechanical milling method is preferred since treatments become possible at normal temperature, and manufacturing steps can be simplified.

(ii) Oxide-Based Inorganic Solid Electrolyte

The oxide-based inorganic solid electrolyte contains oxygen (O), has a property of conducting ions of a metal belonging to Group I or II of the periodic table, and preferably has an electron-insulating property.

Specific examples of the compound include $Li_{xa}La_{ya}TiO_3$ [xa satisfies $0.3 \leq xa \leq 0.7$, and ya satisfies $0.3 \leq ya \leq 0.7$] (LLT), $Li_{xb}La_{yb}Zr_{zb}M^{bb}{}_{mb}O_{nb}$ ($M^{bb}$ is at least one element of Al, Mg, Ca, Sr, V, Nb, Ta, Ti, Ge, In, or Sn, xb satisfies $5 \leq xb \leq 10$, yb satisfies $1 \leq yb \leq 4$, zb satisfies $1 \leq zb \leq 4$, mb satisfies $0 \leq mb \leq 2$, and nb satisfies $5 \leq nb \leq 20$), $Li_{xc}B_{yc}M^{cc}{}_{zc}O_{nc}$ ($M^{cc}$ is at least one element of C, S, Al, Si, Ga, Ge, In, or Sn, xc satisfies $0 \leq xc \leq 5$, yc satisfies $0 \leq yc \leq 1$, zc satisfies $0 \leq zc \leq 1$, and nc satisfies $0 \leq nc \leq 6$), $Li_{xd}(Al, Ga)_{yd}(Ti, Ge)_{zd}Si_{ad}P_{md}O_{nd}$ (here, $1 \leq xd \leq 3$, $0 \leq yd \leq 1$, $0 \leq zd \leq 2$, $0 \leq ad \leq 1$, $1 \leq md \leq 7$, and $3 \leq nd \leq 13$), $Li_{(3-2xe)}M^{ee}{}_{xe}D^{ee}O$ (xe represents a number of 0 to 0.1, $M^{ee}$ represents a divalent metal atom, and $D^{ee}$ represents a halogen atom or a combination of two or more halogen atoms), $Li_{xf}Si_{yf}O_{zf}$ ($1 \leq xf \leq 5$, $0 \leq yf \leq 3$, and $1 \leq zf \leq 10$), $Li_{xg}S_{yg}O_{zg}$ ($1 \leq xg \leq 3$, $0 < yg \leq 2$, and $1 \leq zg \leq 10$), $Li_3BO_3$—$Li_2SO_4$, $Li_2O$—$B_2O_3$—$P_2O_5$, $Li_2O$—$SiO_2$, $Li_6BaLa_2Ta_2O_{12}$, $Li_3PO_{(4-3/2w)}N_w$ (w is $w < 1$), $Li_{3.5}Zn_{0.25}GeO_4$ having a lithium super ionic conductor (LISICON)-type crystal structure, $La_{0.55}Li_{0.35}TiO_3$ having a perovskite crystal structure, $LiTi_2P_3O_{12}$ having a natrium super ionic conductor (NASICON)-type crystal structure, $Li_{(1+xh+yh)}(Al, Ga)_{xh}(Ti, Ge)_{(2-xh)}Si_{yh}P_{(3-yh)}O_{12}$ (here, $0 \leq xh \leq 1$, and $0 \leq yh \leq 1$), $Li_7La_3Zr_2O_{12}$ (LLZ) having a garnet-type crystal structure, and the like. In addition, phosphorus compounds including Li, P, and O are also desirable. Examples thereof include lithium phosphate ($Li_3PO_4$), LiPON obtained by substituting some of oxygen atoms in lithium phosphate with nitrogen atoms, $LiPOD^1$ ($D^1$ is at least one selected from Ti, V, Cr, Mn, Fe, Co, Ni, Cu, Zr, Nb, Mo, Ru, Ag, Ta, W, Pt, Au, and the like), and the like. In addition, $LiA^1ON$ ($A^1$ is at least one selected from Si, B, Ge, Al, C, Ga, and the like) and the like can also be preferably used.

In the present invention, $Li_{xa}La_{ya}TiO_3$, $Li_{xb}La_{yb}Zr_{zb}M^{bb}{}_{mb}O_{nb}$, $Li_{3.5}Zn_{0.25}GeO_4$, $LiTi_2P_3O_{12}$, $Li_{(1+xh+yh)}(Al, Ga)_{xh}(Ti, Ge)_{(2-xh)}Si_{yh}P_{(3-yh)}O_{12}$, $Li_3PO_4$, LiPON, $LiPOD^1$, $LiA^1ON$, $Li_{xc}B_{yc}M^{cc}O_{nc}$, $Li_{(3-2xe)}M^{ee}{}_{xe}D^{ee}O$, $Li_{xf}Si_{yf}O_{zf}$, and $Li_{xg}S_{yg}O_{zg}$ are more preferred.

In addition, sulfide-based inorganic solid electrolytes having the composition represented by Formula (S-E) are also preferred.

The volume-average particle diameter of the inorganic solid electrolyte is not particularly limited, but is preferably 0.01 μm or larger and more preferably 0.1 μm or larger. The upper limit thereof is preferably 100 μm or smaller and more preferably 50 μm or smaller.

The volume-average particle diameter of the inorganic solid electrolyte is measured in the following order.

The inorganic solid electrolyte is diluted using water (heptane in a case in which the inorganic solid electrolyte is a substance unstable to water) in a 20 ml sample bottle, thereby preparing 1% by mass of a dispersion liquid. A dispersion liquid specimen after the dilution is irradiated with 1 kHz ultrasonic waves for ten minutes and is immediately used for testing. This dispersion liquid specimen is used, a laser diffraction/scattering particle size analyzer LA-920 (trade name, manufactured by Horiba Ltd.) is used, and data are imported 50 times using a silica cell for measurement at a temperature of 25° C., thereby obtaining volume-average particle diameters. For other detailed conditions and the like, description in JIS Z8828:2013 "Particle size analysis-Dynamic light scattering (DLS)" is referred to. Five specimens are produced every level, and the average values are employed.

The method for measuring the average-volume particle size is identical even for inorganic solid electrolytes coated with at least one cyclic compound having a siloxane bond and fine solid particles of positive or negative electrode active materials and the like.

The concentration of the inorganic solid electrolyte in the solid components in the solid electrolyte composition is preferably 5 parts by mass or more, more preferably 10 parts by mass or more, and particularly preferably 20 parts by mass or more with respect to 100 parts by mass of the total solid components when satisfaction of both battery performance and an effect of reducing and maintaining interface resistance is taken into account. From the same viewpoint, the upper limit thereof is preferably 99.9 parts by mass or less, more preferably 99.5 parts by mass or less, and particularly preferably 99 parts by mass or less.

However, when the inorganic solid electrolyte is used together with a positive electrode active material or negative electrode active material described below, the total concentration is preferably in the above-described range.

The inorganic solid electrolytes may be used singly or in a combined form.

<Crosslinked Polymer of Cyclic Compound Having Siloxane Bond>

In the present invention, the solid electrolyte composition that is used to produce all solid-state secondary batteries includes a crosslinked polymer of a cyclic compound having a siloxane bond.

<Cyclic Compound Having Siloxane Bond>

First, a monomer structure for obtaining the crosslinked polymer of the cyclic compound having a siloxane bond in the present invention will be described.

The cyclic compound having a siloxane bond may have any cyclic structure. For example, the structure may be a single ring, a crosslinking ring (including a ladder-type structure), a Spiro ring, a basket-structured ring, or a ring in which multiple rings are randomly bonded to each other.

In the present invention, a monocyclic siloxane compound and a cyclic siloxane compound called silsesquioxane are preferred.

Here, "silsesquioxane" refers to a network-type polymer or polyhedral cluster having a $(RSiO_{1.5})_n$ structure which can be obtained by hydrolyzing a trifunctional silane. Each silicon atom is bonded to three oxygen atoms, and each oxygen atom is bonded to two silicon atoms. Since the ratio of the number of oxygen atoms to the number of silicon atoms is 1.5, the cyclic siloxane compound is called silsesquioxane with a meaning that the cyclic siloxane compound includes 1.5 (sesqui) oxygen atoms.

In the present invention, the basket-shaped structure refers to a "basket"-like structure in which, when envisioned in a stereoscopic model structure, at least one ring is located on the ring plane or in the ring plane of at least one different ring, these rings are connected to each other through two or more linking groups (—O—, —O—Si(R)$_2$—, or the like), and inside spaces are stereoscopically present in the entire molecule. For this basket-shaped structure, the volume (the volume of spaces in the molecule which are surrounded by the rings) is determined by multiple rings formed of covalently-bonded atoms, and points located in the volume are not capable of moving away from the volume without passing through the rings.

In the present invention, among these cyclic siloxane compounds, the monocyclic siloxane compound and the basket-structured silsesquioxane compound are more preferred, and compounds represented by Formula (1) below or basket-shaped silsesquioxane compound represented by Formula (2) below are still more preferred.

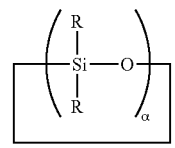

Formula (1)

Formula (2)

In Formula (1) and Formula (2), R's each independently represent a hydrogen atom or a monovalent organic group. The multiple R's may be identical to or different from each other. Here, at least two R's are monovalent organic groups having a polymerizable group. α represents an integer of 3 to 6. β is represents an integer of 8 to 16.

The monovalent organic group as R may be any organic group as long as the group can be bonded to a silicon atom. Examples of the above-described monovalent organic group include the following groups.

Alkyl groups (preferably having 1 to 30 carbon atoms and more preferably having 1 to 20 carbon atoms; for example, methyl, ethyl, isopropyl, tert-butyl, pentyl, heptyl, 1-ethylpentyl, benzyl, 2-ethoxyethyl, 1-carboxymethyl, trifluoromethyl, and the like), alkenyl groups (preferably having 2 to 30 carbon atoms and more preferably having 2 to 20 carbon atoms; for example, vinyl, allyl, oleyl and the like), alkynyl groups (preferably having 2 to 30 carbon atoms, more preferably having from 2 to 20 carbon atoms; for example, ethynyl, butadienyl, phenylethynyl, and the like), cycloalkyl groups (preferably having 3 to 30 carbon atoms and more preferably having 3 to 20 carbon atoms; for example, cyclopropyl, cyclopentyl, cyclohexyl, 4-methylcyclohexyl, and the like), cycloalkenyl groups (preferably having 5 to 30 carbon atoms and more preferably having 5 to 20 carbon atoms; for example, cyclopentenyl, cyclohexenyl, and the like), aryl groups (preferably having 6 to 26 carbon atoms and more preferably having 6 to 18 carbon atoms; for example, phenyl, 1-naphthyl, 4-methoxyphenyl, 2-chlorophenyl, 3-methylphenyl, and the like), heterocyclic groups (preferably having 2 to 30 carbon atoms and more preferably having 2 to 20 carbon atoms; heterocyclic groups of a 5- or 6-membered ring having at least one of an oxygen atom, a sulfur atom, or a nitrogen atom are more preferred; including an epoxy group and an oxetanyl group; for example, 2-pyridyl, 4-pyridyl, 2-imidazolyl, 2-benzimidazolyl, 2-thiazolyl, 2-oxazolyl, and the like), alkoxy groups (preferably having 1 to 30 carbon atoms and more preferably having 1 to 20 carbon atoms; for example, methoxy, ethoxy, isopropyloxy, benzyloxy, and the like), alkenyloxy groups (preferably having 2 to 30 carbon atoms and more preferably having 2 to 20 carbon atoms; for example, vinyloxy, allyloxy, and the like), alkynyloxy groups (preferably having 2 to 30 carbon atoms and more preferably having 2 to 20 carbon atoms; for example, 2-propenyloxy, 4-butynyloxy, and the like), cycloalkyloxy groups (preferably having 3 to 30 carbon atoms and more preferably having 3 to 20 carbon atoms; for example, cyclopropyloxy, cyclopentyloxy, cyclohexyloxy, 4-methyl-cyclohexyloxy, and the like), aryloxy groups (preferably having 6 to 26 carbon atoms and more preferably having 6 to 18 carbon atoms; for example, phenoxy, 1-naphthyloxy, 3-methylphenoxy, 4-methoxyphenoxy, and the like), heterocyclic oxy groups (preferably having 2 to 30 carbon atoms and more preferably having 2 to 20 carbon atoms; for example, imidazolyloxy, benzimidazolyloxy, thiazolyloxy, benzothiazolyloxy, triazinyloxy, and purinyloxy), alkoxycarbonyl groups (preferably having 2 to 30 carbon atoms and more preferably 2 to 20 carbon atoms; for example, ethoxycarbonyl, 2-ethylhexyloxycarbonyl, and the like), cycloalkoxy carbonyl groups (preferably having 4 to 30 carbon atoms and more preferably 4 to 20 carbon atoms; for example, cyclopropyloxycarbonyl, cyclopentyloxycarbonyl, cyclohexyloxycarbonyl, and the like), aryloxycarbonyl groups (preferably having 6 to 20 carbon atoms; for example, phenyloxycarbonyl, naphthyloxycarbonyl, and the like), amino groups (preferably having 0 to 30 carbon atoms and more preferably having 0 to 20 carbon atoms and including an alkylamino group, an alkenylamino group, an alkynylamino group, a cycloalkylamino group, a cycloalkenylamino group, an acylamino group, or a heterocyclicamino group; for example, amino, N,N-dimethylamino, N,N-diethylamino, N-ethylamino, N-allylamino, N-(2-propynyl)amino, N-cyclohexylamino, N-cyclohexenylamino, anilino, pyridylamino, imidazolylamino, benzimidazolylamino, thiazolylamino, benzothiazolylamino, triazinylamino, and the like), sulfamoyl groups (preferably having 0 to 30 carbon atoms and more preferably 0 to 20 carbon atoms; sulfamoyl groups of alkyl, cycloalkyl, or aryl are preferred; for example, N,N-dimethylsulfamoyl, N-cyclohexylsulfamoyl, N-phenylsulfamoyl, and the like), acyl groups (preferably having 1 to 30 carbon atoms and more preferably having 1 to 20 carbon atoms; for example, acetyl, cyclohexylcarbonyl, benzoyl, and the like), acyloxy groups (preferably having 1 to 30 carbon atoms and more preferably 1 to 20 carbon atoms; for example, acetyloxy, cyclohexylcarbonyloxy, benzoyloxy, and the like), carbamoyl groups (preferably having 1 to 30 carbon atoms and more preferably 1 to 20 carbon atoms, carbamoyl groups of alkyl, cycloalkyl, or aryl are preferred; for example, N,N-dimethylcarbamoyl, N-cyclohexylcarbamoyl, N-phenylcarbamoyl, and the like), carbamoyloxy groups (preferably having 1 to 30 carbon atoms and more preferably having 1 to 20 carbon atoms, carbamoyloxy groups of alkyl, cycloalkyl, or aryl are preferred; for example, N,N-dimethylcarbamoyloxy, N-cyclohexylcarbamoyloxy, N-phenylcarbamoyloxy, and the like), alkoxycarbonylamino groups (preferably having 2 to 30 carbon atoms and more preferably 2 to 20 carbon atoms; methoxycarbonylamino, ethoxycarbonylamino, isopropoxycarbonylamino, 2-ethylhexyloxycarbonylamino, and the like), acylamino groups (acylamino groups preferably having 1 to 30 carbon atoms and more preferably having 1 to 20 carbon atoms; for example, acetylamino, cyclohexylcarbonylamino, benzoylamino, and the like), sulfonamido groups (preferably having 0 to 30 carbon atoms and more preferably having 0 to 20 carbon atoms, sulfonamide groups of alkyl, cycloalkyl, or aryl are preferred; for example, methanesulfonamide, benzenesulfonamide, N-methylmethanesulfonamide, N-cyclohexylsulfonamide, N-ethylbenzenesulfonamide, and the like), alkylthio groups (preferably having 1 to 30 carbon atoms and more preferably having 1 to 20 carbon atoms; for example, methylthio, ethylthio, isopropylthio, benzylthio, and the like), cycloalkylthio groups (preferably 3 to 30 carbon atoms and more preferably having 3 to 20 carbon atoms; for example, cyclopropylthio, cyclopentylthio, cyclohexylthio, 4-methylcyclohexylthio, and the like), arylthio groups (preferably having 6 to 26 carbon atoms and more preferably 6 to 18 carbon atoms; for example, phenylthio, 1-naphthylthio, 3-methylphenylthio, 4-methoxyphenylthio, and the like), alkyl, cycloalkyl, or arylsulfonyl groups (preferably having 1 to 30 carbon atoms and more preferably 1 to 20 carbon atoms; for example, methylsulfonyl, ethylsulfonyl, cyclohexylsulfonyl, benzenesulfonyl, and the like), silyl groups (preferably having 1 to 30 carbon atoms and more preferably 1 to 20 carbon atoms; alkyl, aryl, alkoxy, and aryloxy-substituted silyl groups are preferred; for example, triethylsilyl, triphenylsilyl, diethylbenzylsilyl, dimethylphenylsilyl, and the like), silyloxy groups (preferably having 1 to 30 carbon atoms and more preferably having 1 to 20 carbon atoms; alkyl, aryl, alkoxy, and aryloxy-substituted silyloxy groups are preferred; for example, triethylsilyloxy, triphenylsilyloxy, diethylbenzylsilyloxy, dimethylphenylsilyloxy, and the like), hydroxy groups, cyano groups, nitro groups, halogen atoms (for example, a fluorine atom, a chlorine atom, a bromine atom, an iodine atom, and the like), carboxy groups, sulfo groups, phosphate groups, phosphonyl groups, phosphoryl groups, and boric acid groups.

Each of the above-described groups may be further substituted with the above-described group.

Meanwhile, in a case in which the groups include an alkyl group, an alkenyl group, or the like, these groups may have a linear shape or a branched shape and may or may not be substituted. In addition, in a case in which the monovalent organic groups include an aryl group, a heterocyclic group, or the like, these groups may be a single ring or a condensed ring and may or may not be substituted.

The cyclic compound having a siloxane bond has at least two groups having a polymerizable group. When the cyclic compound having a siloxane bond has two or more groups having a polymerizable group, crosslinking becomes possible (when the cyclic compound having a siloxane bond has one or more pairs of groups having a functional group that crosslinking-reacts with each other, crosslinking becomes possible). In such a case, three-dimensional network-shaped crosslinked polymers can be formed in a polymerization step described below. Polymerizable functional groups remaining in the polymerization step further form crosslinking due to a heating step, and thus it is possible to produce coating layers having excellent heat resistance and an excellent ion-conducting property. The heating step may be carried out during the drying of the inorganic solid electrolyte, during the production of electrode sheets obtained by forming a coated film using a composition, or after the production of cells.

The heating temperature is preferably 100° C. or higher, more preferably 150° C. or higher, and most preferably 200° C. or higher.

The group having a polymerizable group refers to a substituent that is bonded to a silicon atom, that is, the monovalent organic group as R in Formula (1) or Formula (2) which has a polymerizable group, and the monovalent organic group as R, which is a substituent, may be a polymerizable group or a group having a polymerizable group.

Here, the group having a polymerizable group, that is, a monovalent organic group substituted with a polymerizable group preferably has a polymerizable group at the terminal of the group.

More specifically, an alkyl group, a cycloalkyl group, an alkenyl group, an aryl group, or a heteroaryl group which is substituted with a polymerizable group is preferred, and an alkyl group having 1 to 30 carbon atoms, an alkylene group having 1 to 30 carbon atoms, an alkenyl group having 2 to 30 carbon atoms, a cycloalkyl group having 3 to 30 carbon atoms, an aryl group having 6 to 18 carbon atoms, or a heteroaryl group having 4 to 12 carbon atoms which is substituted with a polymerizable group is more preferred.

Examples of the above-described polymerizable group include ethylenic unsaturated groups capable of forming a chemical bond by means of radical polymerization, epoxy groups capable of forming a chemical bond by means of cationic polymerization, oxetanyl groups, and the like.

The ethylenic unsaturated group is preferably a vinyl group, an allyl group, a (meth)acryloyl group, a (meth)acryloyloxy group, or a (meth)acrylamide group. Meanwhile, examples of the group having a polymerizable group include styryl groups in which a phenyl group is substituted with a vinyl group.

The polymerizable group forming a chemical bond by means of radical polymerization is preferably a vinyl group, a (meth)acryloyl group, a (meth)acryloyloxy group, or a (meth)acrylamide group.

Meanwhile, a (meth)acryloyl group is a collective name of an acryloyl group and a methacryloyl group and also refers to one of them or a mixture thereof. In addition, a (meth)acryloyloxy group and a (meth)acrylamide group are also collective names and refer to groups in the same manner as described above.

The polymerizable group forming a chemical bond by means of cationic polymerization is preferably an epoxy group.

Here, a group having an epoxy group is preferably -alkylene group-O—$CH_2$-epoxy group. Here, the number of carbon atoms in the alkylene group is preferably 1 to 10, more preferably 1 to 6, and still more preferably 1 to 3. Meanwhile, groups in which the alkylene group is an oxyalkylene group are also preferred.

In the crosslinked polymer of the cyclic compound having a siloxane bond in the present invention, for the purpose of protecting the inorganic solid electrolyte from water or oxidation and reduction, in addition to the groups having a crosslinkable group (a polymerizable group which is not yet crosslinking-polymerization-reacted), at least one R is preferably hydrophobic, and, for example, a substituent which enhances hydrophobicity or is highly hydrophobic is more preferably introduced into the cyclic compound having a siloxane bond.

A preferred group has a Log P of preferably 2 or higher and more preferably 2.5 or higher, which is obtained from a compound in which a hydrogen atom is substituted into an atomic bond of the above-described group or a group having a highly hydrophobic substituent.

Examples of the above-described group include saturated hydrocarbon groups, fluorine-substituted saturated hydrocarbon groups, and the like. Examples thereof include alkyl groups having 1 to 30 carbon atoms, alkylene groups having 1 to 30 carbon atoms, alkenyl groups having 2 to 30 carbon atoms, cycloalkyl groups having 3 to 30 carbon atoms, aryl groups having 6 to 18 carbon atoms, heteroaryl groups having 4 to 12 carbon atoms, and the like, and groups obtained by substituting a fluorine atom into the above-described groups are also preferred.

Here, Log P refers to the common logarithm of the partition coefficient P, is a property value indicating how a certain chemical substance is partitioned in the equilibrium of the two-phase system of oil (generally, 1-octanol) and water with quantitative numerical values, and is represented by the following expression.

$$\mathrm{Log}\ P = \mathrm{Log}(C_{oil}/C_{water})$$

In the above-described expression, $C_{oil}$ represents the molar concentration in the oil phase, and $C_{water}$ represents the molar concentration in the water phase. As the value of Log P positively increases from zero, the oil solubility enhances, and, as the value negatively increases, the water solubility enhances. Log P has an inverse correlation with the water solubility of the chemical substance and is widely used as a parameter for estimating hydrophilicity. In principle, the value of Log P needs to be actually measured in a partition experiment in consideration of the above-described definition, but the experiment takes an effort, and thus it is also effective to estimate the value of Log P from the structural formula.

Therefore, Log P which is the estimation value of Log P by means of calculation is frequently used.

In the present specification, the Log P value is a value calculated using ChemDraw Prover. 12.0 manufactured by CambridgeSoft Corp.

In the present invention, the crosslinked polymer of the cyclic compound having a siloxane bond is used to protect the surface of the inorganic solid electrolyte. For example, the crosslinked polymer of the cyclic compound having a siloxane bond is intended to protect the inorganic solid electrolyte from the influence of moisture created by the contact with the atmosphere or the influence of oxidation and reduction caused by the contact with the active material or a conduction aid. From this viewpoint, the crosslinked polymer of the cyclic compound having a siloxane bond in the present invention is preferably localized on the surface of the inorganic solid electrolyte. In addition, a polar group is more preferably introduced as a substituent in order to enhance the interaction between the crosslinked polymer of the cyclic compound having a siloxane bond and the inorganic solid electrolyte and thus improve the adsorption property.

Here, originally, siloxane is hydrophobic, but the polar group improves the wettability of the cyclic compound having a siloxane bond with the inorganic solid electrolyte, and furthermore, more effectively and efficiently adsorbs the cyclic compound having a siloxane bond to the surface of the inorganic solid electrolyte, whereby the cyclic compound having a siloxane bond protects the surface of the inorganic solid electrolyte. Therefore, it is possible to maintain the effects of the present invention for a long period of time.

R is preferably a monovalent organic group, and a monovalent organic group that is not the group having a polymerizable group is preferably a group below.

The monovalent organic group that is not the group having a polymerizable group is more preferably an alkyl group, a cycloalkyl group, an alkenyl group, an aryl group, or a heteroaryl group, and each of these groups may further have a substituent. Examples of the substituent include the groups exemplified as the monovalent organic group, and the substituent that is not the polymerizable group which is essential in the present invention is more preferably a fluorine atom, an alkoxy group, an alkylthio group, an alkylamino group, an arylamino group, an acyloxy group, an alkoxycarbonyl group, a carbamoyloxy group, an alkoxycarbonylamino group, a silyl group, an alkyl group, an aryl group, or a polar group.

Here, the number of carbon atoms in the alkyl group is preferably 1 to 30 and more preferably 1 to 10. The number of carbon atoms in the cycloalkyl group is preferably 3 to 30 and more preferably 3 to 12, and the number of carbon atoms in the alkenyl group is preferably 2 to 30 and more preferably 2 to 10. The number of carbon atoms in the aryl group is preferably 6 to 18 and more preferably 6 to 12, and the number of carbon atoms in the heteroaryl group is preferably 4 to 12.

As the preferred range of R, the preferred range of $R^{11}$ in Formula (Q-9) described below is also applied to R.

The polar group is preferably a group having a hetero atom, and the hetero atom is preferably a nitrogen atom, an oxygen atom, a sulfur atom, or a phosphorus atom. For the polar group, the Log P obtained from a compound in which a hydrogen atom is substituted into an atomic bond of the group is 1 or lower, more preferably 0 or lower, and still more preferably −0.5 or lower.

Among the above-exemplified groups, groups classified as electron-accepting groups, electron-donating groups, or disassociable groups are also preferred.

Among these, the polar group is preferably a carboxy group, a sulfo group, a phosphate group, a hydroxy group, $CON(R^N)_2$, a cyano group, $N(R^N)_2$, or a mercapto group.

Here, $R^N$ represents a hydrogen atom, an alkyl group, or an aryl group. The alkyl group as $R^N$ preferably has 1 to 10 carbon atoms, more preferably has 1 to 6 carbon atoms, and particularly preferably has 1 to 3 carbon atoms. The aryl group as $R^N$ preferably has 6 to 12 carbon atoms and more preferably has 6 to 10 carbon atoms.

Among these, a carboxy group is most preferred due to its excellent property of being adsorbed to the inorganic solid electrolyte.

In the present invention, the above-described preferred polar groups and polymerizable groups will be referred to as Group A as described below.

[Group A]
(Polar Group)
a carboxy group, a sulfo group, a phosphate group, a hydroxy group, $CON(R^N)_2$, a cyano group, $N(R^N)_2$, and a mercapto group
here, $R^N$ represents a hydrogen atom, an alkyl group, or an aryl group;
(Polymerizable Group)
an epoxy group, an oxetanyl group, a (meth)aciyloyl group, a (meth)acryloyloxy group, a (meth)acrylamide group, a vinyl group, and an allyl group.

In the present invention, among these, the polymerizable group is essential, but the monovalent organic group that is not the polymerizable group is preferably a group in which at least one of multiple R's has a polar group.

(Cyclic Siloxane Compound Having Single Cycle)

In the cyclic siloxane compound represented by Formula (1), α represents an integer of 3 to 6 and is preferably an integer of 3 to 5.

Meanwhile, in the present invention, any isomers in a stereoscopic structure may be used. For example, a chair-type isomer such as a 6-membered ring, a boat-type isomer, or a mixture thereof may be used.

The cyclic siloxane compound represented by Formula (1) is preferably a compound represented by any one of Formulae (H-1) to (H-3) below.

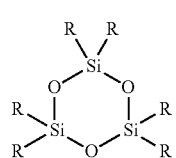

Formula (H-1)

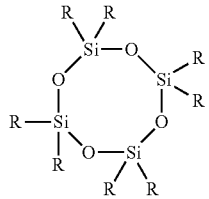

Formula (H-2)

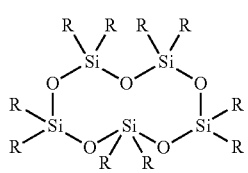

Formula (H-3)

In Formulae (H-1) to (H-3), R is identical to R in Formula (1), and the preferred range thereof is also identical thereto.

(Basket-Shaped Silsesquioxane Compound)

The basket-shaped silsesquioxane compound in the present invention is preferably a compound having a basket-shaped structure out of the compounds represented by Formula (2).

In the present invention, the basket-shaped silsesquioxane compounds may be used singly or jointly. Meanwhile, in a case in which multiple (two or more) basket-shaped silsesquioxane compounds are used, two compounds having the same basket shape may be used, or a compound having a basket shape and another compound having a different basket shape may be used respectively. In addition, a mixture of basket-shaped silsesquioxanes which have the same basic skeleton and have different groups bonded to silicon atoms may be used.

Films obtained using the basket-shaped silsesquioxane compound have superior ion-conducting property and exhibit superior heat resistance, moisture resistance, and the like. This is assumed to be because the molecular size of the basket structure can be freely adjusted using β in Formula (2), a size exclusion effect with which the films transmit metal ions but do not transmit water molecules is generated by setting β to an integer of 8 to 16, and, additionally, a surface energy effect with which water molecules repel each other due to hydrophobic siloxane bonds exerts.

β in Formula (2) is preferably 8, 10, 12, 14, or 16. Among these, β is more preferably 8, 10, or 12 since the obtained films exhibit superior ion-conducting property and superior moisture resistance and is more preferably 8 from the viewpoint of ease of synthesis.

In the present invention, the basket-shaped silsesquioxane compound represented by Formula (2) is more preferably a compound represented by any one of Formulae (Q-1) to (Q-8) below.

Formula (Q-1)
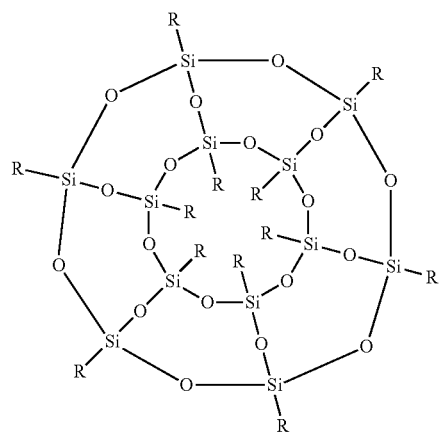
Formula (Q-2)
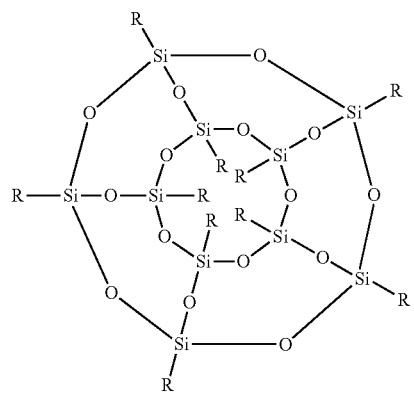
Formula (Q-3)
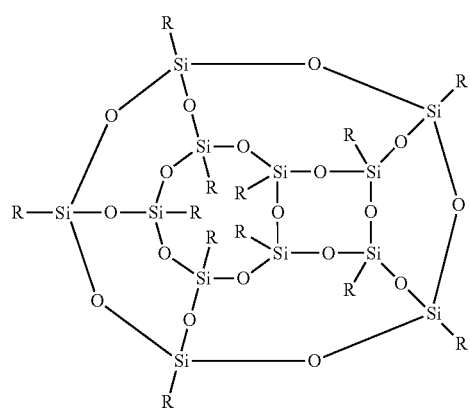
Formula (Q-4)
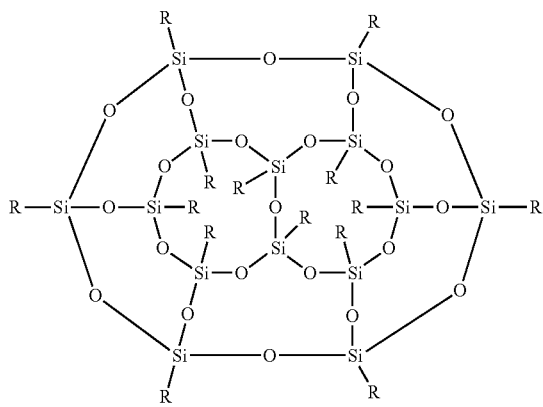
Formula (Q-5)
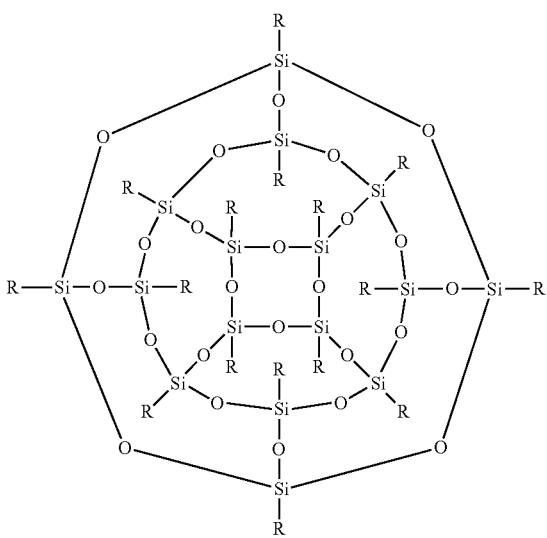
Formula (Q-6)
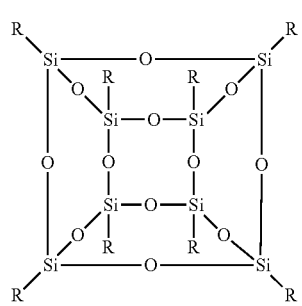

-continued

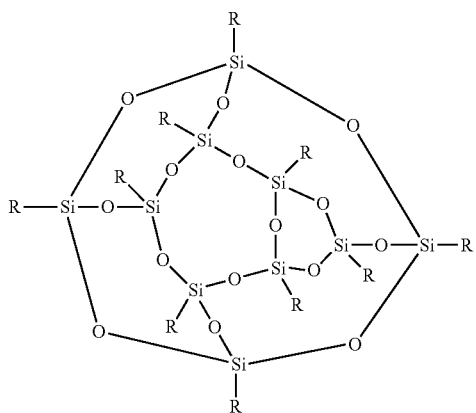

Formula (Q-7)

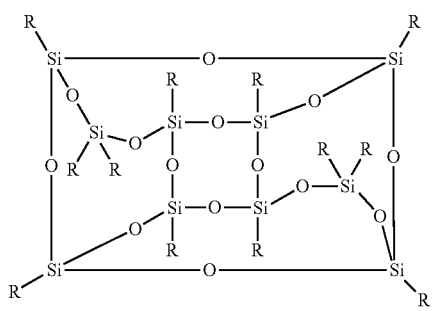

Formula (Q-8)

In Formulae (Q-1) to (Q-8), R is identical to R in Formula (1), and the preferred range thereof is also identical thereto.

Among compounds represented by Formulae (Q-1) to (Q-8), compounds represented by Formula (Q-6) is particularly preferred.

Among compounds represented by Formula (Q-6), preferred compounds are represented by Formula (Q-9) below.

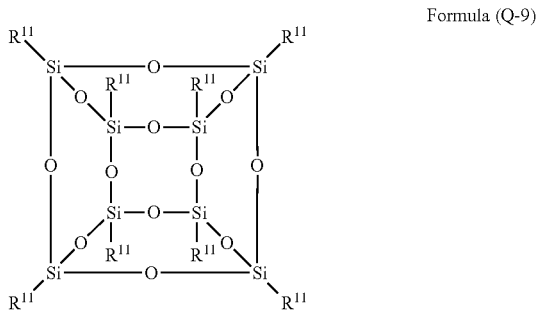

Formula (Q-9)

In Formula (Q-9), $R^{11}$ represents a group selected from Groups A1, A2, and A3 below. Here, at least two of the multiple $R^{11}$'s are groups selected from Group A2 below.

[Group A1]
a hydrogen atom, an alkyl group, a cycloalkyl group, an aryl group, a heteroaryl group, an alkyl group having a fluorine atom, and an aryl group having a fluorine atom

[Group A2]
a polymerizable group or a group having a polymerizable group at the terminal

[Group A3]
a group having a polar group at the terminal

Meanwhile, the polymerizable group and the polar group are identical to the polymerizable group and the polar group as R, and the preferred ranges thereof are also identical. In addition, the alkyl group, the cycloalkyl group, the aryl group, and the heteroaryl group are also identical to those as R, and the preferred ranges thereof are also identical.

The groups in Group A1 are preferably groups represented by Formula (5) below.

$$-L^1-X-L^2-R^{12}$$  Formula (5)

In Formula (5), $L^1$ represents an alkylene group having 1 to 6 carbon atoms or an arylene group having 6 to 10 carbon atoms, and $L^2$ represents an alkylene group having 1 to 10 carbon atoms which may be divided by a hetero atom in the middle or an arylene group having 6 to 10 carbon atoms. X represents $-Si(R^N)_2-$, $-N(R^N)-$, $-O-$, $-S-$, $-OC(=O)-$, $-C(=O)O-$, $-NHC(=O)O-$, or $-OC(=O)NH-$. Here, $R^N$ represents a hydrogen atom, an alkyl group, or an aryl group. The number of carbon atoms in the alkyl group as $R^N$ is preferably 1 to 10, more preferably 1 to 6, and particularly preferably 1 to 3. The number of carbon atoms in the aryl group as $R^N$ is preferably 6 to 12, more preferably 6 to 10, and particularly preferably 6 to 8. $R^{12}$ represents an alkyl group having a fluorine atom and 1 to 10 carbon atoms or an aryl group having a fluorine atom and 6 to 12 carbon atoms.

The polymerizable group in Group A2 is preferably a vinyl group, an allyl group, an epoxy group, an oxetanyl group, a methacryloyl group, an acryloyl group, a methacryloyloxy group, an acryloyloxy group, a methacrylamide group, an acrylamide group, or a styryl group.

The polar group in Group A3 is preferably a carboxy group, a sulfo group, a phosphate group, a hydroxy group, $N(R^N)_2$, or a mercapto group, and more preferably a carboxy group or $N(R^N)_2$.

Here, $R^N$ represents a hydrogen atom, an alkyl group, or an aryl group. $R^N$ is identical to $R^N$ in Formula (5).

The group having a polar group at the terminal in Group A3 is preferably a group represented by Formula (6) below.

$$-L^1-X-L^2-R^{13}$$  Formula (6)

In Formula (6), $L^1$ represents an alkylene group having 1 to 6 carbon atoms or an arylene group having 6 to 10 carbon atoms, and $L^2$ represents an alkylene group having 1 to 10 carbon atoms which may be divided by a hetero atom in the middle or an arylene group having 6 to 10 carbon atoms. X represents $-Si(R^N)_2-$, $-N(R^N)-$, $-O-$, $-S-$, $-OC(=O)-$, $-C(=O)O-$, $-NHC(=O)O-$, or $-OC(=O)NH-$. $R^{13}$ represents a carboxy group, a sulfo group, a phosphate group, a hydroxy group, $N(R^N)_2$, or a mercapto group. Here, $R^N$ represents a hydrogen atom, an alkyl group, or an aryl group. $R^N$ is identical to $R^N$ in Formula (5).

In the present invention, eight $R^{11}$'s preferably include at least one group selected from Group A1 and at least two groups selected from Group A2.

In the present invention, the eight $R^{11}$'s more preferably include at least one group selected from Group A1, at least two groups selected from Group A2, and at least one group selected from Group A3, respectively.

Here, when the total number of $R^{11}$'s present in a molecule is set to 100, the proportions of the number of $R^{11}$'s in Group A1, Group A2, and Group A3 are preferably 0 to 75:25 to 100:0 to 35, more preferably 25 to 65:25 to 70:1 to 30, and still more preferably 10 to 50:25 to 50:3 to 20 (Group A1:Group A2:Group A3).

The proportions of the number of $R^{11}$'s in the respective groups is preferably set in the above-described range since the effects of the present invention are effectively exhibited, and, furthermore, the effect of providing moisture resistance can be maintained for a long period of time without impairing the ion conductivity of the inorganic solid electrolyte.

As the basket-shaped silsesquioxane compound that is used in the present invention, basket-shaped silsesquioxane compounds that can be procured from Sigma-Aldrich Co., LLC. and Hybrid Plastics may be used. In addition, the basket-shaped silsesquioxane compound may be synthesized using a well-known method described in Polymers, 20, 67 to 85 (2008), Journal of Inorganic and Organometallic Polymers, 11 (3), 123 to 154 (2001), Journal of Organometallic Chemistry, 542, 141 to 183 (1997), Journal of Macromolecular Science A. Chemistry, 44 (7), 659 to 664 (2007), Chem. Rev., 95, 1409 to 1430 (1995), Journal of Inorganic and Organometallic Polymers, 11(3), 155 to 164 (2001), Dalton Transactions, 36 to 39 (2008), Macromolecules, 37 (23), 8517 to 8522 (2004), Chem. Mater., 8, 1250 to 1259 (1996), or the like.

<Crosslinked Polymer of Cyclic Compound Having Siloxane Bond>

In the present invention, the crosslinked polymer of (A) cyclic compound having a siloxane bond (hereinafter, in some cases, abbreviated as the crosslinked polymer) is used. Since at least two of the substituents in the cyclic compound having a siloxane bond which serves as a raw material are polymerizable groups, three-dimensional network-shaped polymers are formed. When a three-dimensional network-shaped polymer is produced, it is possible to strongly protect the surface of the solid electrolyte, and thus moisture resistance or temporal stability which is the effect of the present invention further improves.

(A) crosslinked polymer of the cyclic compound having a siloxane bond in the present invention is represented by Formula (3) or (4) below.

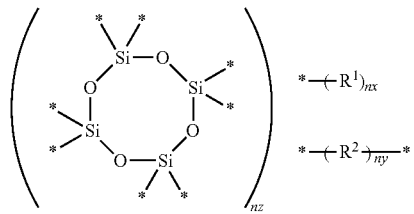

Formula (3)

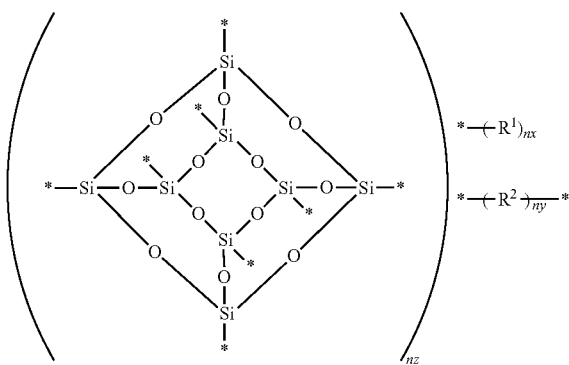

Formula (4)

In Formulae (3) and (4), $R^1$'s each independently represent a hydrogen atom or a monovalent organic group. $R^2$ represents a linking group at which the polymerizable groups in R are bonded to each other and which links a unit cyclic structure and a unit cyclic structure. * represents a linking position to a silicon atom. nz represents a number of 2 to 10,000. nx and ny represent the average number in the unit cyclic structure, nx is a number of 0 or more and lower than 6, ny represents a number of 2 to 8, and nx+ny=8 is satisfied.

Meanwhile, the unit cyclic structure refers to a structure in which nz is 1.

The monovalent organic group is an alkyl group, a cycloalkyl group, an alkenyl group, an aryl group, or a heteroaryl group which may be substituted with a fluorine atom, an alkoxy group, an alkylthio group, an alkylamino group, an arylamino group, an acyloxy group, an alkoxycarbonyl group, a carbamoyloxy group, an alkoxycarbonylamino group, a silyl group, an alkyl group, an aryl group, a polar group, or a polymerizable group.

The polar group and the polymerizable group are identical to the polymerizable group and the polar group in R, and preferred ranges thereof are also identical thereto.

Hereinafter, the property value of the crosslinked polymer and a method for manufacturing the same will be described.

The weight-average molecular weight ($M_w$) of the crosslinked polymer is not particularly limited, but is preferably $1.0 \times 10^3$ to $50 \times 10^4$, more preferably $1.0 \times 10^4$ to $45 \times 10^4$, still more preferably $3.5 \times 10^4$ to $40 \times 10^4$, particularly preferably $5.0 \times 10^4$ to $35 \times 10^4$, and most preferably $5.0 \times 10^4$ to $30 \times 10^4$.

The number-average molecular weight ($M_n$) of the crosslinked polymer is not particularly limited, but is preferably $0.5 \times 10^3$ to $35 \times 10^4$, more preferably $0.5 \times 10^4$ to $35 \times 10^4$, still more preferably $0.5 \times 10^4$ to $20 \times 10^4$, particularly preferably $1.5 \times 10^4$ to $20 \times 10^4$, and most preferably $2.5 \times 10^4$ to $15 \times 10^4$.

The Z+1-average molecular weight ($M_{z+1}$) of the crosslinked polymer is not particularly limited, but is preferably $1.5 \times 10^3$ to $65 \times 10^4$, more preferably $1.5 \times 10^4$ to $65 \times 10^4$, still more preferably $2.5 \times 10^4$ to $50 \times 10^4$, and most preferably $3.5 \times 10^4$ to $35 \times 10^4$.

When the weight-average molecular weight and the number-average molecular weight thereof are set in the above-described ranges, it is possible to improve solubility in organic solvents and a filter filtration property and prevent particles from being generated during storage. Furthermore, when the surface of the inorganic solid electrolyte is coated with the crosslinked polymer, it is possible to form coating layers having excellent moisture resistance and excellent heat resistance without impairing the ion-conducting property of the inorganic solid electrolyte.

The weight-average molecular weight and the number-average molecular weight can be measured as polystyrene-equivalent molecular weights by means of gel permeation chromatography (GPC). At this time, an HLC-8220 (manufactured by Tosoh Corporation) is used as a GPC instrument, for example, G3000HXL and G2000HXL are used as columns, and the average molecular weights are detected using a refractive index (RI) detector at 23° C. and a flow rate of 1 mL/min.

From the viewpoint of solubility in organic solvents and the filter filtration property, the crosslinked polymer preferably does not substantially include components having a molecular weight of 3,000,000 or higher, more preferably does not substantially include components having a molecular weight of 2,000,000 or higher, and most preferably does not substantially include components having a molecular weight of 1,000,000 or higher.

Meanwhile, "the crosslinked polymer substantially including components" means that the crosslinked polymer includes 0.1% by area or more of components in gel permeation chromatography (GPC) measurement.

In the crosslinked polymer, unreacted polymerizable groups derived from the cyclic compound having a siloxane bond may remain.

Among polymerizable groups derived from the cyclic compound having a siloxane bond, the average number of residual polymerizable groups in the crosslinked polymer (polymerizable groups that remain unreacted) is preferably 1 to 60, more preferably 5 to 55, and still more preferably 10 to 50 when the total number of organic groups bonded to silicon atoms is set to 100.

When the average number of the residual polymerizable groups is set in the above-described range, the crosslinked polymer in the present invention further improves heat resistance, moisture resistance, and mechanical strength without impairing the ion-conducting property of the inorganic solid electrolyte. The average number of the residual polymerizable groups can be determined from $^1$H-NMR spectra and the like.

Meanwhile, the content of the structure derived from the cyclic compound having a siloxane bond in the crosslinked polymer is preferably 10% to 100% by mass and more preferably 20% to 100% by mass. When the content of the structure is in the above-described range, the crosslinked polymer in the present invention further improve heat resistance, moisture resistance, and mechanical strength without impairing the ion-conducting property of the inorganic solid electrolyte.

Meanwhile, in the crosslinked polymer, a substituent having a fluorine atom is more preferably present instead of a silicon atom constituting the cyclic compound having a siloxane bond since the cyclic compound improves moisture resistance.

<Method for Manufacturing Crosslinked Polymer>

A method for manufacturing the crosslinked polymer is not particularly limited as long as it is possible to control reactions so that the polymerizable groups derived from the cyclic compound having a siloxane bond remain in polymers to be obtained, and examples thereof include polymerization reactions and hydrosilation reactions of polymerizable groups.

The polymerization reaction of the polymerizable group may be any polymerization reaction, and examples thereof include radical polymerization, cationic polymerization, anionic polymerization, ring-opening polymerization, polycondensation, polymerization addition, addition condensation, transition metal catalytic polymerization, and the like.

The hydrosilation reaction can be performed using, for example, a method in which a basket-shaped silsesquioxane compound and, in addition thereto, a compound having two or more SiH groups in the molecule (for example, bis(dimethylsilyl)ethane, 1,1,3,3-tetramethyldisiloxane, or the like) are dissolved in an organic solvent (for example, toluene, xylene, or the like), a catalyst (for example, platinum (0)-1,3-divinyl-1,1,3,3-tetramethyl disiloxane complex or the like) is added thereto, and the mixture is heated at 20° C. to 200° C.

The method for manufacturing the crosslinked polymer is preferably a polymerization reaction in which a polymerizable group is used and most preferably radical polymerization. Examples of a synthesis method include a collective polymerization method in which polymerization is performed by dissolving the cyclic compound having a siloxane bond and a polymerization initiator in a solvent and heating the solution, a dropwise addition polymerization method (continuous addition) in which the cyclic compound having a siloxane bond is dissolved and heated in a solvent and a solution of a polymerization initiator is added dropwise thereto over 1 to 10 hours, a separate addition polymerization method (separation addition) in which a polymerization initiator is separately added multiple times, and the like. Since film hardness and molecular weight reproducibility are further improved, separation addition and continuous addition are preferred.

The reaction temperature of the polymerization reaction is generally 0° C. to 200° C., preferably 40° C. to 170° C., and more preferably 80° C. to 160° C.

In addition, the reaction is preferably performed in an inert gas atmosphere (for example, nitrogen, argon, or the like) in order to prevent polymerization initiators from being deactivated due to acids. The concentration of oxygen during the reaction is preferably 100 ppm or lower, more preferably 50 ppm or lower, and particularly preferably 20 ppm or lower.

The concentration of the cyclic compound having a siloxane bond in a reaction liquid during polymerization is preferably 30% by mass or lower, more preferably 20% by mass or lower, still more preferably 15% by mass or lower, and most preferably 10% by mass or lower of the total mass of the reaction liquid. When the concentration thereof is set in the above-described range, it is possible to prevent the generation of impurities such as gelating components.

As solvents that are used for polymerization reactions, any solvents may be used as long as the solvents are capable of dissolving the cyclic compound having a siloxane bond at a necessary concentration and have no adverse influences on the characteristics of films to be formed from polymers to be obtained. In the following description, for example, an ester solvent refers to a solvent having an ester group in the molecule.

As the solvent, solvents described in Paragraph "0038" of JP2008-218639A can be used.

Among them, ester solvents, ether solvents, and aromatic hydrocarbon solvents are more preferred solvents, and, specifically, ethyl acetate, propyl acetate, isopropyl acetate, butyl acetate, pentyl acetate, hexyl acetate, methyl propionate, propyl glycol monomethyl ether acetate, tetrahydrofuran, diphenyl ether, anisole, toluene, xylene, mesitylene, and t-butylbenzene are preferred, ethyl acetate, butyl acetate, diphenyl ether, anisole, mesitylene, and t-butylbenzene are particularly preferred. These solvents may be used singly or in a mixed form.

The boiling point of the solvent is preferably 65° C. or higher in order to heat the reaction liquid to a temperature necessary to decompose the polymerization initiator during the reaction.

Among these solvents, solvents having a chain transfer constant (Cx) of $0<Cx\leq5.0\times10^4$ is particularly preferably used since it is easy to control the polymerization of polymers to be obtained.

In addition, the preferred SP (solvent parameter) of the solvent is preferably 10 to 25 (MPa$^{1/2}$) and more preferably 15 to 25 (MPa$^{1/2}$) since it is easy to control the polymerization of polymers to be obtained and a variety of characteristics of films to be obtained are excellent.

Here, the SP value refers to a value obtained using a method described in J. BRANDRUP, E. H. IMMERGUT and E. A. GRULKE, Polymer Handbook Fourth Edition Volume 2, (A John Wiley & Sons, Inc., Publication), pp. 675 to 714 (1999).

The polymerization reaction of the cyclic compound having a siloxane bond is preferably performed in the presence of a non-metallic polymerization initiator. For example, the cyclic compound having a siloxane bond can be polymerized in the presence of a polymerization initiator which generates a free radical such as a carbon radical or an oxygen radical when heated and exhibits activity.

As the polymerization initiator, particularly, an organic peroxide or an organic azo-based compound (preferably, an organic azo-based thermal radical initiator) is preferably used. As the organic peroxide and the organic azo-based compound, compounds described in Paragraphs "0033" to "0035" of JP2008-239685A can be used.

The polymerization initiator is preferably an organic azo-based compound from the viewpoint of the stability of reagents and the molecular weight reproducibility of the polymerization reaction, and, among these, an azoester compound which does not allow harmful cyano to intrude into polymers such as dimethyl 2,2'-azobis(2-methylpropionate) [for example, V-601 manufactured by Wako Pure Chemical Industries, Ltd.] is preferred.

The ten-hour half-life temperature of the polymerization initiator is preferably 100° C. or lower. When the ten-hour half-life temperature of the polymerization initiator is 100° C. or lower, it is easy to prevent the polymerization initiator from remaining at the end of the reaction.

The polymerization initiator may be used singly or in a mixed form.

The amount of the polymerization initiator used is preferably 0.0001 to 2 moles, more preferably 0.003 to 1 mole, and particularly preferably 0.001 to 0.5 moles with respect to 1 mole of the cyclic compound having a siloxane bond.

When polymers are synthesized under conditions as described above, it is possible to preferably obtain polymers derived from the cyclic compound having a siloxane bond.

In addition, in polymers to be obtained, the crosslinking content of polymerizable groups remaining unreacted among polymerizable groups derived from the cyclic compound having a siloxane bond can be changed by appropriately changing a variety of conditions such as the reaction temperature of the polymerization reaction of the polymerizable group or the concentration of the cyclic compound having a siloxane bond in the reaction liquid during polymerization.

The reaction liquid on which the polymerization reaction of the cyclic compound having a siloxane bond has been performed may be used after being mixed with the inorganic solid electrolyte, but is preferably subjected to a purification treatment after the end of the reaction. As a method for purification, an ordinary method such as a liquid extraction method in which residual monomers or oligomer components are removed by means of water washing or a combination of an appropriate solvent, ultrafiltration in which only components having a specific molecular weight or less are extracted and removed, a centrifugal separation treatment, a method for purifying components in a solution state such as column chromatography, a re-precipitation method in which a polymer is solidified in a poor solvent by adding a polymer solution dropwise to the poor solvent and residual monomers and the like are removed, or a method for purifying components in a solid state by washing a filtrated polymer slurry with a poor solvent can be applied.

For example, a solvent in which the polymer is poorly or not soluble (poor solvent) is brought into contact with a polymer-containing solution at a volume amount that is ten or less times and preferably ten to five times the reaction solution, thereby precipitating the polymer in a solid form. The solvent used in the precipitation or re-precipitation operation from the polymer solution (precipitation or re-precipitation solvent) needs to be a poor solvent of the polymer, and it is possible to appropriately select and use a solvent from hydrocarbon, halogenated hydrocarbon, nitro compounds, ethers, ketones, esters, carbonates, alcohols, carboxylic acid, water, and mixed solvents including these solvents depending on the kind of the polymer. Among these, as the precipitation or re-precipitation solvent, a solvent including at least an alcohol (particularly, methanol or the like) or water is preferred.

To the crosslinked polymer of the cyclic compound having a siloxane bond and in a step for manufacturing the crosslinked polymer, a polymerization initiator may be added in order to prevent excessive polymerization. Examples of the polymerization initiator include 4-methoxyphenol, 2,6-bis(1,1-diemthylethyl)-4-methylphenol, catechol, and the like.

<Copolymerized Monomer>

To the polymer of the cyclic compound having a siloxane bond, a copolymerized monomer may be added. As the copolymerized monomer, radical-polymerizable monomers (acrylic monomers, methacrylic monomers, styrene-based monomers, acrylonitrile, acrylamide-based monomers, methacrylamide-based monomers, and vinyl-based monomers) that are generally used, cationic polymerizable monomers (epoxy-based monomers, oxetane-based monomers, and vinylether-based monomers), vinylsilane compounds, and the like can be used.

The polymerizable functional group in the copolymerized monomer is preferably identical to polymerizable groups in cyclic siloxane compounds since random copolymerization can be obtained.

When hydrophobic groups or a variety of polar groups (a carboxy group, an amino group, a hydroxy group, a cyano group, and the like) are introduced into substituents in the copolymerized monomer, it is also possible to introduce hydrophobic groups and polar groups into the polymer of silsesquioxane compounds to be obtained.

Examples of the hydrophobic group include long-chain alkyl groups, fluorine-substituted alkyl groups, and the like. In a case in which a long-chain alkyl group is introduced into the polymer, as the copolymerized monomer, it is possible to use, for example, 2-ethylhexyl methacrylate, dodecyl methacrylate, or the like. In a case in which a fluorine-substituted alkyl group is introduced thereinto, examples of the copolymerized monomer include 2,2,2-trifluoroethyl methacrylate, 1,1,1,3,3,3-hexafluoroisopropyl methacrylate, and the like.

In a case in which a carboxy group is introduced into the polymer as the polar group, examples of the copolymerized monomer include acrylic acid, methacrylic acid, 4-vinyl benzoate, and the like. In a case in which an amino group is introduced thereinto, examples of the copolymerized monomer include 2-dimethylaminoethyl methacrylate, and the like. In a case in which a hydroxyl group is introduced thereinto, examples of the copolymerized monomer include methacrylic acid-2-hydroxyethyl, 4-hydroxystyrene, and the like. In a case in which a cyano group is introduced thereinto, examples of the copolymerized monomer include acrylonitrile.

<Chain Transfer Agent>

In the polymerization of the cyclic compound having a siloxane bond, a chain transfer agent may be approximately added together with the polymerization initiator. As the chain transfer agent, a thiol can be used. When a variety of polar groups (a carboxy group, an amino group, a hydroxy group, and a cyano group) are introduced into substituents in the chain transfer agent, it is also possible to introduce polar groups into the polymer of silsesquioxane compounds to be obtained.

In a case in which a carboxy group is introduced into the polymer as the polar group, examples of the chain transfer agent include mercapto acetate, mercapto succinate, and the like. In a case in which an amino group is introduced thereinto, examples of the chain transfer agent include 2-aminoethanethiol, 2-dimethylaminoethanethiol, and the like. In a case in which a hydroxy group is introduced thereinto, examples of the chain transfer agent include 2-mercaptoethanol.

In the crosslinked polymer of the cyclic compound having a siloxane bond, polymerizable group may remain. In such a case, crosslinking is accelerated in the coating and drying step or the heating and pressing step of the positive electrode active material layer, the negative electrode active material layer, and the solid electrolyte layer, whereby a strong three-dimensional network structure is formed, and the effects of the present invention becomes more significant.

In a case in which the total number of organic groups bonded to silicon atoms [corresponding to R's in Formula (1) and Formula (2)] is set to 100, the average number of residual polymerizable groups in the crosslinked polymer of the cyclic compound having a siloxane bond is preferably 1 to 60, more preferably 5 to 55, and still more preferably 5 to 20.

In the crosslinked polymer of the cyclic compound having a siloxane bond, a polar group is preferably present. Siloxane is originally hydrophobic, but the polar group improves the wetting property with the inorganic solid electrolyte, is adsorbed to the inorganic solid electrolyte, and protects the surface of the inorganic solid electrolyte, and thus the effects of the present invention become more significant.

Specific aspects of (A) crosslinked polymer of the cyclic compound having a siloxane bond are shown in Tables 1 and 2 below, but the present invention is not limited thereto.

Meanwhile, for groups shown with a chemical structural formula, atomic bonds are indicated using a wavy line crossing the atomic bond.

R1, R2, and R3 in Tables 1 and 2 represent substituents [corresponding to R's in Formula (1) and Formula (2)] on silicon in the cyclic compound having a siloxane bond. The "proportions of the number in a molecule" in the monomer structure column in the tables are about the numbers of R1, R2, and R3 in a molecule and indicate the proportions thereof. Meanwhile, in the case of mixtures, the proportions of the average number are indicated. For example, for an exemplary compound (A-1), the proportions of the number in a molecule (R1/R2/R3) are 6.0/6.0/0.0 (R1/R2/R3), which indicates that, out of twelve R's in silsesquioxane represented by Formula (Q-1), six R's are substituted with a phenyl group that is a substituent R1, and the remaining six R's are substituted with a vinyl group that is a substituent R2. Here, the substituent R1 corresponds to Group A1, the substituent R2 corresponds to the polymerizable group in Group A2, and the substituent R3 corresponds to the polar group in Group A3.

Meanwhile, for the polymer of the exemplary compound (A-1), the "proportions of the number in the unit skeleton" for the polymer in the tables show (R1/R2/R3)=6.0/2.5/0.0 and indicate that vinyl groups which are polymerizable groups are polymerized, the proportion of the number of R2 decreases, and the proportion of the number of remaining vinyl groups is 2.5. Meanwhile, polymerized groups are not included in R1 to R3.

In the case of the polymer of the exemplary compound (A-1), in a case in which the total number of organic groups bonded to silicon atoms [corresponding to R's in Formula (1) and Formula (2)] is set to 100, the average number of residual polymerizable groups in the crosslinked polymer is $(2.5/12) \times 100 = 20.83$.

TABLE 1

| Exemplary compound | Cyclic skeleton formula number | Substituent R1 | Substituent R2 | Substituent R3 |
|---|---|---|---|---|
| A-1 | Q-1 | Phenyl | Vinyl | — |
| A-2 | Q-1 | Methyl | Vinyl | 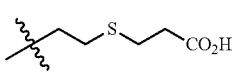 |
| A-3 | Q-6 | Methyl | Vinyl | — |
| A-4 | Q-6 | Methyl | Allyl | — |
| A-5 | Q-6 | Methyl | 3-(Methacryloyl)propyl | — |
| A-6 | Q-6 | Phenyl | Vinyl | — |
| A-7 | Q-6 | 2-(Trifluoromethyl)ethyl | Vinyl | — |
| A-8 | Q-6 | 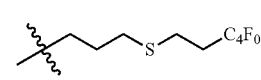 | Vinyl | — |
| A-9 | Q-6 | Methyl | Vinyl | 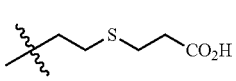 |
| A-10 | Q-6 | Methyl | Vinyl | 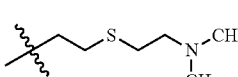 |

TABLE 1-continued

| | | | | |
|---|---|---|---|---|
| A-11 | Q-6 | Methyl | Vinyl | ~~~CH2CH2-S-CH(OH)-CH2OH |
| A-12 | Q-6 | Methyl | 3-(Methacryloyl)propyl | ~~~CH2CH2CH2-O-C(=O)-CH2-S-CH2CH2-CO2H |
| A-13 | — | 2-(Trifluoromethyl)ethyl | Vinyl | ~~~CH2CH2-S-CH2CH2-CO2H |
| A-14 | — | 2-(Trifluoromethyl)ethyl | Vinyl | ~~~CH2CH2-S-CH2CH2-N(CH2)(CH3) |
| A-15 | Q-6 | 2-(Trifluoromethyl)ethyl | Vinyl | ~~~CH2CH2-S-CH(OH)-CH2OH |
| A-16 | Q-6 | Cyclohexyl | Vinyl | ~~~CH2CH2-S-CH2CH2-CO2H |
| A-17 | Q-6 | Isopropyl | Vinyl | ~~~CH2CH2-S-CH2CH2-CO2H |
| A-18 | Q-6 | — | ~~~CH2CH2CH2-O-CH2-(epoxide) | — |
| A-19 | Q-6 | ~~~CH2CH2CH2-O-CH2-CH(OH)-CH2-O-C(=O)-CH2CH2-CF3 | ~~~CH2CH2CH2-O-CH2-(epoxide) | — |
| A-20 | Q-6 | ~~~CH2CH2CH2-O-CH2-CH(OH)-CH2-O-C(=O)-CH2CH2-C3F | ~~~CH2CH2CH2-O-CH2-(epoxide) | — |

| | | Polymer | |
|---|---|---|---|
| Exemplary compound | Monomer structure Proportions of number in molecule (R1/R2/R3) | Weight-average molecular weight (× $10^4$) | Proportions of number in unit skeleton (R1/R2/R3) |
| A-1 | 6.0/6.0/0.0 | 23.4 | 6.0/2.5/0.0 |
| A-2 | 6.0/3.0/3.0 | 14.2 | 6.0/1.9/3.0 |
| A-3 | 3.9/4.1/0.0 | 23.2 | 3.9/1.8/0.0 |
| A-4 | 4.0/4.0/0.0 | 25.2 | 4.0/0.6/0.0 |
| A-5 | 4.0/4.0/0.0 | 28.3 | 4.0/1.2/0.0 |
| A-6 | 4.0/4.0/0.0 | 19.6 | 4.0/0.9/0.0 |
| A-7 | 4.0/4.0/0.0 | 21.5 | 4.0/1.3/0.0 |
| A-8 | 4.0/4.0/0.0 | 16.2 | 4.0/2.5/0.0 |
| A-9 | 3.9/2.9/1.2 | 17.0 | 3.9/0.5/1.2 |
| A-10 | 3.9/2.7/1.4 | 18.4 | 3.9/0.1/1.4 |
| A-11 | 4.0/2.5/1.5 | 15.3 | 4.0/0.0/1.5 |
| A-12 | 4.3/2.2/1.5 | 24.2 | 4.3/0.0/1.5 |
| A-13 | 4.0/1.6/2.4 | 12.9 | 4.0/0.2/2.4 |
| A-14 | 4.7/2.8/0.5 | 16.2 | 4.7/0.1/0.5 |
| A-15 | 4.7/2.2/1.1 | 18.3 | 4.7/0.2/1.1 |
| A-16 | 5.0/2.1/0.9 | 19.0 | 5.0/0.0/0.9 |
| A-17 | 3.8/2.2/2.0 | 16.3 | 3.8/0.0/2.0 |
| A-18 | 0.0/8.0/0.0 | 9.6 | 0.0/4.4/0.0 |
| A-19 | 6.0/2.0/0.0 | 7.9 | 6.0/0.2/0.0 |
| A-20 | 5.5/2.5/0.0 | 8.8 | 5.5/0.2/0.0 |

TABLE 2

| Exemplary compound | Cyclic skeleton formula number | Substituent R1 | Substituent R2 | Substituent R3 | Proportions of number in molecule (R1/R2/R3) | Weight-average molecular weight (×10⁴) | Proportions of number in unit skeleton (R1/R2/R3) |
|---|---|---|---|---|---|---|---|
| A-21 | Q-6 | Methyl | 4-Vinylphenyl | — | 5.7/2.3/0.0 | 12.6 | 5.7/1.1/0.0 |
| A-22 | Q-6 | Methyl | 4-Vinylphenyl | (phenyl-ethyl-S-ethyl-CO₂H group) | 4.0/2.5/1.5 | 12.3 | 4.0/0.5/1.5 |
| A-23 | Q-6 | 2-(Trifluoromethyl)ethyl | Vinyl | — | 2.6/5.4/0.0 | 26.3 | 2.6/2.3/0.0 |
| A-24 | Q-6 | 2-(Trifluoromethyl)ethyl | Vinyl | (ethyl-S-CH(CO₂H)-CH₂-CO₂H group) | 2.6/4.0/1.4 | 23.2 | 2.6/1.3/1.4 |
| A-25 | Q-6 | 2-(Trifluoromethyl)ethyl | Vinyl | (ethyl-S-ethyl-N(CH₃)₂ group) | 2.6/4.0/1.4 | 27.8 | 2.6/0.9/1.4 |
| A-26 | Q-6 | 2-(Perfluorobutyl)ethyl | Vinyl | — | 2.8/5.2/0.0 | 23.3 | 2.8/1.6/0.0 |
| A-27 | Q-6 | 2-(Perfluorobutyl)ethyl | Vinyl | (ethyl-S-CH(CO₂H)-CH₂-CO₂H group) | 2.8/3.8/1.4 | 18.0 | 2.8/1.4/1.4 |
| A-28 | Q-6 | 2-(Perfluorobutyl)ethyl | Vinyl | (ethyl-S-ethyl-N(CH₃)₂ group) | 2.8/3.8/1.4 | 21.1 | 2.8/0.8/1.4 |
| A-29 | Q-6 | 2-(Perfluorohexyl)ethyl | Vinyl | — | 3.5/4.5/0.0 | 27.0 | 3.5/1.0/0.0 |
| A-30 | Q-6 | 2-(Perfluorohexyl)ethyl | Vinyl | (ethyl-S-CH(CO₂H)-CH₂-CO₂H group) | 3.5/2.5/2.0 | 25.3 | 3.5/0.9/2.0 |
| A-31 | Q-6 | 2-(Perfluorohexyl)ethyl | Vinyl | (ethyl-S-ethyl-N(CH₃)₂ group) | 3.5/2.5/2.0 | 23.9 | 3.5/0.8/2.0 |
| A-32 | Q-6 | 2-(Perfluorooctyl)ethyl | Vinyl | — | 2.9/5.1/0.0 | 21.0 | 2.9/2.6/0.0 |
| A-33 | Q-6 | 2-(Perfluorooctyl)ethyl | Vinyl | (ethyl-S-CH(CO₂H)-CH₂-CO₂H group) | 2.9/3.0/2.1 | 23.1 | 2.9/1.1/2.1 |

TABLE 2-continued

| Exemplary compound | Cyclic skeleton formula number | Substituent R1 | Substituent R2 | Substituent R3 | Proportions of number in molecule (R1/R2/R3) | Weight-average molecular weight (×10⁴) | Proportions of number in unit skeleton (R1/R2/R3) |
|---|---|---|---|---|---|---|---|
| A-34 | Q-6 | 2-(Perfluorooctyl)ethyl | Vinyl | —S—CH₂CH₂—N(CH₃)CH₃ | 2.9/3.0/2.1 | 25.5 | 2.9/1.0/2.1 |
| A-35 | Q-8 | Phenyl | Vinyl | — | 8.0/4.0/0.0 | 6.4 | 8.0/2.6/0.0 |
| A-36 | Q-8 | Isopropyl | Vinyl | — | 8.0/4.0/0.0 | 7.3 | 8.0/2.3/0.0 |
| A-37 | Q-8 | 2-(Trifluoromethyl)ethyl | Vinyl | — | 8.0/4.0/0.0 | 10.3 | 8.0/1.7/0.0 |
| A-38 | Q-8 | 2-(Trifluoromethyl)ethyl | Vinyl | —S—CH(CO₂H)CH₂CO₂H | 8.0/3.0/1.0 | 9.7 | 8.0/1.9/1.0 |
| A-39 | Q-8 | 2-(Trifluoromethyl)ethyl | Vinyl | —S—CH₂CH₂—N(CH₃)CH₃ | 8.0/3.0/1.0 | 9.3 | 8.0/1.9/1.0 |
| A-40 | Q-8 | 2-(Trifluoromethyl)ethyl | Vinyl | —S—CH(OH)CH₂OH | 8.0/3.0/1.0 | 5.9 | 8.0/2.1/1.0 |
| A-41 | Q-6 | — | —(CH₂)₃—O—C(=O)—C(CH₃)=CH₂ | — | 0.0/8.0/0.0 | 3.9 | 0.0/5.8/0.0 |
| A-42 | H-1 | Methyl | Vinyl | — | 3.0/3.0/0.0 | 5.3 | 3.0/2.1/0.0 |
| A-43 | H-2 | Methyl | Vinyl | — | 4.0/4.0/0.0 | 1.2 | 4.0/3.1/0.0 |
| A-44 | H-2 | Methyl | Vinyl | —S—CH₂CH₂—CO₂H | 4.0/2.0/2.0 | 3.4 | 4.0/0.9/2.0 |
| A-45 | H-2 | Methyl | Vinyl | —S—CH₂CH₂—N(CH₃)CH₃ | 4.0/2.0/2.0 | 2.3 | 4.0/0.8/2.0 |

The content of the crosslinked polymer of the cyclic compound having a siloxane bond in the present invention is preferably 0.1 to 20 parts by mass, more preferably 0.5 to 10 parts by mass, and still more preferably 1 to 5 parts by mass with respect to 100 parts by mass of the total solid components in the solid electrolyte composition.

In addition, the content thereof is preferably 0.01 to 20 parts by mass, more preferably 0.1 to 15 parts by mass, and still more preferably 1 to 10 parts by mass with respect to 100 parts by mass of the inorganic solid electrolyte.

(Electrolyte Salt [Supporting Electrolyte])

The solid electrolyte composition of the present invention may include an electrolyte salt (supporting electrolyte). The electrolyte salt is preferably (C) lithium salt. The lithium salt is preferably a lithium salt that is ordinarily used for this kind of products and is not particularly limited, but preferred examples thereof include lithium salts represented by (L-1), (L-2), and (L-3) below.

(L-1) Inorganic Lithium Salts salts of an inorganic fluoride such as $LiPF_6$, $LiBF_4$, $LiAsF_6$, and $LiSbF_6$, salts of a perhalogen acid such as $LiClO_4$, $LiBrO_4$, and $LiIO_4$ salts of an inorganic chloride such as $LiAlCl_4$ (L-2) Fluorine-Containing Organic Lithium Salts salts of a perfluoroalkanesulfonic acid such as $LiCF_3SO_3$ salts of a perfluoroalkanesulfonyl imide such as $LiN(CF_3SO_2)_2$, $LiN(CF_3CF_2SO_2)_2$, $LiN(FSO_2)_2$, and $LiN(CF_3SO_2)(C_4F_9SO_2)$ salts of a perfluoroalkanesulfonyl methide such as $LiC(CF_3SO_2)_3$ salts of a fluoroalkyl fluorinated phosphoric acid such as $Li[PF_5(CF_2CF_2CF_3)]$, $Li[PF_4(CF_2CF_2CF_3)_2]$, $Li[PF_3(CF_2CF_2CF_3)_3]$, $Li[PF_5(CF_2CF_2CF_2CF_3)]$, $Li[PF_4(CF_2CF_2CF_2CF_3)_2]$, and $Li[PF_3(CF_2CF_2CF_2CF_3)_3]$ (L-3) Oxalatoborate Salts lithium bis(oxalato)borate, lithium difluorooxalatoborate, and the like Among these, $LiPF_6$, $LiBF_4$, $LiAsF_6$, $LiSbF_6$, $LiClO_4$, $Li(Rf^1SO_3)$, $LiN(Rf^1SO_2)_2$, $LiN(FSO_2)_2$, and $LiN(Rf^1SO_2)(Rf^2SO_2)$ are preferred, and salts of a lithium imide such as $LiPF_6$, $LiBF_4$, $LiN(Rf^1SO_2)_2$, $LiN(FSO_2)_2$, and $LiN(Rf^1SO_2)(Rf^2SO_2)$ are more preferred. Here, $Rf^1$ and $Rf^2$ each represents a perfluoroalkyl group.

The content of the lithium salt is preferably 0.1 parts by mass or more and more preferably 0.5 parts by mass or more with respect to 100 parts by mass of the inorganic solid electrolyte. The upper limit thereof is preferably 10 parts by mass or less and more preferably 5 parts by mass or less.

Meanwhile, the electrolyte salts that are used in the electrolytic solution may be used singly or in an arbitrarily-combined form.

(Dispersion Medium)

In the solid electrolyte composition according to the present invention, a dispersion medium for dispersing the respective components described above may be used. In the production of the all solid-state secondary battery, the solid electrolyte composition is preferably made into a paste form by adding a dispersion medium thereto from the viewpoint of forming a film by uniformly applying the solid electrolyte composition. In the formation of the solid electrolyte layer in the all solid-state secondary battery, the dispersion medium is removed by means of drying. Examples of the dispersion medium include water-soluble organic solvents such as alcohol solvents, ether solvents (including ether solvents containing a hydroxyl group), amide solvents, ketone solvents, aromatic solvents, aliphatic solvents, and nitrile solvents. Specific examples thereof include the following dispersion media.

Examples of the alcohol solvents include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, 1,4-butanediol, and the like.

Examples of the ether solvents (including ether solvents containing a hydroxyl group) include dimethyl ether, diethyl ether, diisopropyl ether, dibutyl ether, t-butyl methyl ether, cyclohexyl methyl ether, anisole, tetrahydrofuran, alkylene glycol alkyl ethers (ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, propylene glycol monomethyl ether, dipropylene glycol monomethyl ether, tripropylene glycol monomethyl ether, diethylene glycol monobutyl ether, diethylene glycol monobutyl ether, and the like).

Examples of the amide solvents include N,N-dimethylformamide, 1-methyl-2-pyrrolidone, 2-pyrrolidinone, 1,3-dimethyl-2-imidazolidinone, 2-pyrrolidinone, ε-caprolactam, formamide, N-methylformamide, acetamide, N-methylacetamide, N,N-dimethylacetamide, N-methylpropanamide, hexamethylphosphoric triamide, and the like.

Examples of the ketone solvents include acetone, methyl ethyl ketone, methyl isobutyl ketone, cyclohexanone, and the like.

Examples of the aromatic solvents include benzene, toluene, xylene, and the like.

As the aliphatic solvents, examples of the hydrocarbon solvents include hexane, heptane, cyclohexane, methylcyclohexane, octane, pentane, cyclopentane, and the like.

In addition, examples of the halogenated hydrocarbon solvents include chloroform, methylene chloride, ethylene chloride, and the like.

Examples of aromatic halogenated hydrocarbon solvents include chlorobenzene, dichlorobenzene, and the like.

Examples of the nitrile solvents include acetonitrile.

In the present invention, among these, an ether solvent, a ketone solvent, an aromatic solvent, or an aliphatic solvent is preferably used. The boiling point of the dispersion medium at normal pressure (1 atmosphere) is preferably 50° C. or higher and more preferably 80° C. or higher. The upper limit thereof is preferably 220° C. or lower and more preferably 180° C. or lower. The dispersion media may be used singly or in a combined form.

In the present invention, the amount of the dispersion medium in the solid electrolyte composition can be set to an arbitrary amount in consideration of the balance between the viscosity of the solid electrolyte composition and drying loads. Generally, the amount of the dispersion medium in the solid electrolyte composition is preferably 20% to 99% by mass.

(D) Crosslinking Agent

A crosslinking agent may be added thereto in order to accelerate crosslinking by being jointly used with the cyclic compound having a siloxane bond in the present invention. As the crosslinking reaction, it is possible to use a radical polymerization reaction, a cationic polymerization reaction, an epoxy-carboxylic acid addition reaction, an enethiol reaction, a disulfide bond-forming reaction, or the like. As a crosslinking agent that can be used for the above-described crosslinking reaction, for example, a polyvalent acrylate, a polyvalent epoxy, a polyvalent carboxylic acid, a polyvalent thiol, sulfur, a sulfur compound, or the like can be used.

In the present invention, an agent having a crosslinking action in addition to developing intrinsic other functions (for example, solid electrolyte activation) may be used as the crosslinking agent, and, for example, Li/P/S-based glass of the inorganic solid electrolyte is classified into the above-described sulfur compound.

The amount of the crosslinking agent added is preferably 0 to 5 parts by mass and more preferably 0 to 1 part by mass with respect to 100 parts by mass of the inorganic solid electrolyte. The amount of the crosslinking agent added to the cyclic compound having a siloxane bond in the present invention is preferably 0 to 50 parts by mass and more preferably 0 to 10 parts by mass. The crosslinking polymerization reaction may be performed in a drying stage after the application of the composition of the positive electrode active material layer, the negative electrode active material layer, or the inorganic solid electrolyte layer or in a heating and pressing step.

(E) Crosslinking Accelerator

In the present invention, a crosslinking accelerator is preferably added thereto in order to accelerate crosslinking. Examples of the crosslinking accelerator include thermal radical polymerization initiators for the purpose of accelerating radical polymerization, thermal cationic polymerization initiators for the purpose of accelerating cationic polymerization (for example, azo-based radical initiators, peroxide-based radical initiators, and the like), amine compounds or ammonium salts for the purpose of accelerating epoxy-carboxylic acid addition reactions, and the like.

(F) Binder

To the solid electrolyte composition, an arbitrary binder as well as the crosslinked polymer of the cyclic compound having a siloxane bond in the present invention may be added. The binder enhances the bonding property between the positive or negative electrode active material and the solid electrolyte. As the binder, for example, a fluorine-based polymer (polytetrafluoroethylene, polyvinylidene difluoride, a copolymer of polyvinylidene difluoride and pentafluoro propylene, or the like), a hydrocarbon-based polymer (styrene-butadiene rubber, butadiene rubber, isoprene rubber, hydrogenated butadiene rubber, water-added styrene-butadiene rubber), an acrylic polymer (polymethyl methacrylate, a copolymer of polymethyl methacrylate and polymethacrylate, or the like), an urethane-based polymer (a polycondensate of diphenylmethane diisocyanate and polyethylene glycol), a polyimide-based polymer (a polycondensate of 4,4'-biphthalic anhydride and 3-aminobenzylamine, or the like), or the like can be used.

(Positive Electrode Active Material)

Next, a positive electrode active material that is used in the solid electrolyte composition for forming the positive electrode active material layer in the all solid-state secondary battery of the present invention (hereinafter, also referred to as the composition for the positive electrode) will be described.

The positive electrode active material is preferably capable of reversibly intercalating and deintercalating lithium ions. The material is not particularly limited and may be a transition metal oxide, an element that can be complexed with Li such as sulfur, or the like. Among these, a transition metal oxide is preferably used, and the positive electrode active material more preferably has one or more elements selected from Co, Ni, Fe, Mn, Cu, and V as a transition metal element.

Specific examples of the transition metal oxide include (MA) transition metal oxides having a lamellar rock salt-type structure, (MB) transition metal oxides having a spinel-type structure, (MC) lithium-containing transition metal phosphate compounds, (MD) lithium-containing transition metal halogenated phosphate compounds, (ME) lithium-containing transition metal silicate compounds, and the like.

Specific examples of the transition metal oxides having a lamellar rock salt-type structure (MA) include lithium cobalt oxide ($LiCoO_2$, LCO), lithium nickel oxide ($LiNi_2O_2$), lithium nickel cobalt aluminum oxide ($LiNi_{0.85}Co_{0.10}Al_{0.05}O_2$, [NCA]), lithium nickel manganese cobalt acid ($LiNi_{0.33}Co_{0.33}Mn_{0.33}O_2$, [NMC]), and lithium manganese nickel oxide ($LiNi_{0.5}Mn_{0.5}O_2$).

Specific examples of the transition metal oxides having a spinel-type structure (MB) include $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphate compounds (MC) include olivine-type iron phosphate salts such as $LiFePO_4$ and $Li_3Fe_2(PO_4)_3$, iron pyrophosphates such as $LiFeP_2O_7$, cobalt phosphates such as $LiCoPO_4$, and monoclinic NASICON-type vanadium phosphate salts such as $Li_3V_2(PO_4)_3$ (lithium vanadium phosphate).

Examples of the lithium-containing transition metal halogenated phosphate compounds (MD) include iron fluorophosphate salts such as $Li_2FePO_4F$, fluoride, manganese fluorophosphate salts such as $Li_2MnPO_4F$, and cobalt phosphate fluorides such as $Li_2CoPO_4F$.

Examples of the lithium-containing transition metal silicate compounds (ME) include $Li_2FeSiO_4$, $Li_2MnSiO_4$, $Li_2CoSiO_4$, and the like.

The volume-average particle diameter (sphere-equivalent average particle diameter) of the positive electrode active material that can be used in the solid electrolyte composition of the present invention is not particularly limited. Meanwhile, the volume-average particle diameter is preferably 0.1 μm to 50 μm. In order for the positive electrode active material to obtain a predetermined particle diameter, an ordinary crusher or classifier may be used. A positive electrode active material obtained using a firing method may be used after being washed with water, an acidic aqueous solution, an alkaline aqueous solution, or an organic solvent. The volume-average particle diameter of the positive electrode active material can be measured using a laser diffraction/scattering particle size analyzer LA-920 (trade name, manufactured by Horiba Ltd.).

The concentration of the positive electrode active material is not particularly limited, but is preferably 10 to 90 parts by mass and more preferably 20 to 80 parts by mass with respect to 100 parts by mass of the total solid components in the composition for the positive electrode.

The positive electrode active material may be used singly, or a combination of two or more positive electrode materials may be used.

(Negative Electrode Active Material)

Next, a negative electrode active material that is used in the solid electrolyte composition for forming the negative electrode active material layer in the all solid-state secondary battery of the present invention (hereinafter, also referred to as the composition for the negative electrode) will be described.

The negative electrode active material is preferably capable of reversibly intercalating and deintercalating lithium ions. The material is not particularly limited, and examples thereof include carbonaceous materials, metallic oxides such as tin oxide or silicon oxide, metallic complex oxides, a single lithium body or lithium alloys such as lithium aluminum alloys, metals capable of forming an alloy with lithium such as Sn, Si, and In, and the like. Among these, carbonaceous materials or lithium complex oxides are preferably used from the viewpoint of reliability. In addition, the metallic complex oxides are preferably capable of absorbing and deintercalating lithium. These materials are not particularly limited, but preferably contain either or both titanium and lithium as constituent components from the viewpoint of high-current density charge and discharge characteristics.

The carbonaceous material that is used as the negative electrode active material refers to a material substantially made of carbon. Examples thereof include carbonaceous materials obtained by firing petroleum pitch, carbon black such as acetylene black (AB), natural graphite, artificial graphite such as highly oriented pyrolytic graphite, or a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor grown carbon fibers, dehydrated polyvinyl alcohol (PVA)-based carbon fibers, lignin carbon fibers, glassy carbon fibers, and active carbon fibers, mesophase spherule, graphite whisker, planar graphite, and the like.

These carbonaceous materials can also be classified into non-graphitizable carbonaceous materials and graphite-based carbon materials depending on the degree of graphitization. In addition, the carbonaceous material preferably has a surface separation, a density, and a size of crystallite which are described in JP1987-22066A (JP-S62-22066A), JP1990-6856A (JP-H02-6856A), and JP1991-45473A (JP-H03-45473A). The carbonaceous material does not need to be a single material, and it is also possible to use the mixture of natural graphite and artificial graphite described in JP1993-90844A (JP-H05-90844A), graphite having a coating layer described in JP1994-4516A (JP-H06-4516A), or the like.

The metallic oxide and the metallic complex oxide which are applied as the negative electrode active material are particularly preferably amorphous oxides, and furthermore, a chalcogenide which is a reaction product between a metallic element and an element belonging to Group 16 of the periodic table is also preferably used. Amorphous oxides mentioned herein refer to oxides having a broad scattering band having a peak in a 2θ value range of 20° to 40° in an X-ray diffraction method in which CuKα rays are used and may have a crystalline diffraction ray. The strongest intensity in the crystalline diffraction ray visible in a 2θ value range of 40° or higher and 70° or lower is preferably 100 or less times and more preferably five or less times the diffraction ray intensity having a peak in a broad scattering band visible in a 2θ value range of 20° or higher and 40° or lower, and the amorphous oxides particularly preferably do not have any crystalline diffraction rays.

Among the above-described amorphous oxides and compound groups made of a chalcogenide, amorphous oxides of a semimetal element and chalcogenides are more preferred, and oxides made of one of elements belonging to Groups 13 (IIIB) to 15 (VB) of the periodic table, Al, Ga, Si, Sn, Ge, Pb, Sb, and Bi or a combination of two or more elements therefrom and chalcogenide are particularly preferred. Specific examples of the preferred amorphous oxides and chalcogenides preferably include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $SnSiO_3$, GeS, SnS, $SnS_2$, PbS, $PbS_2$, $Sb_2S_3$, $Sb_2S_5$, and $SnSiS_3$. In addition, the amorphous oxides and the chalcogenides may be complex oxides with lithium oxide, for example, $Li_2SnO_2$.

The volume-average particle diameter of the negative electrode active material is preferably 0.1 μm to 60 μm. In order to obtain a predetermined particle diameter, an arbitrary crusher or classifier may be used. For example, a crucible, a ball mill, a sand mill, an oscillatory ball mill, a satellite ball mill, a planetary ball mill, a vortex flow-type jet mill, a sieve, or the like is preferably used. During crushing, wet-type crushing in which water or an organic solvent such as methanol is caused to coexist can be carried out as necessary. In order to obtain a desired particle diameter, the negative electrode active material is preferably classified. The classification method is not particularly limited, and a sieve, a wind classifier, or the like can be used as necessary. Both dry-type classification and wet-type classification can be used. The volume-average particle diameter of the negative electrode active material particles can be measured using the same method as the above-described method for measuring the volume-average particle diameter of the positive electrode active material.

The negative electrode active material also preferably contains a titanium atom. More specifically, $Li_4Ti_5O_{12}$ is preferred since the volume thereof changes only to a small extent during the absorption and deintercalation of lithium ions, and thus $Li_4Ti_5O_{12}$ has excellent rapid charge/discharge characteristics, suppresses deterioration of electrodes, and is capable of improving the service lives of lithium ion secondary batteries.

In addition, a negative electrode active material represented by Formula (N-M) below is also preferably included.

$$Si_{xx}M^{nm}{}_{(1-xx)} \qquad \text{Formula (N-M)}$$

In Formula (N-M), xx represents the number of 0.01 or higher and lower than 1 and indicates molar fractions. $M^{nm}$ represents any one of a chalcogen element, a semimetal element, an alkali metal element, an alkali earth metal element, and a transition metal element, or a combination thereof.

$M^{nm}$ can be preferably selected from chalcogen elements such as O, S, and Se, semimetal elements such as B and Ge, alkali metal elements such as Li and Na, alkali earth metal elements such as Mg and Ca, and transition metal elements such as Ti, V, Mn, Fe, Co, Ni, and Cu. In addition, $M^{nm}$ may be a combination of two or more elements described above.

Among these, chalcogen elements or transition metal elements are preferred, and transition metal elements are more preferred. Among the transition metal elements, first transition metal elements are preferred, Ti, V, Mn, Fe, Co, Ni, and Cu are more preferred, and Ti, Mn, Fe, Co, and Ni are particularly preferred.

xx is preferably 0.1 or higher and lower than 1, more preferably 0.1 or higher and 0.99 or lower, still more preferably 0.2 or higher and 0.98 or lower, and particularly preferably 0.3 or higher and 0.95 or lower.

The concentration of the negative electrode active material is not particularly limited, but is preferably 10 to 90 parts by mass and more preferably 20 to 80 parts by mass with respect to 100 parts by mass of the total solid components in the composition for the negative electrode.

The negative electrode active material may be used singly, or a combination of two or more negative electrode materials may be used.

Meanwhile, in the above-described embodiment, an example in which the positive electrode active material or the negative electrode active material is added to the solid electrolyte composition has been described, but the present invention is not interpreted to be limited thereto. For example, paste including a positive electrode active material or a negative electrode active material may be prepared using a crosslinked polymer not including the cyclic compound having a siloxane bond as a composition. At this time, the above-described inorganic solid electrolyte is preferably added thereto. The inorganic solid electrolyte layer may be formed using the solid electrolyte composition according to the above-described preferred embodiment of the present invention into which the above-described positive electrode material or negative electrode material which is ordinarily used is incorporated. In addition, a conduction aid may be appropriately added to the positive and negative electrode active material layers as necessary. As an ordinary electron-conducting material, a carbon fiber such as graphite, carbon black, acetylene black, Ketjen black, or a carbon nanotube, metal powder, a metal fiber, a polyphenylene derivative, or the like can be added thereto.

The above-described electron-conducting material may be used singly, or a combination of two or more electron-conducting materials may be used.

In the solid electrolyte composition of the present invention, the surfaces of the particles of (B) inorganic solid electrolyte are coated with the crosslinked polymer of (A) cyclic compound having a siloxane bond. The above-described solid electrolyte composition can be produced using a method for producing a solid electrolyte composition of the present invention.

<Method for Producing Solid Electrolyte Composition>

The method for producing a solid electrolyte composition of the present invention includes a step of obtaining a mixture by mixing (A) crosslinked polymer of the cyclic compound having a siloxane bond and particles of (B) inorganic solid electrolyte which includes a metal belonging to Group I or II of the periodic table and has an ion-conducting property in a hydrocarbon solvent or a halogenated hydrocarbon solvent and a step of coating the surfaces of the particles of (B) inorganic solid electrolyte with the crosslinked polymer of (A) cyclic compound having a siloxane bond by drying the mixture.

The step of mixing the crosslinked polymer of (A) cyclic compound having a siloxane bond and the particles of (B) inorganic solid electrolyte can be carried out using an arbitrary kneader. The crosslinked polymer of the cyclic compound having a siloxane bond and the particles of the inorganic solid electrolyte are sufficiently mixed together and dispersed using a kneader, thereby producing a solid electrolyte composition. When the obtained solid electrolyte composition (dispersion) is dried, the surfaces of the particles of the inorganic solid electrolyte are coated with the crosslinked polymer of (A) cyclic compound having a siloxane bond. In such a case, it is possible to hydrophobilize the surfaces of the particles of the inorganic solid electrolyte and improve the ion conduction of metal ions.

Hereinafter, the method for producing a solid electrolyte composition will be described in more detail by illustrating an example of a process for manufacturing an all solid-state secondary battery.

(Dispersion)

The solid electrolyte composition of the present invention may be subjected to mechanical dispersion or a crushing treatment. Examples of a method for crushing the inorganic solid electrolyte in the solid electrolyte composition include a mechanical dispersion method. As the mechanical dispersion method, a ball mill, a beads mill, a planetary mixer, a blade mixer, a roll mill, a kneader, a disc mill, or the like can be used.

In the case of dispersion using a ball mill, examples of the material of balls in the ball mill include agate, sintered alumina, tungsten carbide, chromium steel, stainless steel, zirconia, plastic polyamide, nylon, silicon nitride, TEFLON (registered trademark), and the like. As balls that are used during the dispersion using the ball mill, the same kind of balls may be used, or two or more different kinds of balls may be used. In addition, during the dispersion, new balls may be added thereto, or the balls may be exchanged with balls having a different shape, size, and material. The preferred amount of the balls in a container is not particularly specified, and the container may be fully filled with balls. The amount of contaminants derived from balls or devices which are generated due to impact from mechanical dispersion in the dispersion of the solid electrolyte composition is not particularly specified. The amount of contaminants can also be suppressed to 10 ppm or lower.

In the mechanical dispersion of the crushing treatment, a single inorganic solid electrolyte can be dispersed, or two or more inorganic solid electrolytes can be dispersed at the same time. The dispersion may be carried out in a single stage or in two stages. In addition, it is also possible to add the positive or negative electrode active material, the inorganic solid electrolyte, the binder, a dispersant, the dispersion medium, the conduction aid, the lithium salt, and the like between the respective stages. In a case in which the dispersion is carried out in multiple stages, it is also possible to change the parameters (the dispersion duration, the dispersion speed, the dispersion base material, and the like) of devices relating to the dispersion in the respective stages.

The dispersion method may be wet-type dispersion in which a dispersion medium is used or dry-type dispersion in which a dispersion medium is not used; however, in the present invention, wet-type dispersion in which a hydrocarbon-based solvent or a halogenated hydrocarbon-based solvent is used as the dispersion medium is carried out.

Generally, the dispersion medium may partially dissolve the inorganic solid electrolyte during the dispersion. In this case, it is also possible to regenerate the dissolved portion into the original inorganic solid electrolyte by heating the dissolved portion during drying. In addition, even in a case in which the dispersion medium is a water-containing solvent (containing 100 ppm or more of moisture), it is also possible to regenerate the inorganic solid electrolyte by heating and drying the dissolved portion after the dispersion or heating and drying the dissolved portion in a vacuum.

The dispersion duration is not particularly specified, but is generally ten seconds to ten days. The dispersion temperature is not particularly specified, but is generally in a range of −50° C. to 100° C.

The volume-average particle diameter of the inorganic solid electrolyte dispersed as described above is not particularly limited, but is preferably 0.01 μm or larger, more preferably 0.05 μm or larger, and still more preferably 0.1 μm or larger. The upper limit thereof is preferably 500 μm or smaller, more preferably 100 μm or smaller, still more preferably 50 or smaller, particularly preferably 10 μm or smaller, and most preferably 5 μm or smaller. The volume-average particle diameter can be measured using a laser diffraction/scattering particle size analyzer LA-920 (trade name, manufactured by Horiba Ltd.).

Before and after the dispersion step, the shape of the inorganic solid electrolyte may be maintained as it is or changed.

In the method for producing a solid electrolyte composition of the present invention, the solid electrolyte composition (dispersion) produced as described above is dried, thereby obtaining a solid electrolyte composition in a state in which the surfaces of the particles of the inorganic solid electrolyte are coated with the crosslinked polymer of (A) cyclic compound having a siloxane bond. As the drying method, any method of blow drying, heating drying, vacuum drying, and the like can be used.

In a case in which an electrode sheet for a battery, a sheet for a battery such as a solid electrolyte sheet, and furthermore, an all solid-state secondary battery are manufactured using a solid electrolyte dispersion in the present invention, regarding the drying in the above-described method for producing a solid electrolyte composition of the present invention, the solid electrolyte dispersion is preferably dried after being applied so as to form a coating film instead of being immediately dried.

Hereinafter, a process for producing an all solid-state battery using the solid electrolyte dispersion in the present invention will be further described.

(Coating)

In the application of the solid electrolyte composition, the dispersion of the solid electrolyte composition which has been prepared above may be used as it is, but it is also possible to add the dispersion medium used in the above-described dispersion operation or a different solvent to the solid electrolyte composition or dry the solid electrolyte composition and then re-disperse the solid electrolyte composition using a dispersion medium different from the dispersion medium used in the above-described dispersion operation.

The solid electrolyte composition that is used in coating may be prepared by mixing two or more kinds of slurries including particles with different degrees of dispersion or different volume-average particle diameters depending on the difference of the dispersion process.

To the solid electrolyte composition that is used in coating, the positive or negative electrode active material may be added after only the inorganic solid electrolyte and the dispersion medium are dispersed, or the positive or negative electrode active material, the inorganic solid electrolyte, and the dispersion medium may be dispersed together. Here, in a case in which an additive such as a binder is used, the additive such as a binder may be added thereto before or after the dispersion of the inorganic solid electrolyte.

Coating may be any one of wet-type coating and dry-type coating. Rod bar coating (a bar coating method), reverse roll coating, direct roll coating, blade coating, knife coating, extrusion coating, curtain coating, gravure coating, dip coating, squeeze coating, or the like can be used.

The speed of the coating can be changed depending on the viscosity of the inorganic solid electrolyte composition.

The coating film desirably maintains a uniform film thickness from the beginning to the end of the coating. In the case of coating using a bar coating method, generally, there is a tendency that the coating film is thick in the beginning of the coating and becomes thinner as the coating proceeds and the thickness of the coating film decreases from the central portion to the peripheral portion. In order to prevent the above-described tendency, it is also possible to design the bar coater and the coating table so that the clearance therebetween increases from the beginning of the coating to the end of the coating. Specifically, it is possible to consider a design in which slits are provided in the coating table and the depth of the slit grooves increases as the coating proceeds. Here, a support to be coated is installed on the slits. The coating bar is maintained horizontally with respect to the coating table. In such a case, it is possible to gradually increase the clearance. In addition, there is another method in which vibrations are imparted before the coated film is fully dried, thereby evening the film thickness of the coated film.

It is also possible to coat the positive electrode active material layer, the inorganic solid electrolyte layer, and the negative electrode active material layer stepwise while drying these layers or superimpose and coat multiple different layers while these layers remain wet. In a case in which different layers are coated, it is also possible to coat the layers with a solvent or a dispersion medium that is different from solvents or dispersion mediums that are used to coat adjacent layers.

As the inorganic solid electrolyte that is used in the inorganic solid electrolyte layer, one kind of the sulfide-based inorganic solid electrolytes or the oxide-based inorganic solid electrolytes described above may be used singly and two or more kinds of the sulfide-based inorganic solid electrolytes or the oxide-based inorganic solid electrolytes, having different element compositions and/or crystal structures, may be used in combination. In addition, different inorganic solid electrolytes may be used in portions in contact with the electrode layer (the positive or negative electrode active material layer) and in the inorganic solid electrolyte layer, respectively.

(Drying)

In the electrode sheet for a battery, the solid electrolyte sheet, a sheet and a battery sheet made of two or more layers of a combination thereof which have been produced by means of coating, the coating solvent or the dispersion medium is dried. As the drying method, any method of blow drying, heating drying, vacuum drying, and the like can also be used.

(Pressing)

The electrode sheet for a battery or the all solid-state secondary battery may be pressurized after being molded or produced by means of coating. Examples of a pressurization method include a hydraulic cylinder presser and the like. The pressure in the pressurization is generally in a range of 50 MPa to 1,500 MPa. Heating may be carried out at the same time as the pressurization. The heating temperature is generally in a range of 30° C. to 300° C.

In addition, the electrode sheet for a battery or the all solid-state secondary battery can be pressed at a temperature higher than the glass transition temperature of the inorganic solid electrolyte. Meanwhile, in a case in which the inorganic solid electrolyte and the binder coexist, it is also possible to press the electrode sheet for a battery or the all solid-state secondary battery at a temperature higher than the glass transition temperature of the binder. However, generally, the pressurization temperature does not exceed the melting point of the binder.

The pressurization may be carried out in a state in which the coating solvent or the dispersion medium has been dried in advance or may be carried out in a state in which the solvent or the dispersion medium remains.

The atmosphere during the pressurization may be any one of in the air, in dried air (with a dew point of −20° C. or lower), in an inert gas (for example, argon, helium, nitrogen, or the like), or the like.

Regarding the pressing duration, a high pressure may be applied for a short period of time (for example, several hours or shorter), or an approximately intermediate pressure may be applied for a long period of time (for example, one or more days). In the case of, for example, an all solid-state secondary battery other than the electrode sheet for a battery or the solid electrolyte sheet, it is also possible to use a restraining device (a screw bracket or the like) for the all solid-state secondary battery in order to continuously apply an approximately intermediate pressure.

The pressing pressure may be uniform or different on the surface of a coated sheet.

The pressing pressure can be changed depending on the area or film thickness of a portion to be pressed. In addition, it is also possible to change the pressure in the same position stepwise.

The pressing surface may be flat or be roughened.

(Attachment)

When different layers are attached together, the contact surfaces of both layers are also preferably wetted with an organic solvent, an organic substance, or the like. In the attachment of electrodes, the solid electrolyte layer may be applied to either or both layers and the layer may be attached together before the solid electrolyte layer is dried.

The temperature during the attachment may be room temperature or a temperature which is equal to or higher than room temperature and is close to the glass transition temperature of the inorganic solid electrolyte.

(Initialization)

Charging and discharging is carried out in a state in which the pressing pressure has been increased, and then the pressure is released until the pressure reaches a pressure at which the all solid-state secondary battery is generally used.

<Collector (Metal Foil)>

As a collector for the positive electrode and the negative electrode, an electron conductor which does not cause chemical changes is preferably used. The collector for the positive electrode is preferably aluminum, stainless steel, nickel, titanium, or the like, and, additionally, a collector obtained by treating the surface of aluminum or stainless steel other with carbon, nickel, titanium, or silver, and, among these, aluminum and an aluminum alloy are more preferred. The collector for the negative electrode is preferably aluminum, copper, stainless steel, nickel, or titanium and more preferably aluminum, copper, or a copper alloy.

Regarding the shape of the collector, generally, a collector having a film sheet shape is used, but a net, a punched collector, a lath body, a porous body, a foaming body, a compact of a fiber group, or the like can be used. The thickness of the collector is not particularly limited, but is preferably 1 μm to 500 μm. In addition, the surface of the collector is preferably provided with protrusions and recesses by means of a surface treatment.

<Electrode Sheet for Battery and Method for Manufacturing Same>

An electrode sheet for a battery of the present invention is obtained by forming a film on the collector using the solid electrolyte composition of the present invention. For example, an electrode sheet for a positive electrode will be described as an example. The solid electrolyte composition of the present invention including a positive electrode active material is applied onto a metal foil which is a collector using a commercially available coater, applicator, or the like, thereby forming a positive electrode active material layer. It is desirable to dry the coated film and then apply a pressure by means of, for example, roll pressing. The electrode sheet for a battery can be produced in the above-described manner.

Furthermore, the electrode sheet may be produced by forming a film by applying a composition for the inorganic solid electrolyte layer onto the upper surface of the positive electrode active material, or an electrode sheet for a battery may be obtained by applying and then drying a composition including an active material for the negative electrode on the inorganic solid electrolyte layer and carrying out roll pressing.

<All Solid-State Secondary Battery and Method for Manufacturing Same>

An all solid-state secondary battery may be manufactured by way of the method for manufacturing an electrode sheet for a battery of the present invention. A negative electrode active material layer is formed by further applying a composition made of a negative electrode material onto the electrode sheet for a positive electrode manufactured in the above-described manner. Next, a collector (a metal foil) is imparted on a film of the active material of the negative electrode. An all solid-state secondary battery can be produced in the above-described manner. Meanwhile, the respective compositions described above can be applied using a well-known method such as a coater. At this time, after the respective application of the composition forming the positive electrode active material layer, the composition forming the inorganic solid electrolyte layer, and the composition forming the negative electrode active material layer, a heating treatment is preferably carried out. The heating temperature is not particularly limited, but is preferably 30° C. or higher and more preferably 60° C. or higher. The upper limit thereof is preferably 300° C. or lower and more preferably 250° C. or lower. In such a case, in the all solid-state secondary battery, it is possible to obtain a favorable bonding property between the respective layers and a favorable ion-conducting property under no pressurization.

<Use of all Solid-State Secondary Battery>

The all solid-state secondary battery according to the present invention can be applied to a variety of uses. The application aspect is not particularly limited; however, in a case in which the all solid-state secondary battery is mounted in an electronic device, examples of the application aspect include laptop personal computers, stylus-input personal computers, mobile personal computer, electronic book players, mobile phones, cordless phone extension master stations, pagers, handy terminals, portable fax machines, mobile copiers, portable printers, headphone stereos, video movies, liquid crystal televisions, handy cleaners, portable CDs, mini discs, electric shavers, transceivers, electronic organizers, calculators, memory cards, portable tape recorders, radios, backup power supplies, and the like. Additionally, examples of the consumer uses include automobiles, electric vehicles, motors, lighting equipment, toys, game devices, load conditioner, clocks, strobes, cameras, medical devices (pacemakers, hearing aids, shoulder massage machine, and the like), and the like. Furthermore, the all solid-state secondary battery can be used for a variety of military uses and space uses. In addition, the all solid-state secondary battery can be combined with solar batteries.

Among these, the all solid-state secondary battery is preferably applied to applications requiring a high capacitance and high-rate discharge characteristics. For example, in storage facilities and the like in which an increase in the capacitance is anticipated in the future, high reliability become essential, and furthermore, battery performance is also required. In addition, high-capacitance secondary batteries are mounted in electric vehicles and the like, domestic uses in which batteries need to be charged everyday are anticipated, and thus better reliability with respect to excessive charging is required. The present invention is capable of preferably coping with the above-described use aspects and thus exhibiting the excellent effects thereof.

The all solid-state secondary battery refers to a secondary battery in which a positive electrode, a negative electrode, and an electrolyte are all solid. In other words, the all solid-state secondary battery is differentiated from electrolytic solution-type secondary batteries in which a carbonate-based solvent is used as the electrolyte. Among these, the present invention is assumed as an inorganic all solid-state secondary battery. All solid-state secondary batteries are classified into organic (high-molecular-weight) all solid-state secondary batteries in which a high-molecular-weight compound such as polyethylene oxide is used as the electrolyte and inorganic all solid-state secondary batteries in which LLT, LLZ, or the like is used. Meanwhile, a high-molecular-weight compound can be applied as a binder for positive electrode active materials, negative electrode active materials, and inorganic solid electrolyte particles without hindering the application of high-molecular-weight compounds to inorganic all solid-state secondary batteries.

The inorganic solid electrolyte is differentiated from an electrolyte in which the above-described high-molecular-weight compound is used as an ion-conducting medium (high-molecular-weight electrolyte), and an inorganic compound serves as an ion-conducting medium. Specific examples thereof include LLT and LLZ. The inorganic solid electrolyte does not deintercalate cations (Li ions) for itself and exhibits an ion-transporting function. In contrast, although there are cases in which a material which is added to an electrolytic solution or a solid electrolyte layer and serves as an ion supply source for deintercalating cations (Li ions) is referred to as an electrolyte, when an electrolyte as the ion-transporting material needs to be differentiated, the above-described material is referred to as "electrolyte salt" or "supporting electrolyte". Examples of the electrolyte salt include LiTFSI.

"Compositions" mentioned in the present invention refer to mixtures in which two or more components are homogeneously mixed together. Compositions need to be substantially homogeneous and may include agglomerated portions or localized portions as long as desired effects are exhibited. In addition, solid electrolyte compositions mentioned in the present invention refer to compositions which basically serve as materials for forming the electrolyte layer (typically in a paste form), and electrolyte layers formed by curing this composition are not considered as the solid electrolyte composition.

EXAMPLES

Hereinafter, the present invention will be described in more detail on the basis of examples, but the present invention is not interpreted to be limited thereto. In the following examples, "parts" and "%" are mass-based unless particularly otherwise described.

In the examples, in order to classify exemplary compounds into monomers and crosslinked polymers, crosslinked polymers will be referred to as resins, monomers will be referred to as monomer compounds, and, for example, an exemplary compound (A-3) will be referred to as a resin (A-3) or a monomer compound (A'-3).

In addition, the compositional ratios of individual compounds in synthesis examples are sequentially denoted from the compositional ratios of structures denoted to the left of the individual compounds.

The weight-average molecular weights and the number-average molecular weights of polymers were obtained as equivalent values using standard polystyrene (product name: TSK-GEL, manufactured by Tosoh Corporation) in CPC measurement.

Instrument name: HLC-8220 (manufactured by Tosoh Corporation)
Columns: G3000HXL and G2000HXL
Temperature: 23° C.
Sample: Tetrahydrofuran diluted solution (having a concentration of 0.1% by mass), 1 μL injected Synthesis Example 1

Synthesis of Exemplary Compound [Resin (A-3)]
(1) Synthesis of Monomer Body
A mixed solution of electron-grade concentrated hydrochloric acid (2,000 g), n-butanol (12 L), and ion exchange water (4,000 g) was cooled to 10° C., and a mixed solution of vinyl triethoxysilane (840 g) and methyl triethoxysilane (786 g) was added dropwise to the above-described mixed solution over 20 minutes. After that, furthermore, the mixture was stirred at 25° C. for 18 hours. Precipitated crystals were filtered and were washed with electron-grade methanol (300 mL). After the washing, the crystals were dissolved in tetrahydrofuran (4,000 mL), and electron-grade methanol (4,000 mL) and, subsequently, ion exchange water (8,000 mL) were added dropwise thereto under stirring. Precipitated crystals were filtered and dried, thereby obtaining a white solid target substance [monomer compound (A'-3)] (105 g). As a result of $^1$H-NMR measurement (300 MHz, CDCl$_3$), multiple lines were observed in 6.08 to 5.88 ppm and 0.28 to 0.18 ppm, and a methyl/vinyl ratio of 3.9/4.1 was computed from this integral ratio. The obtained silsesquioxane compound was a mixture of a basket-shaped silsesquioxane compound represented by Formula (Q-6).

(2) Synthesis of Crosslinked Polymer
The monomer compound (A'-3) synthesized above (5 g) was added to chlorobenzene (132 g). A solution (31 mL) obtained by dissolving V-601 manufactured by Wako Pure Chemical Industries, Ltd. (having a ten-hour half-life temperature of 66° C.) (0.2 g) as a polymerization initiator in chlorobenzene (80 g) was added dropwise to the obtained solution for 310 minutes while heating and refluxing the solution in a nitrogen stream at an inner temperature of 132° C. After the end of the dropwise addition, the solution was further heated and refluxed for one hour. After the reaction liquid was cooled to room temperature, electron-grade methanol (340 mL) and ion exchange water (34 mL) were added to the reaction liquid, and the precipitated solid was filtered and washed with electron-grade methanol (10 mL). After the washing, the solid was dissolved in tetrahydrofuran (40 g), and ion exchange water (8 g) was added dropwise thereto under stirring. After stirring for one hour, supernatants were removed by means of decantation, and electron-grade methanol (20 g) was added thereto. The precipitated solid was filtered and dried, thereby obtaining a white solid crosslinked polymer [resin (A-3)] of a cyclic compound having a siloxane bond (1.9 g).

As a result of analyzing the obtained resin by means of GPC, $M_w$=23.2×10$^4$ and $M_n$=10.9×10$^4$. The content of unreacted monomer compound (A'-3) remaining in the solid substance was 1% by mass or less, and no components having a molecular weight of 3,000,000 or higher were observed. As a result of measuring the $^1$H-NMR spectrum using deuterochloroform as a measurement solvent, a proton peak derived from a methyl group (−0.5 to 0.5 ppm), a proton peak derived from an alkyl group generated due to the polymerization of a vinyl group (0.5 to 3.0 ppm), and a proton peak of the remaining vinyl group (4.9 to 6.8 ppm) were observed at an integral ratio of 3.9/2.3/1.8. From the integral ratios, the content of polymerizable groups in the resin was found to be 22.5 when the total number of organic groups bonded to silicon atoms in the resin was set to 100.

Synthesis Example 2

Synthesis of Exemplary Compound [Resin (A-6)]
(1) Synthesis of Monomer Body
A monomer compound (A'-6) was synthesized in the same manner as in Synthesis Example 1 except for the fact that phenyltrimethoxysilane was used instead of methyl triethoxysilane. As a result of $^1$H-NMR measurement (300 MHz, CDCl$_3$), the phenyl/vinyl ratio was computed to be 4.0/4.0. The obtained silsesquioxane compound was a mixture of a basket-shaped silsesquioxane compound represented by Formula (Q-6).

(2) Synthesis of Crosslinked Polymer
The monomer compound (A'-6) synthesized above (7.3 g) was added to chlorobenzene (140 g). A solution (31 mL) obtained by dissolving V-601 manufactured by Wako Pure Chemical Industries, Ltd. (having a ten-hour half-life temperature of 66° C.) (0.24 g) as a polymerization initiator in chlorobenzene (80 g) was added dropwise to the obtained solution for 120 minutes while heating and refluxing the solution in a nitrogen stream at an inner temperature of 132° C. After the end of the dropwise addition, the solution was further heated and refluxed for two hours. After the reaction liquid was cooled to room temperature, electron-grade methanol (340 mL) and ion exchange water (34 mL) were added to the reaction liquid, and the precipitated solid was filtered and washed with electron-grade methanol (10 mL). After the washing, the solid was dissolved in tetrahydrofuran (40 g), and ion exchange water (8 g) was added dropwise thereto under stirring. After stirring for one hour, supernatants were removed by means of decantation, and electron-grade methanol (20 g) was added thereto. The precipitated solid was filtered and dried, thereby obtaining a white solid target substance [resin (A-6)] (2.4 g).

As a result of analyzing the obtained resin by means of GPC, $M_w$=19.6×10$^4$ and $M_n$=12.2×10$^4$. The content of unreacted monomer compound (A'-6) remaining in the solid substance was 1% by mass or less, and no components having a molecular weight of 3,000,000 or higher were observed. As a result of measuring the $^1$H-NMR spectrum using deuterochloroform as a measurement solvent, a proton peak derived from a phenyl group (6.8 to 7.3 ppm), a proton peak derived from an alkyl group generated due to the polymerization of a vinyl group (0.5 to 3.0 ppm), and a proton peak of the remaining vinyl group (4.9 to 6.8 ppm) were observed at an integral ratio of 4.0/3.1/0.9. From the integral ratios, the content of polymerizable groups in the resin was found to be 11.25 when the total number of organic groups bonded to silicon atoms in the resin was set to 100.

Synthesis Example 3

Synthesis of Exemplary Compound [Resin (A-7)]
(1) Synthesis of Monomer Body
A monomer compound (A'-7) was synthesized in the same manner as in Synthesis Example 1 except for the fact that 2-(trifluoromethyl)ethyl trimethoxysilane was used instead of methyl triethoxysilane. As a result of $^1$H-NMR measurement (300 MHz, CDCl$_3$), the 2-(trifluoromethyl)ethyl/vinyl ratio was computed to be 4.0/4.0. The obtained silsesquioxane compound was a mixture of a basket-shaped silsesquioxane compound represented by Formula (Q-6).
(2) Synthesis of Crosslinked Polymer
The monomer compound (A'-7) synthesized above (5.2 g) was added to diphenyl ether (120 g). A solution (25 mL) obtained by dissolving V-601 manufactured by Wako Pure Chemical Industries, Ltd. (having a ten-hour half-life temperature of 66° C.) (0.20 g) as a polymerization initiator in diphenylether (80 g) was added dropwise to the obtained solution for 60 minutes while heating and refluxing the solution in a nitrogen stream at an inner temperature of 152° C. After the end of the dropwise addition, the solution was further heated and refluxed for two hours. After the reaction liquid was cooled to room temperature, isopropanol (340 mL) and ion exchange water (34 mL) were added to the reaction liquid, and the precipitated solid was filtered and washed with isopropanol (10 mL). After the washing, the solid was dissolved in tetrahydrofuran (40 g), and ion exchange water (8 g) was added dropwise thereto under stirring. After stirring for one hour, supernatants were removed by means of decantation, and isopropanol (20 g) was added thereto. The precipitated solid was filtered and dried, thereby obtaining a white solid target substance [resin (A-7)] (1.9 g).

As a result of analyzing the obtained resin by means of GPC, $M_w$=21.5×10$^4$ and $M_n$=12.9×10$^4$. The content of unreacted monomer compound (A'-7) remaining in the solid substance was 1% by mass or less, and no components having a molecular weight of 3,000,000 or higher were observed. As a result of measuring the $^1$H-NMR spectrum using deuterochloroform as a measurement solvent, a proton peak derived from a 2-(trifluoromethyl)ethyl group (1.5 to 2.2 ppm), a proton peak derived from an alkyl group generated due to the polymerization of a vinyl group (0.5 to 3.0 ppm), and a proton peak of the remaining vinyl group (4.9 to 6.8 ppm) were observed at an integral ratio of 4.0/2.7/1.3. From the integral ratios, the content of polymerizable groups in the resin was found to be 16.25 when the total number of organic groups bonded to silicon atoms in the resin was set to 100.

Synthesis Example 4

Synthesis of Exemplary Compound [Resin (A-9)]
(1) Synthesis of Monomer Body
The monomer compound (A'-3) synthesized in Synthesis Example 1 (3.5 g) and 3-mercaptopropionic acid (1.0 g) were dissolved in tetrahydrofuran (100 mL). After the solution was heated to 60° C. in a nitrogen stream, di-t-butylperoxide (0.05 g) was added thereto, and the mixture was heated and stirred for one hour. The obtained reaction liquid was re-precipitated in a mixed liquid of isopropanol (300 mL) and water (100 mL). The re-precipitated crystals were filtered and dried, thereby obtaining a white solid monomer compound (compound A'-9) (2.3 g). From the result of $^1$H-NMR measurement (300 MHz, CDCl$_3$), the methyl/vinyl/2-(2-carboxylethylthio)ethyl ratio was computed to be 3.9/2.9/1.2. The obtained silsesquioxane compound was a mixture of the basket-shaped silsesquioxane compound represented by Formula (Q-6).
(2) Synthesis of Crosslinked Polymer
The monomer compound (A'-9) synthesized above (2.3 g) was added to butyl acetate (120 g). A solution (25 mL) obtained by dissolving V-601 manufactured by Wako Pure Chemical Industries, Ltd. (having a ten-hour half-life temperature of 66° C.) (0.38 g) as a polymerization initiator in butyl acetate (20 g) was added dropwise to the obtained solution for 60 minutes while heating and refluxing the solution in a nitrogen stream at an inner temperature of 132° C. After the end of the dropwise addition, the solution was further heated and refluxed for two hours. After the reaction liquid was cooled to room temperature, electron-grade methanol (200 mL) and ion exchange water (45 mL) were added to the reaction liquid, and the precipitated solid was filtered and washed with methanol (20 mL). After the washing, the solid was dissolved in tetrahydrofuran (40 g), and ion exchange water (8 g) was added dropwise thereto under stirring. After stirring for one hour, supernatants were removed by means of decantation, and methanol (50 g) was added thereto. The precipitated solid was filtered and dried, thereby obtaining a white solid target substance [resin (A-9)] (1.2 g).

As a result of analyzing the obtained resin by means of GPC, $M_w$=17.0×10$^4$ and $M_n$=10.0×10$^4$. The content of unreacted monomer compound (A'-9) remaining in the solid substance was 1% by mass or less, and no components having a molecular weight of 3,000,000 or higher were observed. As a result of measuring the $^1$H-NMR spectrum using deuterochloroform as a measurement solvent, a proton peak derived from a methyl group (−0.5 to 0.5 ppm), a proton peak derived from an alkyl group generated due to the polymerization of a vinyl group (0.5 to 3.0 ppm), and a proton peak of the remaining vinyl group (4.9 to 6.8 ppm) were observed at an integral ratio of 3.9/2.4/0.5. From the integral ratios, the content of polymerizable groups in the resin was found to be 6.25 when the total number of organic groups bonded to silicon atoms in the resin was set to 100.

Synthesis Example 5

Synthesis of Exemplary Compound [Resin (A-10)]
(1) Synthesis of Monomer Body
A monomer compound (A'-10) was synthesized in the same manner as in Synthesis Example 4 except for the fact that N,N-dimethyl-N-2-mercaptoethylamine (0.8 g) was used instead of 3-mercaptopropionic acid used for the synthesis of the monomer compound (A'-9). From the result of $^1$H-NMR measurement (300 MHz, CDCl$_3$), the methyl/vinyl/2-(2-N,N-dimethylaminoethylthio)ethyl ratio was computed to be 3.9/2.7/1.4. The obtained silsesquioxane compound was a mixture of the basket-shaped silsesquioxane compound represented by Formula (Q-6).
(2) Synthesis of Crosslinked Polymer
A white solid target substance [resin (A-10)] (1.6 g) was obtained using the same method as for the synthesis of the resin (A-9) in Synthesis Example 4.

As a result of analyzing the obtained resin by means of GPC, $M_w$=18.4×10$^4$ and $M_n$=7.4×10$^4$. The content of unreacted monomer compound (A'-10) remaining in the solid substance was 1% by mass, and no components having a molecular weight of 3,000,000 or higher were observed. As a result of measuring the $^1$H-NMR spectrum using deuterochloroform as a measurement solvent, a proton peak derived from a methyl group (−0.5 to 0.5 ppm), a proton peak derived from an alkyl group generated due to the polymerization of a vinyl group (0.5 to 3.0 ppm), and a proton peak of the remaining vinyl group (4.9 to 6.8 ppm) were observed at an integral ratio of 3.9/2.6/0.1. From the integral ratios, the content of polymerizable groups in the resin was found to be 1.25 when the total number of organic groups bonded to silicon atoms in the resin was set to 100.

Synthesis Example 6

Synthesis of Exemplary Compound [Resin (A-13)]
(1) Synthesis of Monomer Body
A monomer compound (A'-13) was synthesized in the same manner as in Synthesis Example 4 except for the fact that a monomer compound (A'-7) was used instead of the monomer compound (A'-3). From the result of $^1$H-NMR measurement (300 MHz, CDCl$_3$), the 2-(trifluoromethyl)ethyl/vinyl/2-(2-carboxyethylthio)ethyl ratio was computed to be 4.0/1.6/2.4. The obtained silsesquioxane compound was a mixture of the basket-shaped silsesquioxane compound represented by Formula (Q-6).
(2) Synthesis of Crosslinked Polymer
A white solid target substance [resin (A-13)] (0.8 g) was obtained using the same method as for the synthesis of the resin (A-9) in Synthesis Example 4.

As a result of analyzing the obtained resin by means of CPC, $M_w$=12.9×10$^4$ and $M_n$=3.9×10$^4$. The content of unreacted monomer compound (A'-13) remaining in the solid substance was 1% by mass or less, and no components having a molecular weight of 3,000,000 or higher were observed. As a result of measuring the $^1$H-NMR spectrum using deuterochloroform as a measurement solvent, a proton peak derived from a 2-(trifluoromethyl)ethyl group (1.5 to 2.2 ppm), a proton peak derived from an alkyl group generated due to the polymerization of a vinyl group (0.5 to 3.0 ppm), and a proton peak of the remaining vinyl group (4.9 to 6.8 ppm) were observed at an integral ratio of 4.0/1.4/0.2. From the integral ratios, the content of polymerizable groups in the resin was found to be 2.5 when the total number of organic groups bonded to silicon atoms in the resin was set to 100.

Synthesis Example 7

Synthesis of Exemplary Compound [Resin (A-18)]
A glycidyl basket-shaped silsesquioxane (5.2 g, manufactured by Hybrid Plastics, Product No. EP0409) was dissolved in m-xylene (120 g) and was heated and stirred at 100° C. A solution of m-xylene (20 g) and a thermal cationic polymerization initiator SANAID SI-100L (manufactured by Sanshin Chemical Industry Co., Ltd., 0.52 g) was added dropwise thereto for 60 minutes. Furthermore, after that, the solution was stirred at 120° C. for two hours. The obtained polymer solution was added dropwise to butanol (300 mL) and was re-precipitated. The obtained solid was dissolved in tetrahydrofuran (50 mL), a solid obtained by adding the solution dropwise to a mixed liquid of methanol (50 mL) and ion exchange water (10 mL) was dried, thereby obtaining a white solid target substance [resin (A-18)] (3.6 g).

As a result of analyzing the obtained resin by means of GPC, $M_w$=9.6×10$^4$ and $M_n$=4.0×10$^4$.

As a result of measuring the $^1$H-NMR spectrum, a proton peak derived from an alkyl group generated due to the ring-opening of an epoxy group (3.0 to 3.4 ppm), and a proton peak derived from the remaining epoxy group (2.2 to 2.6 ppm) were observed at an integral ratio of 3.6/4.4. From the integral ratios, the content of polymerizable groups in the resin was found to be 55.0 when the total number of organic groups bonded to silicon atoms in the resin was set to 100.

Synthesis Example 8

Synthesis of Exemplary Compound [Resin (A-24)]
(1) Synthesis of Monomer Body
A monomer compound (A'-24) was synthesized in the same manner as in Synthesis Example 6 except for the fact that the monomer compound (A'-7) was used as a raw material and thiomalic acid was used instead of 3-mercaptopropionic acid. From the result of $^1$H-NMR measurement (300 MHz, CDCl$_3$), the 2-(trifluoromethyl)ethyl/vinyl/2-(1,2-dicarboxyethylthio)ethyl ratio was computed to be 4.0/2.3/1.7.
(2) Synthesis of Crosslinked Polymer
A white solid target substance [resin (A-24)] (1.3 g) was obtained using the same method as for the synthesis of the resin (A-13) in Synthesis Example 6.

As a result of analyzing the obtained resin by means of GPC, $M_w$=23.2×10$^4$ and $M_n$=6.4×10$^4$. The content of unreacted monomer compound (A'-24) remaining in the solid substance was 1% by mass or less, and no components having a molecular weight of 3,000,000 or higher were observed. As a result of measuring the $^1$H-NMR spectrum using deuterochloroform as a measurement solvent, a proton peak derived from a 2-(trifluoromethyl)ethyl group (1.5 to 2.2 ppm), a proton peak derived from an alkyl group generated due to the polymerization of a vinyl group (0.5 to 3.0 ppm), and a proton peak of the remaining vinyl group (4.9 to 6.8 ppm) were observed at an integral ratio of 4.0/1.0/1.3. From the integral ratios, the content of polymerizable groups in the resin was found to be 16.25 when the total number of organic groups bonded to silicon atoms in the resin was set to 100.

Synthesis Example 9

Synthesis of Exemplary Compound [Resin (A-44)]
(1) Synthesis of Monomer Body
2,4,6,8-Tetramethyl-2,4,6,8-tetravinylcyclotetrasiloxane (manufactured by Tokyo Chemical Industry Co., Ltd., 10.0 g) was dissolved in chlorobenzene (200 mL). Mercaptopropionic acid (5.2 g) was added thereto, V-601 (manufactured by Wako Pure Chemical Industries, Ltd., 0.12 g) was added thereto, and the mixture was heated and stirred at 60° C. for one hour. The obtained reaction liquid was re-precipitated in a mixed liquid of ethanol (200 mL) and isopropanol (60 mL). The re-precipitated crystals were filtered and dried, thereby obtaining a white solid target substance [monomer compound (A'-44)] (4.9 g). From the result of $^1$H-NMR measurement (300 MHz, CDCl$_3$), the methyl/vinyl/2-(2-carboxyethylthio)ethyl ratio was computed to be 4.0/2.0/2.0. The obtained cyclic siloxane compound was a monocyclic siloxane compound represented by Formula (H-2).
(2) Synthesis of Crosslinked Polymer
A white solid target substance [resin (A-44)] (4.3 g) was obtained using the same method as for the synthesis of the resin (A-3) in Synthesis Example 1.
As a result of analyzing the obtained resin by means of GPC, $M_w$=3.4×10$^4$ and $M_n$=0.9×10$^4$. The content of unreacted monomer compound (A'-44) remaining in the solid substance was 1% by mass or less, and no components having a molecular weight of 3,000,000 or higher were observed. As a result of measuring the $^1$H-NMR spectrum using deuterochloroform as a measurement solvent, a proton peak derived from a methyl group (−0.5 to 0.5 ppm), a proton peak derived from an alkyl group generated due to the polymerization of a vinyl group (0.5 to 3.0 ppm), and a proton peak of the remaining vinyl group (4.9 to 6.8 ppm) were observed at an integral ratio of 4.0/1.1/0.9. From the integral ratios, the content of polymerizable groups in the resin was found to be 11.25 when the total number of organic groups bonded to silicon atoms in the resin was set to 100.

Synthesis Example 10

Synthesis of Exemplary Compound [Resin (A-41)]
A methacrylic group-substituted basket-shaped silsesquioxane (3.5 g, manufactured by Hybrid Plastics, Product No. MA0735) was dissolved in THF (300 g) and was stirred at room temperature (25° C.). A radical polymerization initiator V-601 (manufactured by Wako Pure Chemical Industries, Ltd., 0.32 g) was added thereto and was stirred at 50° C. for one hour. The obtained polymer solution was added dropwise to butanol (300 mL) and re-precipitated. The obtained solid was dissolved in tetrahydrofuran (50 mL), and a solid obtained by adding the solution dropwise to a mixed liquid of methanol (50 mL) and ion exchange water (10 mL) was dried, thereby obtaining a white solid target substance [resin (A-41)] (2.5 g).
As a result of analyzing the obtained resin by means of GPC, $M_w$=3.9×10$^4$ and $M_n$=0.8×10$^4$.

As a result of measuring the $^1$H-NMR spectrum, a proton peak derived from an alkyl group generated due to the chemical bonding of a methacrylic group (3.0 to 3.4 ppm), and a proton peak derived from the remaining methacrylic group (5.0 to 5.5 ppm) were observed at an integral ratio of 2.2/5.8. From the integral ratios, the content of polymerizable groups in the resin was found to be 72.50 when the total number of organic groups bonded to silicon atoms in the resin was set to 100.
(Sulfide-Based Solid Electrolyte: Synthesis of Li/P/S-Based Glass)
In a glove box in an argon atmosphere (dew point: −70° C.), lithium sulfide (Li$_2$S, manufactured by Sigma-Aldrich Co., LLC., purity>99.98%, 2.42 g) and phosphorus pentasulfide (P$_2$S$_5$, manufactured by Sigma-Aldrich Co., LLC., purity>99%, 3.90 g) were respectively weighed and were put into an agate mortar. The molar ratio between Li$_2$S and P$_2$S$_5$ was set to 75:25 (Li$_2$S:P$_2$S$_5$). The substances put into the agate mortar were mixed together for five minutes using the agate muddler.
After that, 66 zirconia beads having a diameter of 5 mm were put into a 45 mL zirconia container (manufactured by Fritsch Japan Co., Ltd.), the above-described mixture was all put into the container, and the container was fully sealed in an argon atmosphere. The container was set in a planetary ball mill P-7 manufactured by Fritsch Japan Co., Ltd., and mechanical milling was carried out for 20 hours at 25° C. and a rotation speed of 510 rpm, thereby obtaining a yellow powder-form sulfide solid electrolyte (Li/P/S glass) (6.20 g). The volume-average particle diameter was 1.3 μm. The volume-average particle diameter was measured using the method described in the section of (inorganic solid electrolyte).
(Preparation of Solid Electrolyte Composition)
180 Zirconia beads having a diameter of 5 mm were put into a 45 mL zirconia container (manufactured by Fritsch Japan Co., Ltd.), an inorganic solid electrolyte LLT (manufactured by Toshima Manufacturing Co., Ltd., 9.0 g), a 30% solution of the exemplary compound (A-3) [that is, the resin (A-3)] (2.7 g), the solid content of 0.8 g), and LiTFSI (manufactured by Sigma-Aldrich Co., LLC.) (0.2 g) were added thereto, heptane (15.0 g) was injected as a dispersion medium, then, the container was set in a planetary ball mill P-7 manufactured by Fritsch Japan Co., Ltd., and the components were continuously mixed together for two hours at a rotation speed of 300 rpm, thereby obtaining a solid electrolyte composition S-1.
Solid electrolyte compositions S-2 to S-14 and T-1 and T-2 were also prepared using the same method as for the solid electrolyte composition S-1 except for the fact that the solid electrolytes, the cyclic compounds having a siloxane bond or the silicone resins, the lithium salts, and the dispersion media shown in Table 3 below were used, and the contents thereof were changed as shown in Table 3 below (parts by mass when the total solid content in the composition was set to 100 parts by mass in Table 3).

TABLE 3

| Solid electrolyte composition | Solid electrolyte Kind | Content | Crosslinked polymer of cyclic siloxane compound Kind | Content | Lithium salt Kind | Content | Dispersion medium |
|---|---|---|---|---|---|---|---|
| S-1 | LLT | 90 | (A-3) | 8 | LiTFSI | 2 | Heptane |
| S-2 | LLT | 95 | (A-3) | 4 | LiTFSI | 1 | Heptane |

TABLE 3-continued

| Solid electrolyte composition | Solid electrolyte Kind | Content | Crosslinked polymer of cyclic siloxane compound Kind | Content | Lithium salt Kind | Content | Dispersion medium |
|---|---|---|---|---|---|---|---|
| S-3 | LLT | 95 | (A-3) | 5 | — | — | Heptane |
| S-4 | LLZ | 95 | (A-6) | 4 | LiTFSI | 1 | Xylene |
| S-5 | LLZ | 95 | (A-7) | 4 | LiTFSI | 1 | Xylene |
| S-6 | LLZ | 95 | (A-9) | 4 | LiTFSI | 1 | Toluene |
| S-7 | LLZ | 95 | (A-10) | 4 | LiTFSI | 1 | Heptane |
| S-8 | LLZ | 94 | (A-13) | 4 | LiTFSI | 2 | Toluene |
| S-9 | LLZ | 94 | (A-18) | 4 | LiTFSI | 2 | Toluene |
| S-10 | LLZ | 94 | (A-24) | 4 | LiTFSI | 2 | Heptane |
| S-11 | LLZ | 95 | (A-44) | 4 | LiTFSI | 1 | Heptane |
| S-12 | Li/P/S | 95 | (A-3) | 5 | — | — | Heptane |
| S-13 | Li/P/S | 95 | (A-7) | 4 | LiTFSI | 1 | Heptane |
| S-14 | Li/P/S | 95 | (A-18) | 4 | LiTFSI | 1 | Heptane |
| S-15 | Li/P/S | 95 | (A-41) | 5 | — | — | Heptane |
| T-1 | LLZ | 95 | PDMS | 4 | LiTFSI | 1 | Heptane |
| T-2 | LLZ | 95 | PDMS (terminal methacryl) | 4 | LiTFSI | 1 | Heptane |

<Notes in Table 3>
"—" in the table indicates that the corresponding component is not used or the content thereof is zero parts by mass.
LLT: $Li_{0.33}La_{0.55}TiO_3$ (volume-average particle diameter: 3.25 μm)
LLZ: $Li_7La_3Zr_2O_{12}$ (volume-average particle diameter: 5.06 μm, manufactured by Toshima Manufacturing Co., Ltd.)
Li/P/S: The Li/P/S-based glass synthesized above (volume-average particle diameter: 1.3 μm)
LiTFSI [$LiN(CF_3SO_2)_2$]
PDMS: Polydimethylsilicone (manufactured by Sigma-Aldrich Co., LLC., viscosity: 1,000 cSt)
PDMS (terminal methacryl): Methacryl-modified polydimethylsilicone (X-22-164E manufactured by Shin-Etsu-Chemical Co., Ltd.)

(Preparation of Composition for Positive Electrode in Secondary Battery)

A positive electrode active material (100 parts by mass) shown in Table 4 below, acetylene black (5 parts by mass), the solid electrolyte composition (75 parts by mass) which had been obtained above and is shown in Table 4 below, and N-methyl pyrrolidone (270 parts by mass) were added to a planetary mixer (TK HIVIS MIX, manufactured by Primix Corporation) and were stirred at 40 rpm for one hour.

(Preparation of Composition for Negative Electrode in Secondary Battery)

A negative electrode active material (100 parts by mass) shown in Table 4 below, acetylene black (5 parts by mass), the solid electrolyte composition (75 parts by mass) which had been obtained above and is shown in Table 4 below, and N-methyl pyrrolidone (270 parts by mass) were added to a planetary mixer (TK HIVIS MIX, manufactured by Primix Corporation) and were stirred at 40 rpm for one hour.

(Production of Positive Electrode in Secondary Battery)

The composition for a positive electrode in a secondary battery obtained above was applied onto a 20 μm-thick aluminum foil using an applicator having a target clearance, was heated at 80° C. for one hour, and furthermore, was heated at 110° C. for one hour, and the coating solvent was dried. After that, the composition was heated and pressurized so as to obtain a target density using a heat pressing machine, thereby obtaining a positive electrode for a secondary battery.

(Production of Electrode Sheet for Secondary Battery)

The solid electrolyte composition which had been obtained above and is shown in Table 4 below was applied onto the positive electrode for a secondary battery obtained above using an applicator having a target clearance, was heated at 80° C. for one hour, and, furthermore, at 110° C. for one hour, and was dried. After that, the composition for a negative electrode in a secondary battery which had been obtained above and is shown in Table 4 below was further applied thereto, was heated at 80° C. for one hour, furthermore, was heated at 110° C. for one hour, and was dried. A 20 μm-thick copper foil was matched onto the negative electrode layer and was heated and pressurized so as to obtain a target density using a heat pressing machine, thereby obtaining an electrode sheet for a secondary battery.

<Evaluation of Moisture Resistance>

The ion conductivity of the electrode sheet immediately after being produced and the ion conductivity of the electrode sheet left at a constant temperature of 25° C. and a constant humidity of a relative humidity of 50% for six hours were compared with each other.

A: The ion conductivity did not decrease after the moisture resistance test.

B: The ion conductivity maintained at 80% or more and less than 100% after the moisture resistance test.

C: The ion conductivity maintained at 60% or more and less than 80% after the moisture resistance test.

D: The ion conductivity maintained at 20% or more and less than 60% after the moisture resistance test.

E: The ion conductivity maintained at less than 20% after the moisture resistance test.

<Evaluation of Temporal Stability>

The ion conductivity of the electrode sheet immediately after being produced and the ion conductivity of the electrode sheet left at a constant temperature of the dew point −40° C. and a constant humidity for two weeks were compared with each other.

A: The ion conductivity did not decrease after the temporal stability test.

B: The ion conductivity maintained at 80% or more and less than 100% after the temporal stability test.

C: The ion conductivity maintained at 60% or more and less than 80% after the temporal stability test.

D: The ion conductivity maintained at 20% or more and less than 60% after the temporal stability test.

E: The ion conductivity maintained at less than 20% after the temporal stability test.

<Measurement of Ion Conductivity>

A disc-shaped piece having a diameter of 14.5 mm was cut out from the electrode sheet obtained above and was put into a stainless steel 2032-type coin case into which a spacer and a washer were incorporated, thereby producing a coin battery. The coin battery was sandwiched using a holding device so that a pressure can be applied between the electrodes from the outside of the coin battery and was used in a variety of electrochemical measurements. The ion conductivity of the coin battery was obtained in a constant-temperature tank (30° C.) using an alternating-current impedance method.

Figure 2:
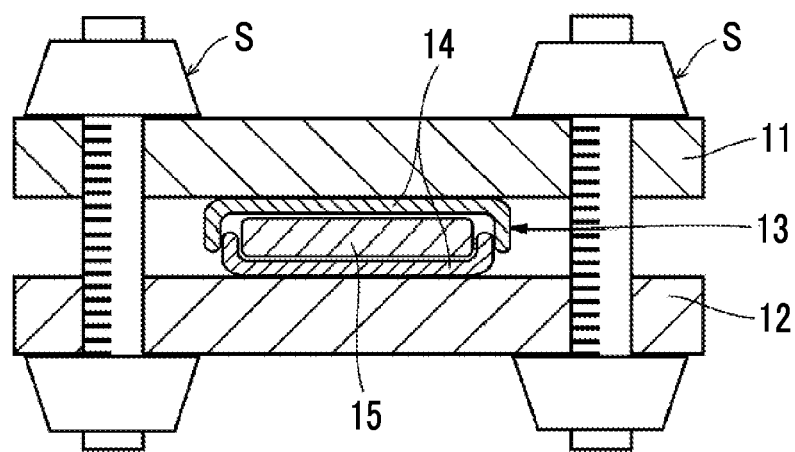
FIG. 2 is a cross-sectional view schematically illustrating a testing instrument used in examples.

The testing device used to pressurize the coin battery is illustrated in FIG. 2. A cut-out battery sheet 15 was stored in coin cases 14, thereby producing a coin battery 13. Next, the coin battery 13 was disposed between an upper portion-supporting plate 11 and a lower portion-supporting plate 12, and the coin battery 13 was pressurized using screws S. The pressure between the electrodes was set to 500 kgf/cm$^2$.

The measurement results of the moisture resistance, temporal stability, and ion conductivity of the solid electrolyte sheets are shown in Table 4. In Table 4, empty active material cells (denoted with the reference sign "-") in the cell constitution column indicate that an electrode sheet not provided with the negative electrode active material layer and the positive electrode active material layer was used as the electrode sheet for a secondary battery.

In addition, in Table 4, positive electrode active material layers, solid electrolyte layers, and negative electrode active material layers are denoted in a simplified manner as positive electrodes, electrolytes, and negative electrodes.

TABLE 4

| Test No. | Cell constitution | | | Moisture resistance | Temporal stability | Ion conductivity (mS/cm) |
|---|---|---|---|---|---|---|
| | positive electrode | Electrolyte | Negative electrode | | | |
| 101 | — | S-1 | — | C | B | 0.12 |
| 102 | LMO S-1 | S-1 | LTO S-1 | C | B | 0.13 |
| 103 | LMO S-1 | S-1 | Graphite S-1 | C | B | 0.12 |
| 104 | — | S-2 | — | C | B | 0.11 |
| 105 | LCO S-2 | S-2 | Graphite S-2 | C | B | 0.10 |
| 106 | — | S-3 | — | C | B | 0.09 |
| 107 | NMC S-3 | S-3 | Graphite S-3 | C | B | 0.09 |
| 108 | — | S-4 | — | C | B | 0.12 |
| 109 | NMC S-4 | S-4 | LTO S-4 | C | B | 0.13 |
| 110 | — | S-5 | — | A | B | 0.19 |
| 111 | LMO S-5 | S-5 | LTO S-5 | A | B | 0.18 |
| 112 | LMO S-6 | S-6 | LTO S-6 | B | A | 0.17 |
| 113 | LMO S-7 | S-7 | LTO S-7 | B | A | 0.18 |
| 114 | LMO S-8 | S-8 | LTO S-8 | A | A | 0.21 |
| 115 | LMO S-9 | S-9 | LTO S-9 | C | A | 0.24 |
| 116 | LMO S-10 | S-10 | LTO S-10 | A | A | 0.22 |
| 117 | LMO S-11 | S-11 | LTO S-11 | C | B | 0.09 |
| 118 | — | S-12 | — | C | A | 0.66 |
| 119 | LMO S-12 | S-13 | Graphite S-13 | B | A | 0.55 |
| 120 | LMO S-1 | S-14 | LTO S-1 | A | A | 0.17 |
| 121 | LMO S-15 | S-15 | Graphite S-15 | A | A | 0.43 |
| c11 | — | T-1 | — | C | E | 0.0013 |
| c12 | — | T-2 | — | C | B | 0.0013 |

<Notes in Table 4>
Test No.: Test Nos. beginning with 'c' indicate comparative examples.
LMO: LiMn$_2$O$_4$ lithium manganite
LTO: Li$_4$Ti$_5$O$_{12}$ lithium titanate (trade name "ENERMIGHT LT-106", manufactured by Ishihara Sangyo Kaisha, ltd.)
NMC: Li(Ni$_{1/3}$Mn$_{1/3}$Co$_{1/3}$)O$_2$ nickel, manganese, lithium cobaltate
Graphite: Spheroidized graphite powder manufactured by Nippon Graphite Industries, Co., Ltd.

As is clear from Table 4, in Test Nos. 101 to 121 in which the crosslinked polymer of the cyclic compound having a siloxane bond in the present invention was used in the inorganic solid electrolyte, the moisture resistance and the temporal stability were both evaluated as [C] or higher. In addition, the ion conductivity was also 0.09 mS/cm or higher in all of the test numbers. On the other hand, Comparative Examples c11 and c12 in which polydimethylsilicone and methacryl-modified polydimethylsilicone were used were poorer than the present invention in terms of satisfying both moisture resistance and ion conductivity and, furthermore, also satisfying temporal stability. In the present invention, particularly, in all of Test Nos. 111, 114, and 116 having a group having a fluorine atom in a side chain, the moisture resistance was "A". In addition, in all of Test Nos. 112 to 114, 116, and 117 having a polar group in a side chain, the temporal stability was "B" or higher.

In addition, in the case of having the same substituent, Test No. 112 in which silsesquioxane represented by Formula (Q-6) was used was superior to Test No. 117 in which the cyclic siloxane compound represented by Formula (H-2) was used in terms of all of the moisture resistance, the temporal stability, and the ion conductivity.

In addition, in Test Nos. 119 and 120 as well in which different cyclic compounds having a siloxane bond were used for the solid electrolyte layer and the positive or negative electrode active material layer, excellent effects were exhibited in the same manner as in a case in which the same cyclic compound having a siloxane bond was used for the solid electrolyte layer, the positive electrode active material layer, and the negative electrode active material layer.

Furthermore, from the comparison between Test Nos. 101 to 117 and Test Nos. 118 to 121 and, particularly, the comparison between Test Nos. 106 and 118, it is found that the temporal stability and the ion conductivity were superior with the sulfide-based solid electrolyte as the inorganic solid electrolyte to the oxide-based solid electrolyte.

The present invention has been described together with the embodiment, but the present inventors do not mean to limit the present invention to any detailed parts in the description unless particularly otherwise described, and the present invention is supposed to be widely interpreted within the concept and scope of the present invention which are described in the accompanying claims.

EXPLANATION OF REFERENCES

1: negative electrode collector
2: negative electrode active material layer
3: inorganic solid electrolyte layer
4: positive electrode active material layer
5: positive electrode collector
6: operation section
10: all solid-state secondary battery 1: upper portion-supporting plate
12: lower portion-supporting plate
13: coin battery
14: coin case
15: battery sheet
S: screw

What is claimed is:

1. An all solid-state secondary battery comprising:
a positive electrode active material layer;
an inorganic solid electrolyte layer; and
a negative electrode active material layer in this order,
wherein at least one layer of the positive electrode active material layer, the inorganic solid electrolyte layer, and the negative electrode active material layer includes a crosslinked polymer of a cyclic compound having a siloxane bond, and an inorganic solid electrolyte in the inorganic solid electrolyte layer includes metal ions or a metal element belonging to Group I or II of the periodic table and has an ion-conducting property respectively.

2. The all solid-state secondary battery according to claim 1, wherein the crosslinked polymer of the cyclic compound having a siloxane bond is a crosslinked polymer obtained by crosslinking at least one of a cyclic siloxane compound represented by Formula (1) below and a basket-shaped silsesquioxane compound represented by Formula (2) below:

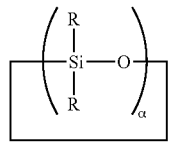

Formula (1)

Formula (2)

$(RSiO_{1.5})_\beta$ in Formula (1) and Formula (2), R's each independently represent a hydrogen atom or a monovalent organic group, the multiple R's may be identical to or different from each other; here at least two R's are monovalent organic groups having a polymerizable group, a represents an integer of 3 to 6, and β represents an integer of 8 to 16.

3. The all solid-state secondary battery according to claim 1, wherein the crosslinked polymer of the cyclic compound having a siloxane bond is a crosslinked polymer obtained by crosslinking one or more selected from the group consisting of cyclic siloxane compounds represented by any one of Formulae (H-1) to (H-3) below and basket-shaped silsesquioxane compounds represented by any one of Formulae (Q-1) to (Q-8) below:

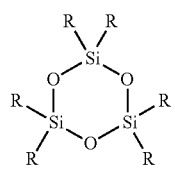

Formula (H-1)

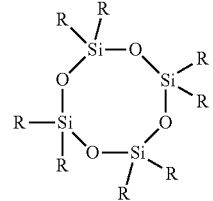

Formula (H-2)

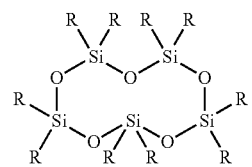

Formula (H-3)

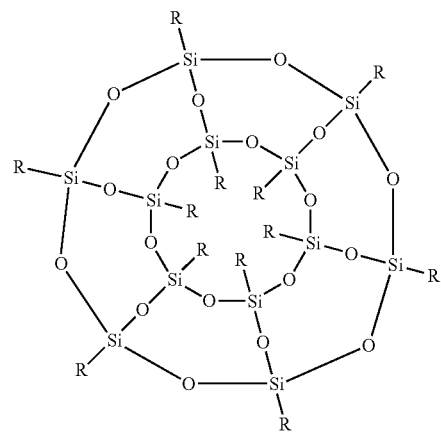

Formula (Q-1)

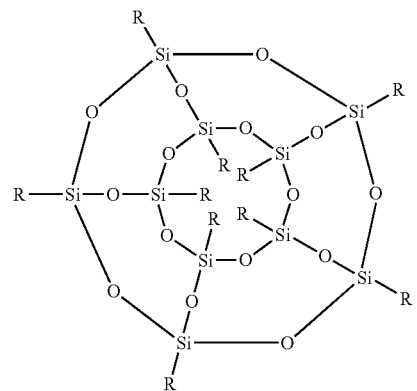

Formula (Q-2)

Formula (Q-3)

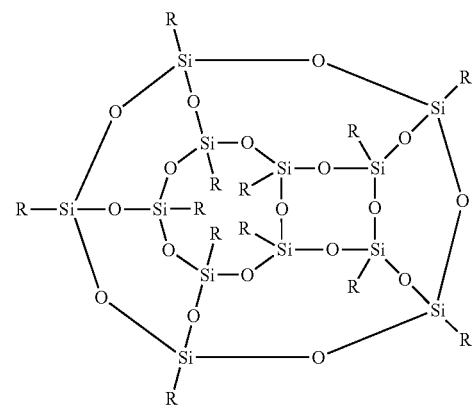

Formula (Q-4)

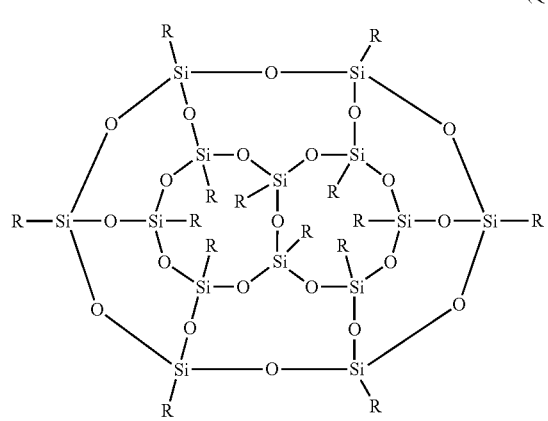

Formula (Q-5)

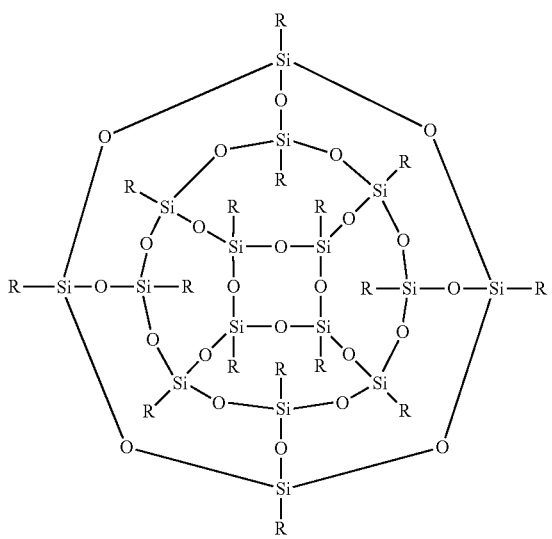

Formula (Q-6)

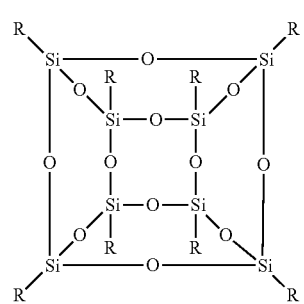

Formula (Q-7)

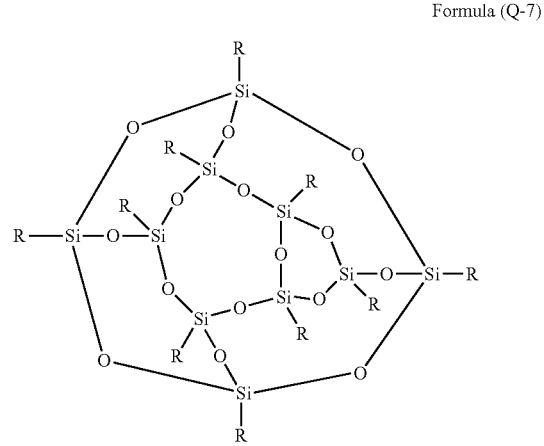

Formula (Q-8)

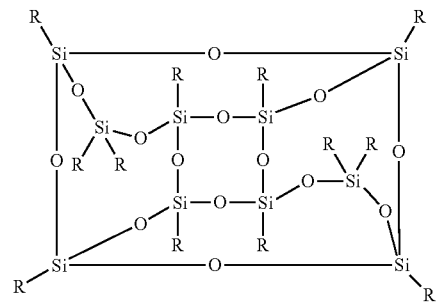

in Formulae (H-1) to (H-3) and Formulae (Q-1) to (Q-8), R represents a hydrogen atom or a monovalent organic group, and at least two monovalent organic groups represented by R represent groups having a polymerizable group.

4. The all solid-state secondary battery according to claim 2, wherein the polymerizable group is an epoxy group, an oxetanyl group, a (meth)acryloyl group, a (meth)acryloyloxy group, a (meth)acrylamide group, a vinyl group, or an allyl group.

5. The all solid-state secondary battery according to claim 2, wherein the monovalent organic group that is not a group having a polymerizable group is an alkyl group, a cycloalkyl group, an alkenyl group, an aryl group, or a heteroaryl group which may be substituted with a fluorine atom, an alkoxy group, an alkylthio group, an alkylamino group, an arylamino group, an acyloxy group, an alkoxycarbonyl group, a carbamoyloxy group, an alkoxycarbonylamino group, a silyl group, an alkyl group, or an aryl group.

6. The all solid-state secondary battery according to claim 2, wherein at least one monovalent organic group that is not a group having a polymerizable group is a group having any one of polar groups below:

a carboxy group, a sulfo group, a phosphate group, a hydroxy group, CON(R$^N$)$_2$, a cyano group, N(R$^N$)$_2$, and a mercapto group, wherein R$^N$ represents a hydrogen atom, an alkyl group, or an aryl group.

7. The all solid-state secondary battery according to claim 1, wherein the crosslinked polymer of the cyclic compound having a siloxane bond is represented by Formula (3) or (4) below:

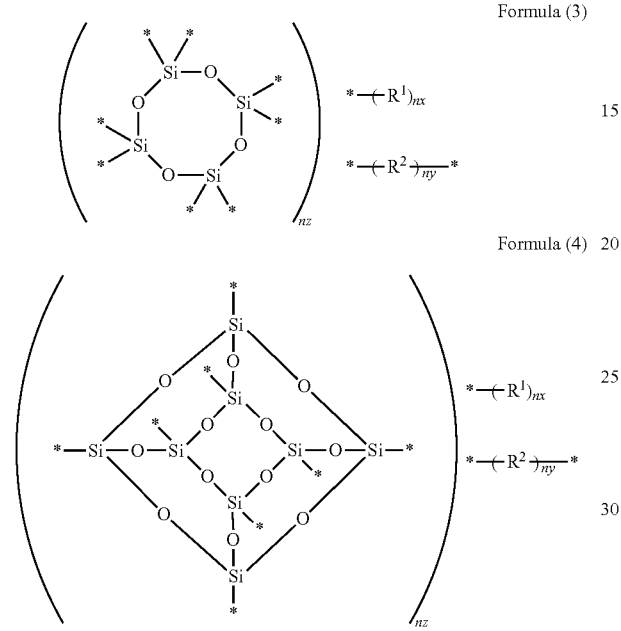

Formula (3)

Formula (4)

in Formulae (3) and (4), R$^1$'s each independently represent a hydrogen atom or a monovalent organic group, R$^2$ represents a linking group at which the polymerizable groups in R are bonded to each other and which links a unit cyclic structure and a unit cyclic structure, * represents a linking position to a silicon atom, nz represents a number of 2 to 10,000, nx and ny represent the average number in the unit cyclic structure, nx is a number of 0 to lower than 6, ny represents a number of 2 to 8, and nx+ny=8 is satisfied.

8. The all solid-state secondary battery according to claim 7, wherein the monovalent organic group is an alkyl group, a cycloalkyl group, an alkenyl group, an aryl group, or a heteroaryl group which may be substituted with a fluorine atom, an alkoxy group, an alkylthio group, an alkylamino group, an arylamino group, an acyloxy group, an alkoxycarbonyl group, a carbamoyloxy group, an alkoxycarbonylamino group, a silyl group, an alkyl group, an aryl group, a polar group, or a polymerizable group.

9. The all solid-state secondary battery according to claim 8, wherein the polar group and the polymerizable group are selected from Group A, wherein Group A is (i) a polar group selected from the group consisting of a carboxy group, a sulfo group, a phosphate group, a hydroxy group, CON(R$^N$)$_2$, a cyano group, N(R$^N$)$_2$, and a mercapto group, wherein, R$^N$ represents a hydrogen atom, an alkyl group, or an aryl group; or (ii) a polymerizable group selected from the group consisting of an epoxy group, an oxetanyl group, a (meth)acryloyl group, a (meth)acryloyloxy group, a (meth)acrylamide group, a vinyl group, and an allyl group.

10. The all solid-state secondary battery according to claim 1, wherein the crosslinked polymer of the cyclic compound having a siloxane bond is a crosslinked polymer obtained by crosslinking one or more basket-shaped silsesquioxane compounds represented by Formula (Q-9) below:

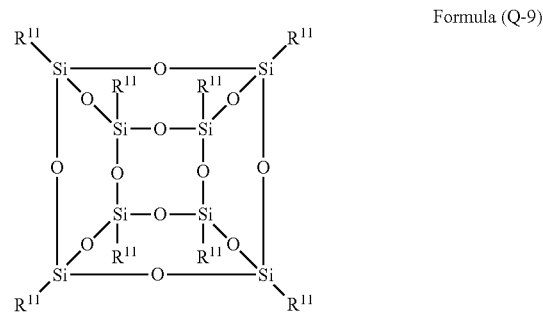

Formula (Q-9)

in Formula (Q-9), R$^{11}$ represents a group selected from Group A1, Group A2, and Group A3 and at least two R's are selected from Group A2, wherein Group A1 is selected from the group consisting of a hydrogen atom, an alkyl group, a cycloalkyl group, an aryl group, a heteroaryl group, an alkyl group having a fluorine atom, and an aryl group having a fluorine atom, wherein Group A2 is a polymerizable group or a group having a polymerizable group at a terminal, and wherein Group A3 is a group having a polar group at a terminal.

11. The all solid-state secondary battery according to claim 10, wherein eight R$^{11}$'s include at least one group selected from Group A1 and at least one group selected from Group A3.

12. The all solid-state secondary battery according to claim 10, wherein the groups in Group A1 are represented by Formula (5) below:

-L$^1$-X-L$^2$R$^{12}$     Formula (5)

in Formula (5), L$^1$ represents an alkylene group having 1 to 6 carbon atoms or an arylene group having 6 to 10 carbon atoms, L$^2$ represents an alkylene group having 1 to 10 carbon atoms which may be divided by a hetero atom in the middle or an arylene group having 6 to 10 carbon atoms, and X represents —Si(R$^N$)$_2$—, —N(R$^N$)—, —O—, —S—, —OC(=O)—, —C(=O)O—, —NHC(=O)O—, or —OC(=O)NH—, wherein R$^N$ represents a hydrogen atom, an alkyl group, or an aryl group, and R$^{12}$ represents an alkyl group having a fluorine atom and 1 to 10 carbon atoms or an aryl group having a fluorine atom and 6 to 12 carbon atoms.

13. The all solid-state secondary battery according to claim 10, wherein the polymerizable group in Group A2 is any one of a vinyl group, an allyl group, an epoxy group, an oxetanyl group, a methacryloyl group, an acryloyl group, a methacryloyloxy group, an acryloyloxy group, a methacrylamide group, an acrylamide group, and a styryl group.

14. The all solid-state secondary battery according to claim 10, wherein the polar group in Group A3 is any one of a carboxy group, a sulfo group, a phosphate group, a hydroxy group, N(R$^N$)$_2$, and a mercapto group, wherein R$^N$ represents a hydrogen atom, an alkyl group, or an aryl group.

15. The all solid-state secondary battery according to claim 10,
   wherein the group having a polar group at the terminal in Group A3 is represented by Formula (6) below:

-L$^1$-X-L$^2$-R$^{13}$   Formula (6)

in Formula (6), L$^1$ represents an alkylene group having 1 to 6 carbon atoms or an arylene group having 6 to 10 carbon atoms, L$^2$ represents an alkylene group having 1 to 10 carbon atoms which may be divided by a hetero atom in the middle or an arylene group having 6 to 10 carbon atoms, X represents —Si(R$^N$)$_2$—, —N(R$^N$)—, —O—, —S—, —OC(=O)—, —C(=O)O—, —NHC(=O)O—, or —OC(=O)NH—, and R$^{13}$ represents a carboxy group, a sulfo group, a phosphate group, a hydroxy group, or N(R$^N$), wherein R$^N$ represents a hydrogen atom, an alkyl group, or an aryl group.

16. The all solid-state secondary battery according to claim 3, wherein the crosslinked polymer of the cyclic compound having a siloxane bond is a crosslinked polymer obtained by radical-polymerizing the cyclic compound having a siloxane bond represented by any one of Formulae (H-1) to (H-3) and Formulae (Q-1) to (Q-9) using an azo-based radical polymerization initiator.

17. The all solid-state secondary battery according to claim 3, wherein the crosslinked polymer of the cyclic compound having a siloxane bond is a crosslinked polymer obtained by mixing at least one cyclic compound having a siloxane bond represented by any one of Formulae (H-1) to (H-3) and Formulae (Q-1) to (Q-9) and a monomer capable of copolymerization and increasing a molecular weight of the mixture.

18. The all solid-state secondary battery according to claim 2, wherein, in a case in which the number of all organic groups bonded to silicon atoms is set to 100, the average number of residual polymerizable groups in the crosslinked polymer is 1 to 60.

19. The all solid-state secondary battery according to claim 1, wherein a weight-average molecular weight of the crosslinked polymer is 1,000 to 500,000.

20. The all solid-state secondary battery according to claim 1, wherein a content of the crosslinked polymer of the cyclic compound having a siloxane bond is 0.01 parts by mass to 20 parts by mass with respect to 100 parts by mass of the inorganic solid electrolyte.

21. The all solid-state secondary battery according to claim 1, wherein at least one layer of the positive electrode active material layer, the negative electrode active material layer, and the inorganic solid electrolyte layer further contains a lithium salt.

22. The all solid-state secondary battery according to claim 1, wherein the inorganic solid electrolyte is an oxide-based inorganic solid electrolyte.

23. The all solid-state secondary battery according to claim 1, wherein the inorganic solid electrolyte is a sulfide-based inorganic solid electrolyte.

24. The all solid-state secondary battery according to claim 3, wherein the crosslinked polymer of the cyclic compound having a siloxane bond is a crosslinked polymer obtained by crosslinking a basket-shaped silsesquioxane compound represented by Formula (Q-6).

* * * * *